United States Patent
Schnabl et al.

(10) Patent No.: US 12,503,718 B2
(45) Date of Patent: Dec. 23, 2025

(54) BIOMARKER AND TREATMENT TARGET FOR ALCOHOLIC HEPATITIS

(71) Applicant: The Regents of the University of California, Oakland, CA (US)

(72) Inventors: Bernd Schnabl, San Diego, CA (US); Ana Cristina Llorente Izquierdo, San Diego, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 321 days.

(21) Appl. No.: 17/042,738

(22) PCT Filed: Mar. 28, 2019

(86) PCT No.: PCT/US2019/024703
§ 371 (c)(1),
(2) Date: Sep. 28, 2020

(87) PCT Pub. No.: WO2019/191508
PCT Pub. Date: Oct. 3, 2019

(65) Prior Publication Data
US 2021/0095327 A1     Apr. 1, 2021

Related U.S. Application Data

(60) Provisional application No. 62/649,446, filed on Mar. 28, 2018.

(51) Int. Cl.
*C12Q 1/04* (2006.01)
*A61K 35/76* (2015.01)
*C12Q 1/689* (2018.01)
*G01N 33/569* (2006.01)

(52) U.S. Cl.
CPC ............. *C12Q 1/04* (2013.01); *A61K 35/76* (2013.01); *C12Q 1/689* (2013.01); *G01N 33/56911* (2013.01); *C12Q 2600/158* (2013.01); *G01N 2333/315* (2013.01); *G01N 2800/085* (2013.01); *G01N 2800/52* (2013.01)

(58) Field of Classification Search
CPC .... C12Q 1/04; C12Q 1/689; C12Q 2600/158; A61K 35/76; G01N 33/56911; G01N 2333/315; G01N 2800/085; G01N 2800/52
See application file for complete search history.

(56) References Cited

U.S. PATENT DOCUMENTS 9,795,642 B2 * 10/2017 Stevens ............... A61L 26/0066
2007/0021600 A1    1/2007 Doucette-stamm et al.
2014/0179726 A1    6/2014 Bajaj et al.

OTHER PUBLICATIONS

Llorente, Cristina, et al. "Gastric acid suppression promotes alcoholic liver disease by inducing overgrowth of intestinal Enterococcus." Nature communications 8.1 (2017): 837. (Year: 2017).*

(Continued)

*Primary Examiner* — Louise W Humphrey
*Assistant Examiner* — Candice Lee Swift
(74) *Attorney, Agent, or Firm* — SCHWEGMAN LUNDBERG & WOESSNER, P.A.

(57) ABSTRACT

Methods of detecting and monitoring the progression of liver disease, including time to death, and methods of treating liver disease, in a mammal are provided.

10 Claims, 64 Drawing Sheets
Specification includes a Sequence Listing.

(56) References Cited

OTHER PUBLICATIONS

Huycke, Mark M., Carol A. Spiegel, and Michael S. Gilmore. "Bacteremia caused by hemolytic, high-level gentamicin-resistant Enterococcus faecalis." Antimicrobial agents and chemotherapy 35.8 (1991): 1626-1634. (Year: 1991).*

Kayser, F. H. "Safety aspects of enterococci from the medical point of view." International journal of food microbiology 88.2-3 (2003): 255-262. (Year: 2003).*

Van Tyne, Daria, Melissa J. Martin, and Michael S. Gilmore. "Structure, function, and biology of the Enterococcus faecalis cytolysin." Toxins 5.5 (2013): 895-911. (Year: 2013).*

Ray, Katrina. "Alcoholic liver disease: gut-liver axis: PPIs, enterococcus and promotion of alcoholic liver disease." Nature Reviews Gastroenterology & Hepatology 14.12 (2017): 689-690. (Year: 2017).*

Haas, Wolfgang, Brett D. Shepard, and Michael S. Gilmore. "Two-component regulator of Enterococcus faecalis cytolysin responds to quorum-sensing autoinduction." Nature 415.6867 (2002): 84-87. (Year: 2002).*

Haga, Yuki, et al. "Nonalcoholic fatty liver disease and hepatic cirrhosis: Comparison with viral hepatitis-associated steatosis." World journal of gastroenterology 21.46 (2015): 12989. (Year: 2015).*

Lucey, Michael R., Philippe Mathurin, and Timothy R. Morgan. "Alcoholic hepatitis." New England Journal of Medicine 360.26 (2009): 2758-2769. (Year: 2009).*

Robles-Diaz, Mercedes, et al. "The value of serum aspartate aminotransferase and gamma-glutamyl transpetidase as biomarkers in hepatotoxicity." Liver International 35.11 (2015): 2474-2482. (Year: 2015).*

Lammers, Willem J., et al. "Levels of alkaline phosphatase and bilirubin are surrogate end points of outcomes of patients with primary biliary cirrhosis: an international follow-up study." Gastroenterology 147.6 (2014): 1338-1349. (Year: 2014).*

Wong, VW-S., et al. "Metabolic and histological features of non-alcoholic fatty liver disease patients with different serum alanine aminotransferase levels." Alimentary pharmacology & therapeutics 29.4 (2009): 387-396. (Year: 2009).*

University of Rochester Medical Center; https://www.urmc.rochester.edu/encyclopedia/content.aspx?contenttypeid=167&contentid=international_normalized_ratio; accessed May 10, 2024 (Year: 2015).*

Kamath, Patrick S., et al. "A model to predict survival in patients with end-stage liver disease." Hepatology 33.2 (2001): 464-470. (Year: 2001).*

NCT05453578; https://clinicaltrials.gov/study/NCT05453578; accessed Dec. 18, 2024 (Year: 2024).*

Schooley, Robert T., et al. "Development and use of personalized bacteriophage-based therapeutic cocktails to treat a patient with a disseminated resistant Acinetobacter baumannii infection." Antimicrobial agents and chemotherapy 61.10 (2017): 10-1128. (Year: 2017).*

Ike YA, Hashimoto HA, Clewell DB. High incidence of hemolysin production by Enterococcus (Streptococcus) faecalis strains associated with human parenteral infections. Journal of clinical Microbiology. Aug. 1987;25(8):1524-8. (Year: 1987).*

"International Application Serial No. PCT US2019 024703, International Preliminary Report on Patentability mailed Oct. 8, 2020", 9 pages.

International Application Serial No. PCT/US2019/024703, International Search Report mailed Jul. 10, 2019, 4 pgs.

International Application Serial No. PCT/US2019/024703, Written Opinion mailed Jul. 10, 2019, 7 pgs.

Bajaj, et al., "Bacterial Infections in End-Stage Liver Disease: Current Challenges and Future Directions", Gut,vol. 61, Iss. 8, (Aug. 2012), 1219-1225.

Chen, Yanfei, et al., "Characterization of Fecal Microbial Communities in Patients with Liver Cirrhosis", Hepatology, vol. 52, Iss. 2, (May 13, 2011), 562-572.

La Rosa, Sabina Leanti, et al., "In Vivo Assessment of Growth and Virulence Gene Expression during Commensal and Pathogenic Lifestyles of luxABCDE-Tagged Enterococcus faecalis Strains in Murine Gastrointestinal and Intravenous Infection Models", American Society for Microbiology, vol. 79, No. 13, (Apr. 19, 2013), 3986-3997.

* cited by examiner

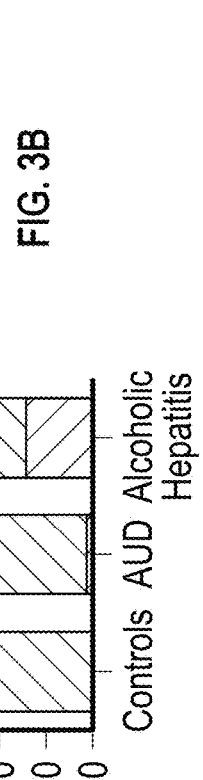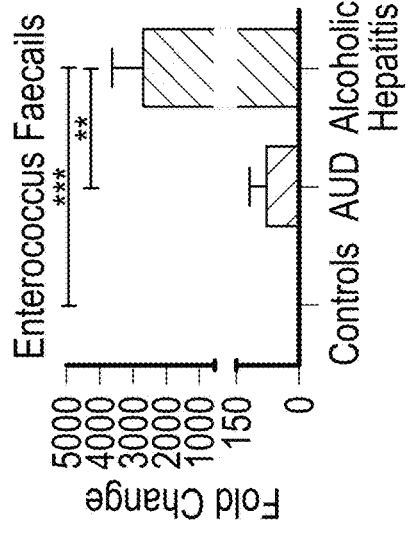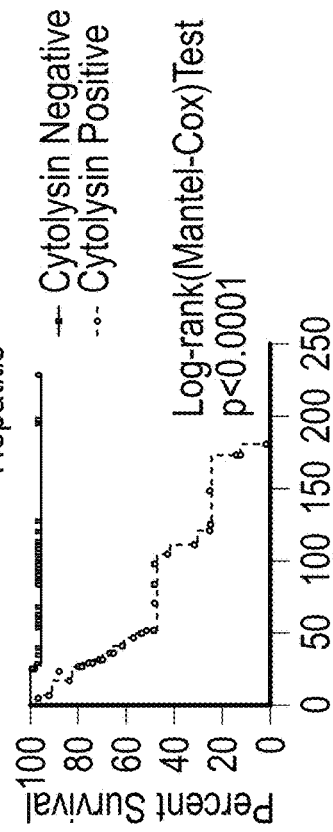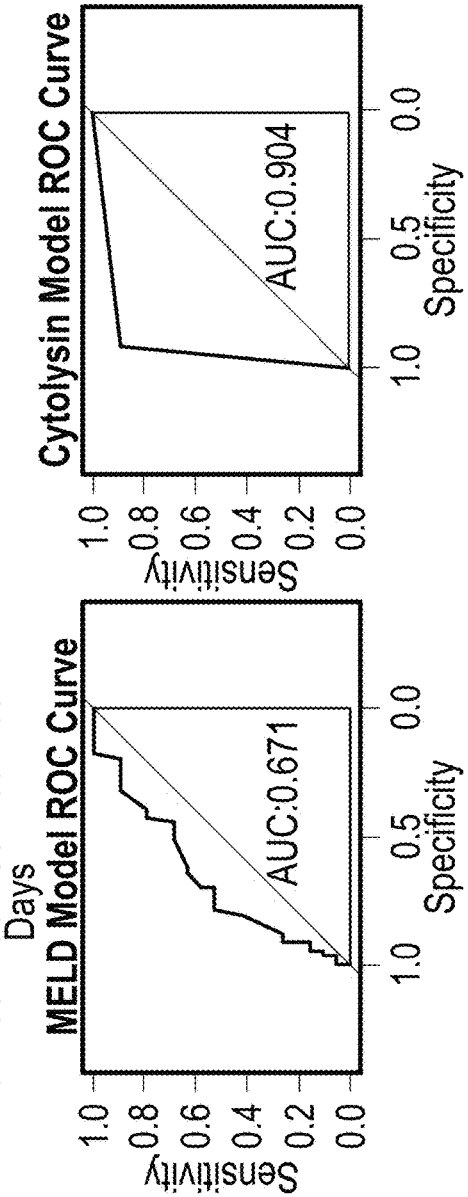
FIG. 3A
FIG. 3B
FIG. 3C
FIG. 3D

Univariable logistic regression analysis of laboratory and clinical parameters associated with Cytolysin

| Variables | OR | 97.5% CI | p-value[a] |
|---|---|---|---|
| Prior Treatment | 6.044 | 2.00-19.54 | 0.002 |
| Bilirubin | 1.055 | 1.00-1.18 | 0.060 |
| Creatinine | 1.936 | 1.22-3.74 | 0.018 |
| GGT | 0.993 | 0.98-1.00 | 0.058 |
| Albumin | 0.981 | 0.89-1.05 | 0.605 |
| Alk Phos | 0.995 | 0.99-1.00 | 0.063 |
| ALT | 0.997 | 0.98-1.01 | 0.690 |
| AST | 0.997 | 0.99-1.00 | 0.308 |
| INR | 2.246 | 1.03-5.35 | 0.049 |
| Platelets | 0.991 | 0.983-1.00 | 0.012 |
| MELD | 1.199 | 1.09-1.34 | 0.0006 |
| MELDNa | 1.242 | 1.11-1.42 | 0.0006 |
| ABIC | 2.088 | 1.37-3.41 | 0.0014 |
| DF | 1.009 | 1.00-1.02 | 0.098 |
| Death | 90.10 | 19.33-692.18 | 3.33e-07* |

Notes:

*Significance is indicated in bold Univarible regression analysis.
Abbreviations:

ALT, alanine aminotransferase; AST, aspartate aminotransferase; FGF19, fibroblast growth factor 19; GGT, gamma glutamyl transferase; INR, international normalized ratio; PMN, poloymorphonuclear cells .

FIG. 4A

Univariable logistic regression analysis of laboratory and clinical parameters associated with 90 day Mortality

| Variables | OR | 97.5% CI | p-value[a] |
|---|---|---|---|
| AST | 0.9996 | 0.998-1.001 | 0.537 |
| ALT | 0.9978 | 0.995-1.001 | 0.134 |
| Alk Phos | 0.9996 | 0.999-1.001 | 0.304 |
| Bilirubin | 1.0038 | 0.991-1.017 | 0.570 |
| Creatinine | 1.0236 | 0.946-1.108 | 0.564 |
| INR | 1.3756 | 1.129-1.676 | 0.003 |
| Infectious Episode | 1.2086 | 0.926-1.578 | 0.170 |
| MELD | 1.0206 | 1.003-1.039 | 0.027 |
| MELDNa | 1.0242 | 1.004-1.045 | 0.025 |
| ABIC | 1.1085 | 1.022-1.202 | 0.016 |
| Cytolysin | 1.6296 | 1.341-1.980 | 8.44e-06 |

Notes:

*Significance is indicated in bold Univarible regression analysis Abbreviations:

ALT, alanine aminotransferase; AST, aspartate aminotransferase; FGF19, fibroblast growth factor 19; GGT, gamma glutamyl transferase; INR, international normalized ratio; PMN, poloymorphonuclear cells .

FIG. 4B

Cytolysin is associated with 90-Day Mortality in patients AH

| Variables | Univariate Cox Regression | | |
|---|---|---|---|
| | HR | 95% CI | p-value[a] |
| Cytolysin | 19.24 | 4.33-85.45 | 5.398e-08 |
| MELD | 1.098 | 1.02-1.18 | 0.01185 |

Notes:
[†]Logrank test
Abbreviations:
HR-Hazard Ratio, CI-Confidence Interval
MELD, Model for End-stage Liver Disease

FIG. 4C

Demographic and laboratory results of controls, alcohol dependent and patients with alcoholic hepatitis.[a]

| Variables | Patients with Alcoholic Hepatitis (n=82) |
|---|---|
| Gender (% male) | 65 |
| Age (years) | 52 (11) |
| Creatinine (mg/dl) | 1.2 (1.3) |
| Bilirubin (mg/dl) | 16.6 (8.7) |
| AST (IU/L) | 156 (85) |
| ALT (IU/L) | 56 (36) |
| Albumin (g/dl) | 4.8 (7.6) |
| INR | 2.0 (0.6) |
| MELD score | 25 (6) |

Values are presented as mean with S.D..

ALT, alanine aminotransferase; AST, aspartate aminotransferase; INR, international normalized ratio; MELD, Model for End-stage Liver Disease.

FIG. 4D

| Univariate Cox Regression |||| 
|---|---|---|---|
| Variables | HR | 95% CI | p-Value |
| Cytolysin | 22.24 | 5.136-96.3 | 3e-09 |
| MELD | 1.068 | 1.009-1.13 | 0.02 |

- E. faecalis from controls
- E. faecalis from patients with AUD
- E. faecalis from patients with Alcoholic hepatitis
- E. faecalis from patients with Bloodstream infection
- Cytolysin negative
- Cytolysin positive

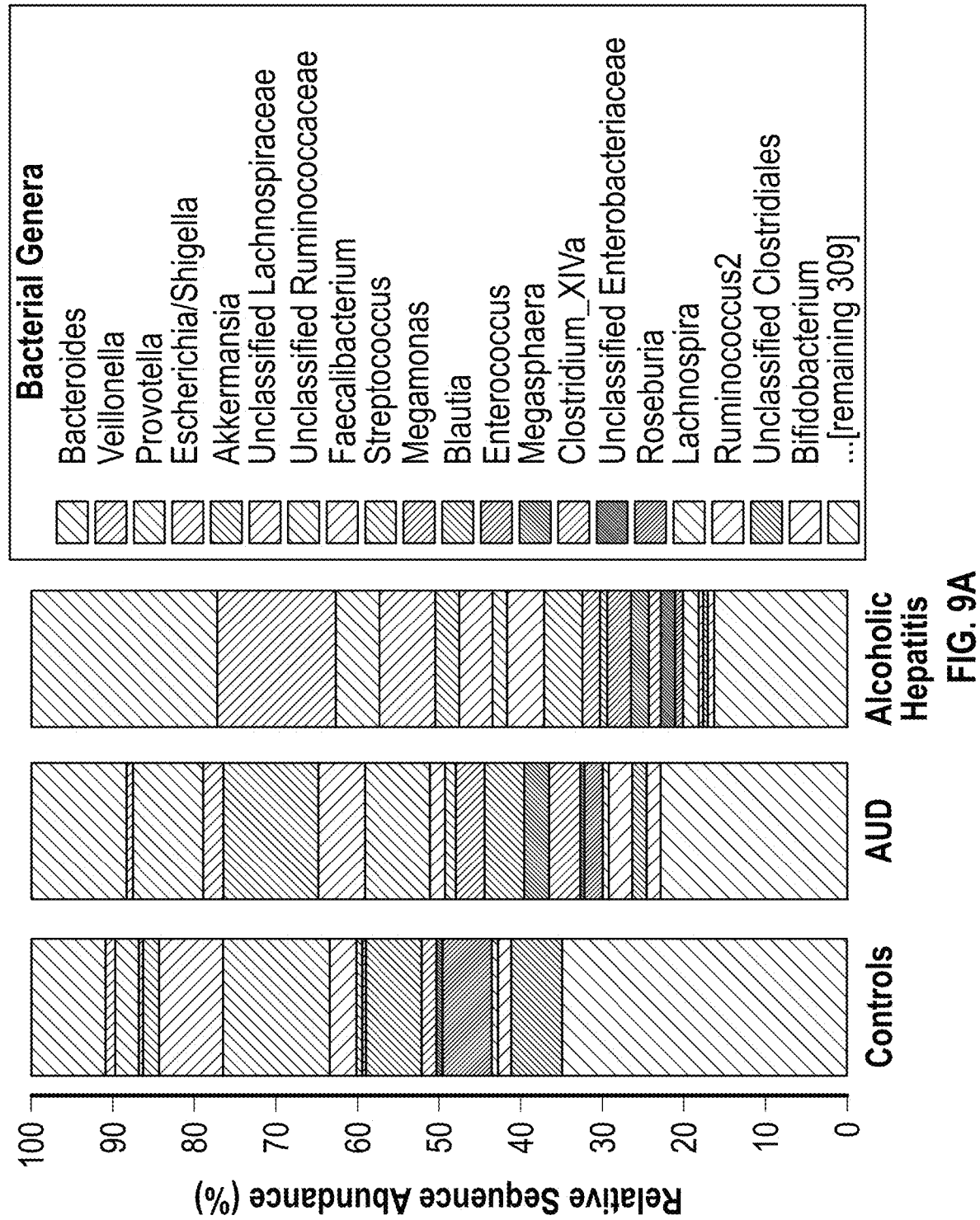

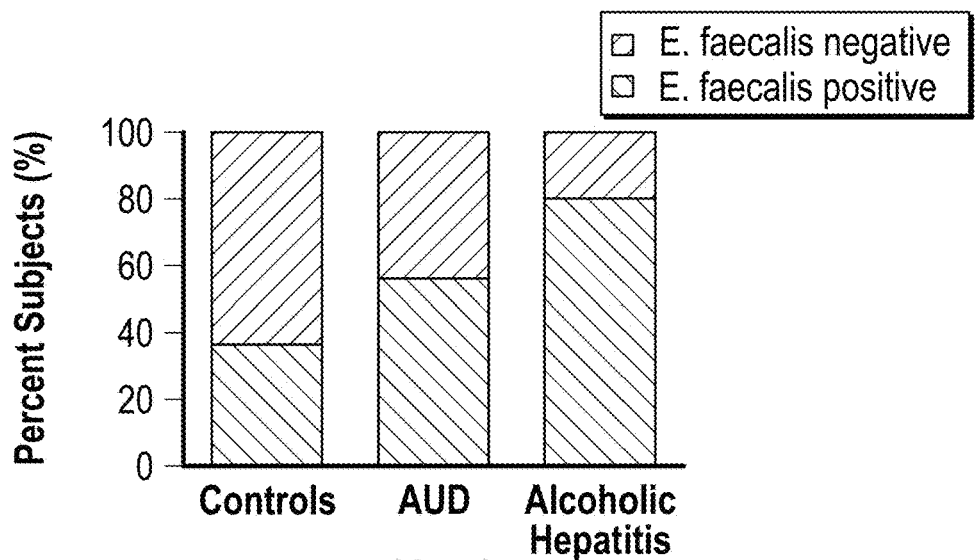
FIG. 9C
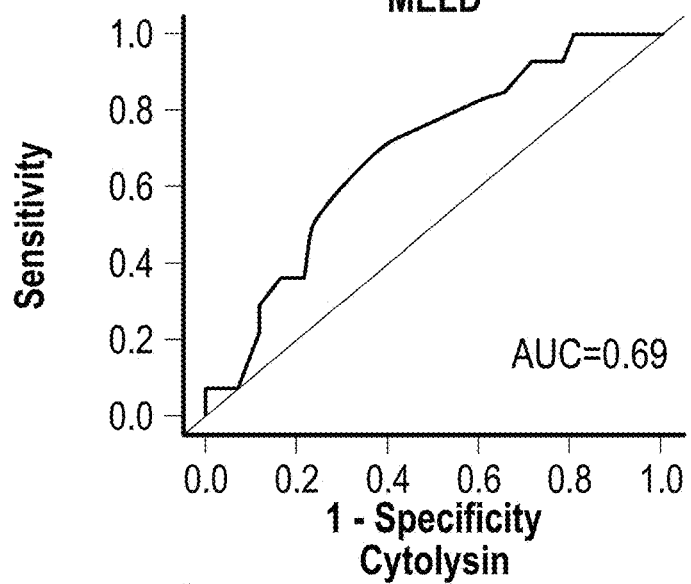
MELD
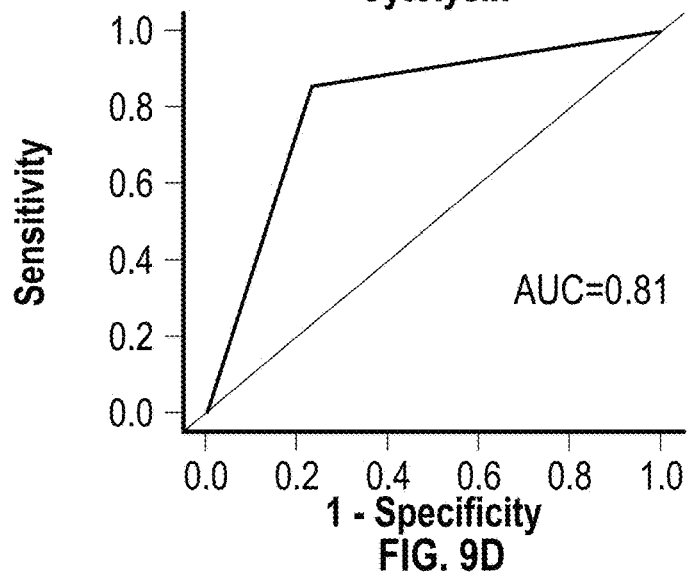
Cytolysin
FIG. 9D

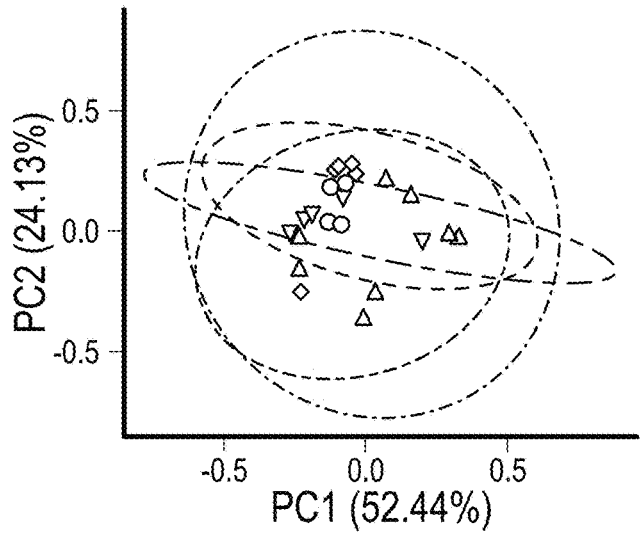
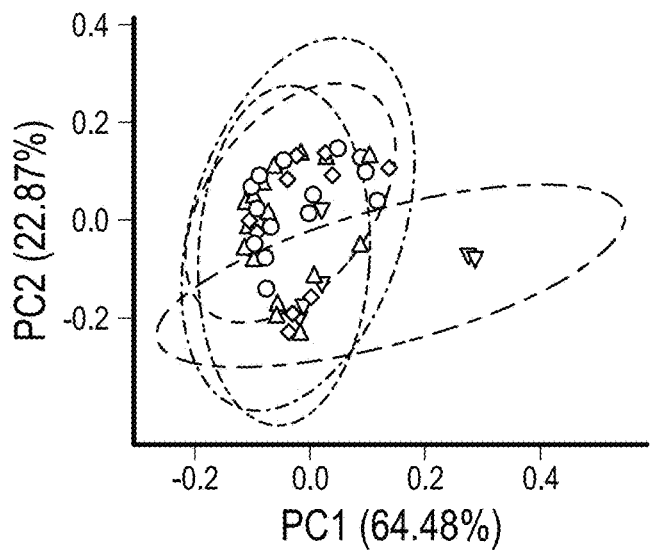
FIG. 11B

Siphophage
(Long, Flexible,
Noncontractile Tail)

Myophage
(Contractile Tail)

Podophage
(Short,
Noncontractile Tail)

} Head

} Tail

Efφmus_1   Efφmus_2   Efφmus_3   Efφmus_4

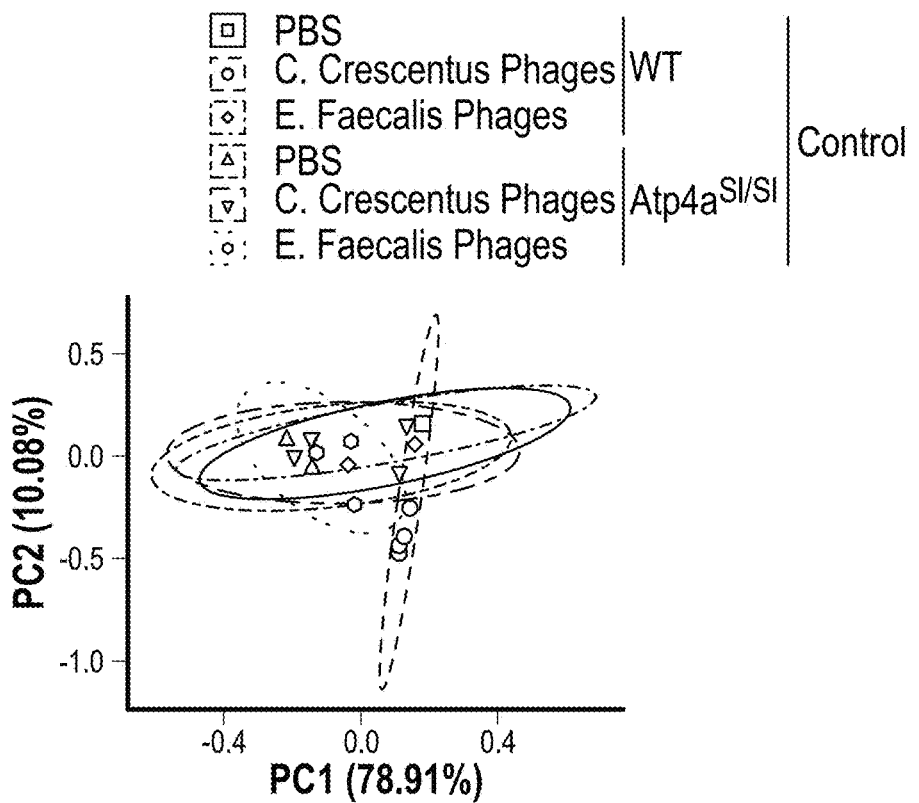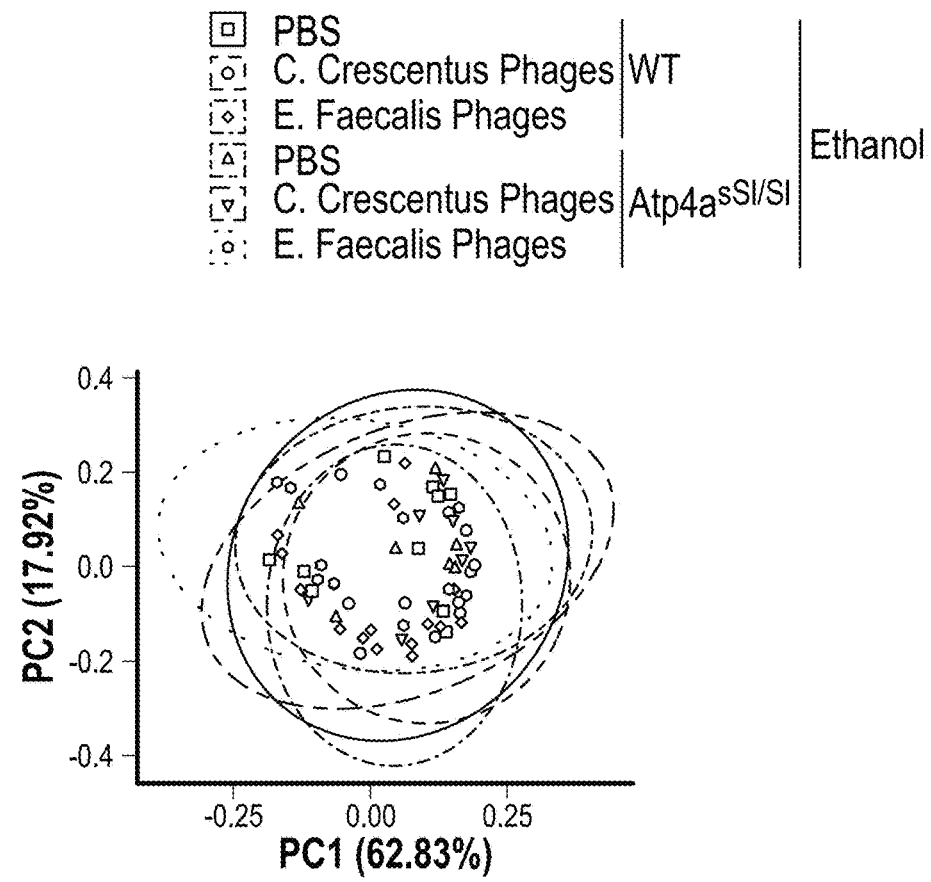
FIG. 13I

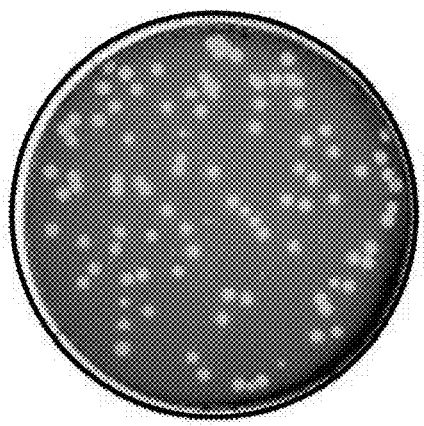
Ef_#5
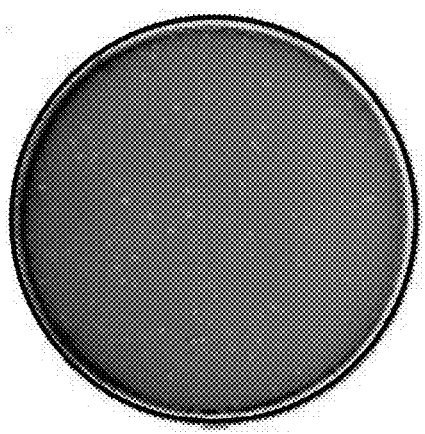
Ef_#2
FIG. 14A
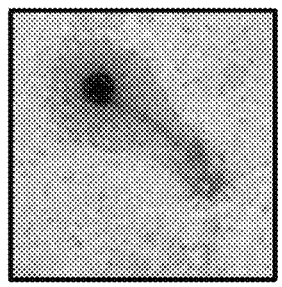
Efφ5_2
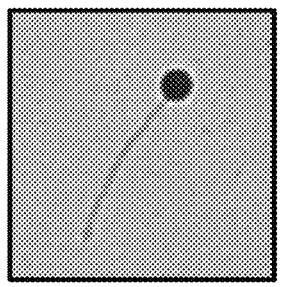
Efφ5_4
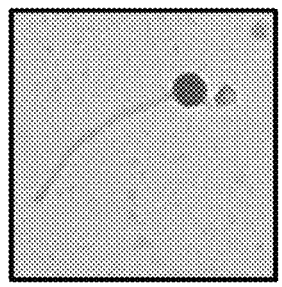
Efφ5_5
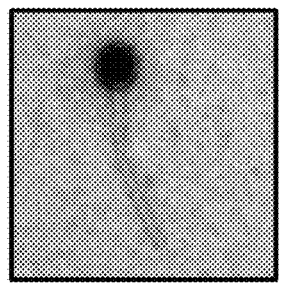
Efφ5_6
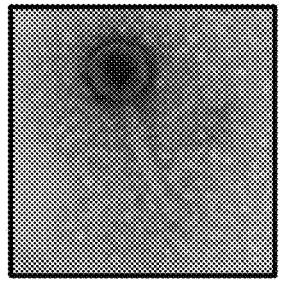
Efφ2_1
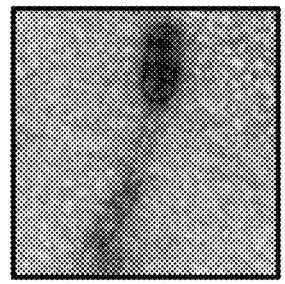
Efφ2_6
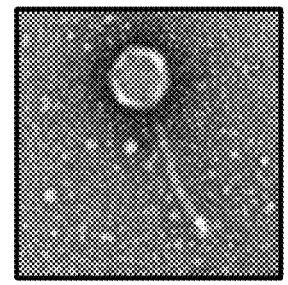
Efφ2_8
FIG. 14B

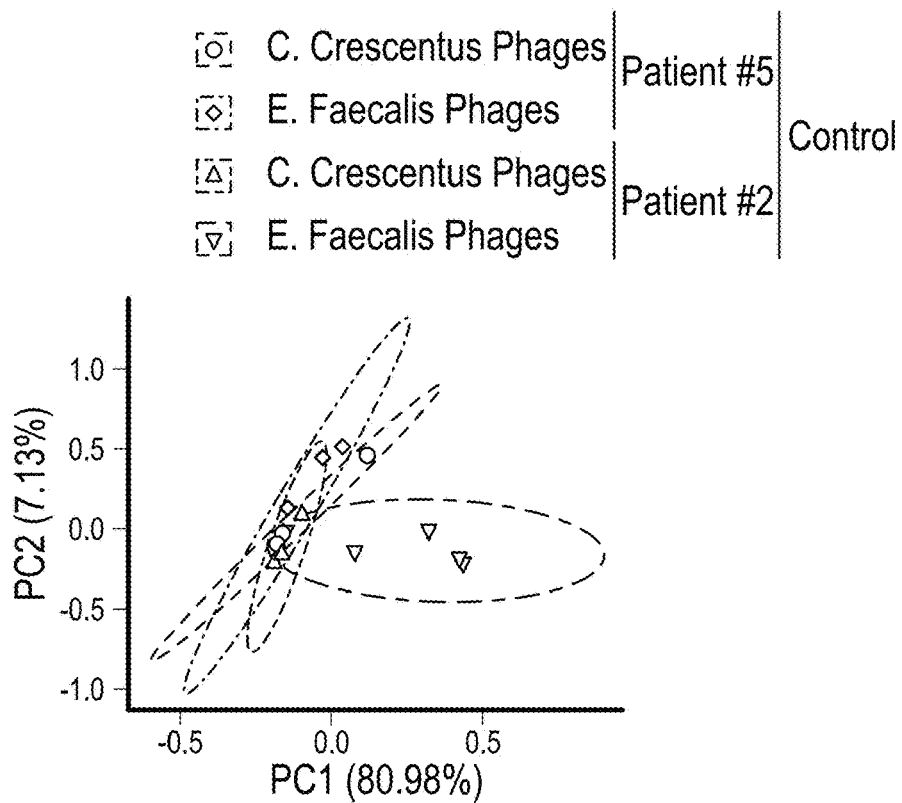
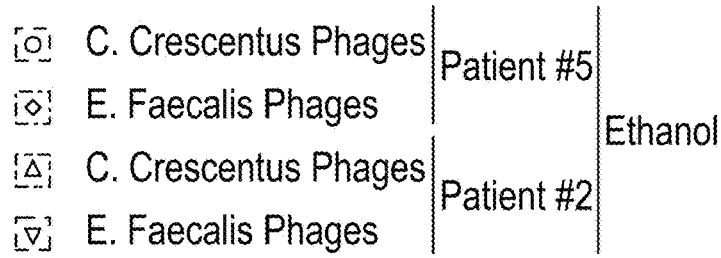
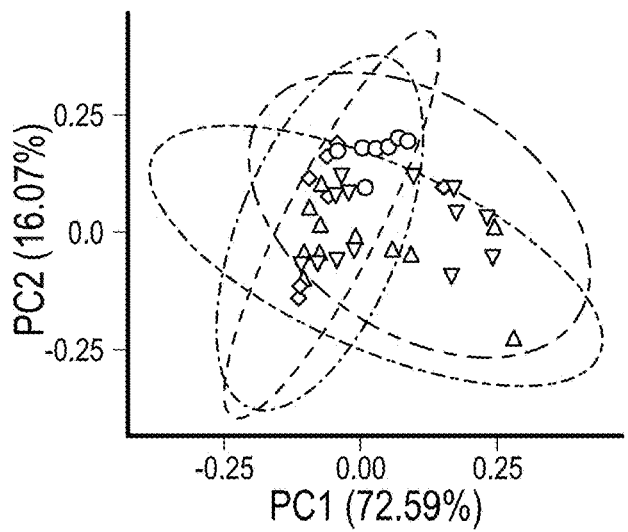
FIG. 15B

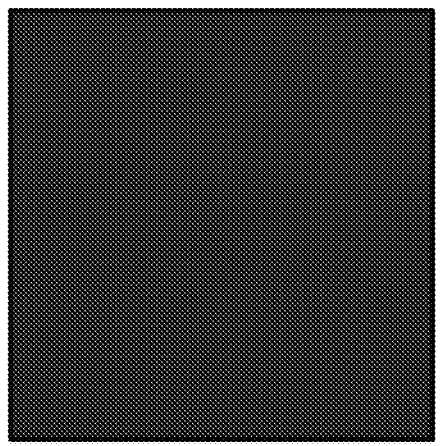
Ef 6
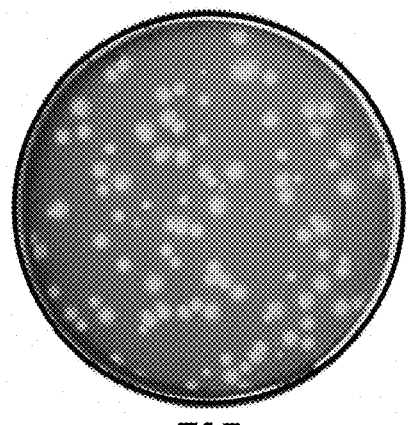
Ef 7
FIG. 16A
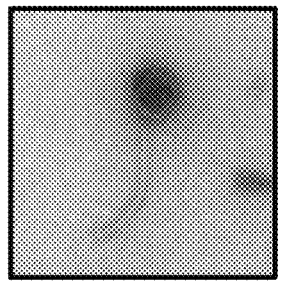
Ef 6.1
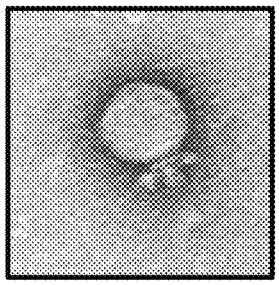
Ef 6.2
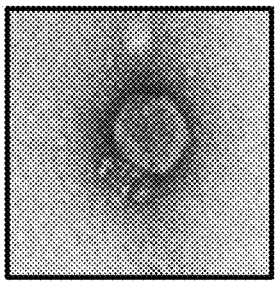
Ef 6.3
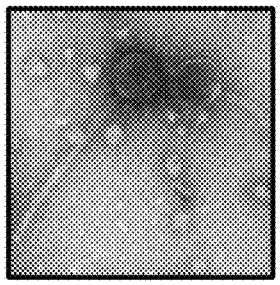
Ef 6.4
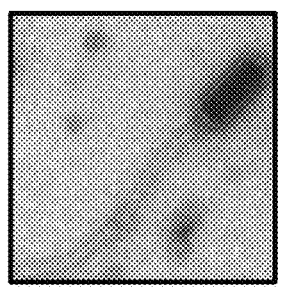
Ef 7.1
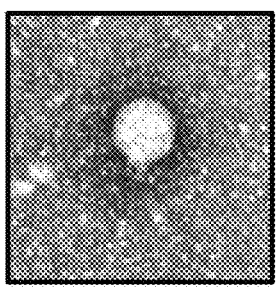
Ef 7.2
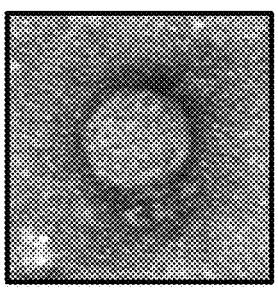
Ef 7.3
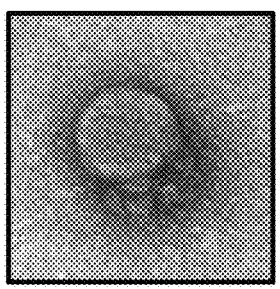
Ef 7.4
FIG. 16B

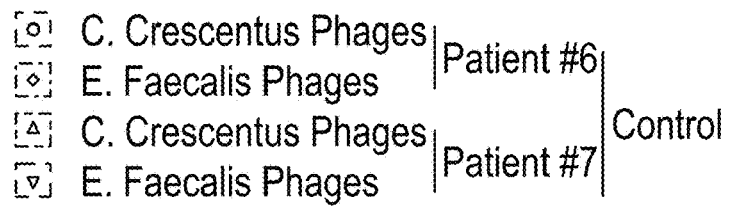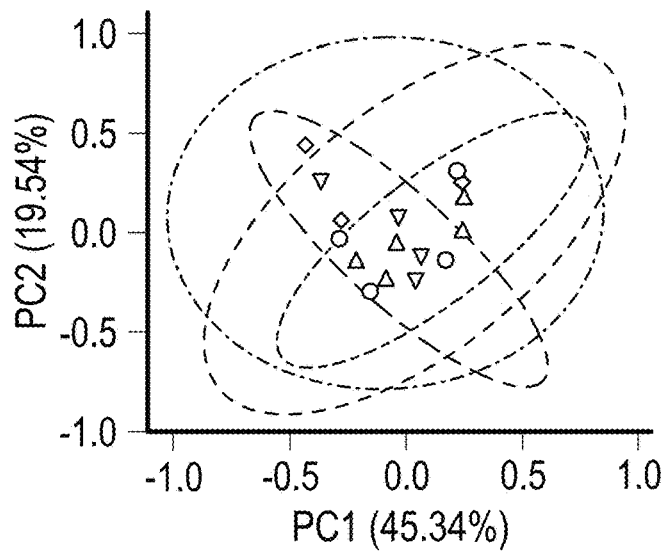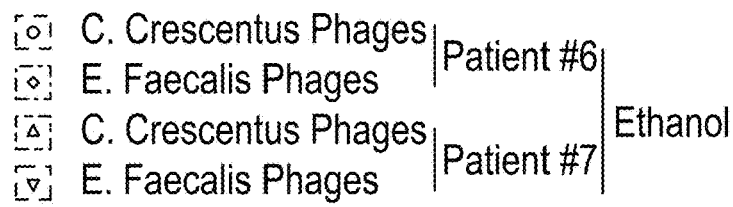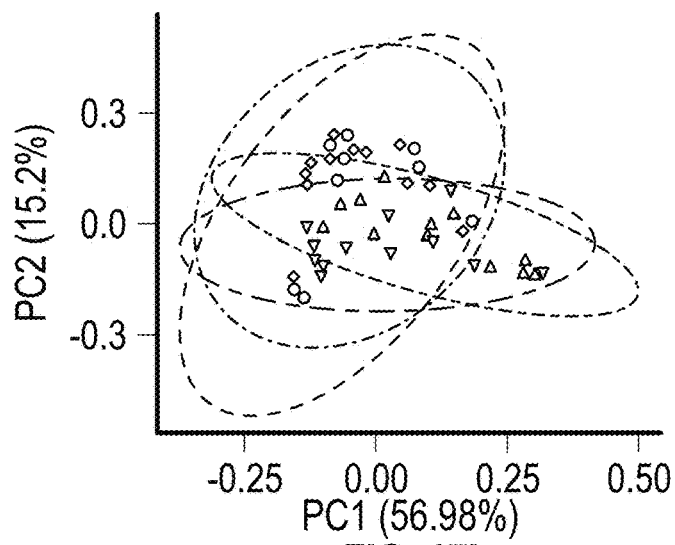
FIG. 17I

Demographic and laboratory results of controls, patients with alcohol use disorder and alcoholic hepatitis.

| Variables | Controls (n=26) | Alcohol use disorder (n=44) | Alcoholic hepatitis (n=89) |
|---|---|---|---|
| Gender (% male), n=159 | 61.5 | 84.1 | 67.4 |
| Age (years), n=159 | 48.5 (27.0-74.0) | 44.0 (27.0-67.0) | 50.0 (30.0-75.0) |
| BMI, n=131 | 26.0 (18.8-35.6) | 24.3 (17.9-37.0) | 26.9 (16.3-48.3) |
| Creatinine (mg/dl), n=128 | | 0.8 (0.5-1.3) | 0.8 (0.3-8.1) |
| Bilirubin (mg/dl), n=130 | | 0.5 (0.2-6.4) | 15.8 (2.5-38.6) |
| AST (IU/L), n=132 | | 47.5 (15.0-283.0) | 132.0 (38.0-456.0) |
| ALT (IU/L), n=132 | | 37.5 (9.0-184.0) | 45.0 (15.0-216.0) |
| Albumin (g/dl), n=124 | | 4.4 (2.2-5.2) | 2.4 (1.3-4.1) |
| INR, n=128 | | 1.0 (0.8-2.0) | 1.8 (1.0-4.4) |
| GGT, n=83 | | 111.5 (16.0-1131.0) | 196.0 (33.0-3632.0) |
| MELD, n=87 | | | 24.0 (12.0-46.0) |

Values are presented as median with range in brackets unless otherwise indicated. The number of subjects for which the respective data was available is indicated in the first column.

BMI, body mass index; AST, aspartate aminotransferase; ALT, alanine aminotransferase; INR, international normalized ratio; GGT, gamma-glutamyl transferase; MELD, model for end-stage liver disease

FIG. 18A

Characteristics of alcoholic hepatitis patients (n=83) for cytolysin analysis

| Treatment at admission | |
|---|---|
| Steroids, n (%), n=82 | 30 (36.6) |
| Pentoxifylline, n (%), n=71 | 7 (9.9) |
| Antibiotics, n (%), n=82 | 26 (31.7) |
| Prophylactic antibiotics, n (%), n=82 | 23 (28.0) |
| Proton pump inhibitors, n | 2 |
| Infection at admission, n (%), n=68 | 17 (25.0) |
| | |
| Clinical scores and outcome | |
| MELD median (range), n=82 | 24.0 (12.0-46.0) |
| MELD>21, n (%) | 63 (76.8) |
| Child-Pugh stage, n (%)  A | 1 (1.2) |
| B | 23 (28.4) |
| C | 57 (70.4) |
| | |
| Maddrey's DF, median (range), n=66 | 70.5 (3.0-246.0) |
| Maddrey's DF >32 | 60 (90.9) |
| 30 day mortality rate, n (%), n=77 | 8 (10.4) |
| 90 day mortality rate, n (%), n=57 | 14 (24.6) |
| | |
| Liver biopsy available, n (%) | 51 (61.5) |
| Stage of Fibrosis    0 | 2 (4) |
| 1 | 0 (0) |
| 2 | 8 (16) |
| 3 | 8 (16) |
| 4 | 32 (64) |

If applicable, values are presented as median and range in brackets. The number of patients for which the respective data was available is indicated in the first column.

MELD, model for end-stage liver disease; DF, discriminant function

FIG. 18B

Univariate logistic regression analysis of laboratory and clinical parameters associated with cytolysin

| Variables | OR | 97.5% CI | P-value[a] |
|---|---|---|---|
| Steroids | 2.55 | 0.92-6.82 | 0.058228 |
| PTX | 3.16 | 0.64-17.35 | 0.15637 |
| Antibiotics | 2.20 | 0.82-5.94 | 0.116854 |
| Prophylactic antibiotics | 1.00 | 0.33-2.78 | 0.9948 |
|  |  |  |  |
| Creatinine | 2.03 | 1.25-4.11 | 0.0179* |
| GGT | 0.99 | 0.98-1.00 | 0.058 |
| INR | 2.28 | 1.05-5.47 | 0.0462* |
| Platelets | 0.99 | 0.98-1.00 | 0.0101* |
| MELD | 1.17 | 1.07-1.29 | 0.001003** |
| MELDNa | 1.10 | 1.01-1.20 | 0.03038* |
| 30 day mortality | 8.50 | 1.78-61.73 | 0.012966* |
| 90 day mortality | 19.80 | 4.48-142.10 | 0.000409*** |
| 180 day mortality | 54.00 | 5.75-1383.50 | 0.00237** |

*Significance is indicated in bold.

OR, odds ratio; CI, confidence interval; PTX, pentoxifylline; GGT, gamma-glutamyl transferase; INR, international normalized ratio; MELD, model for end-stage liver disease; MELDNa, sodium MELD

FIG. 18C

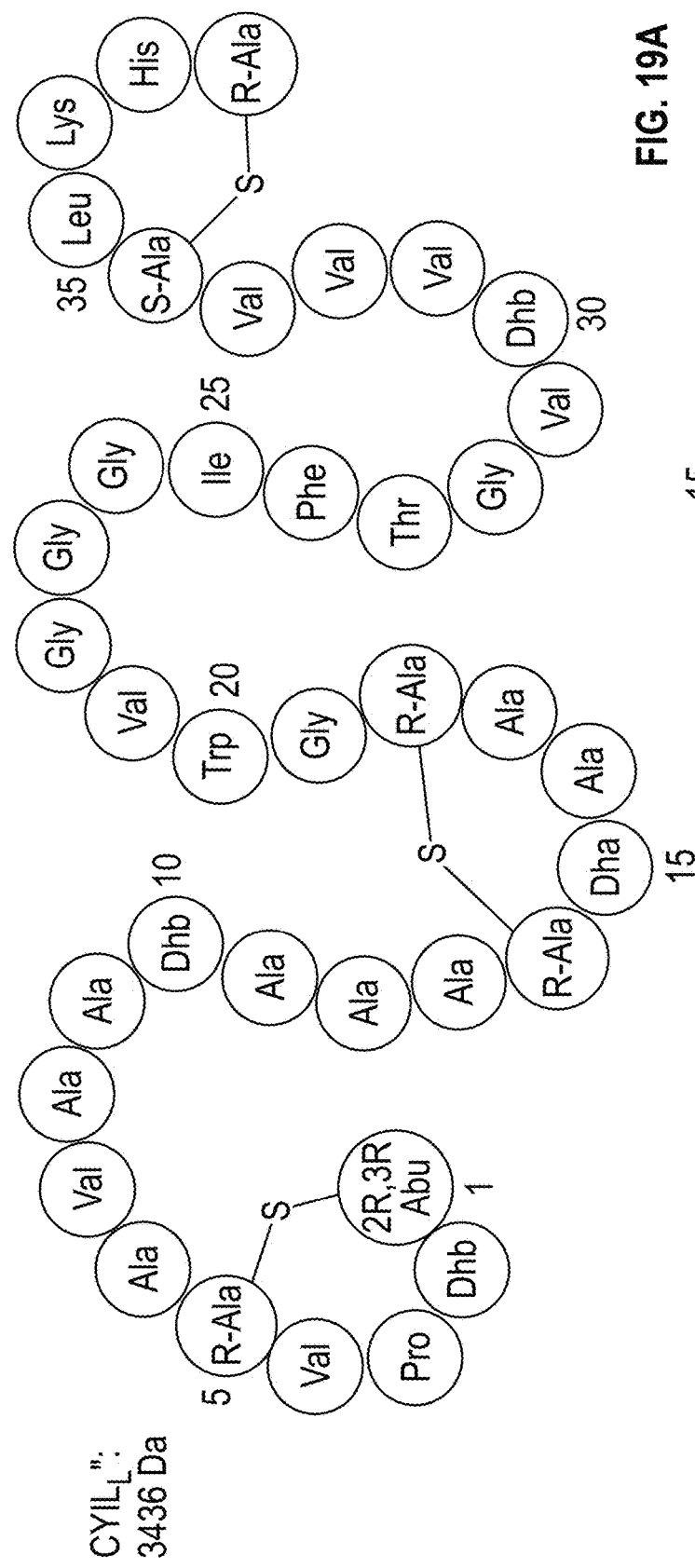
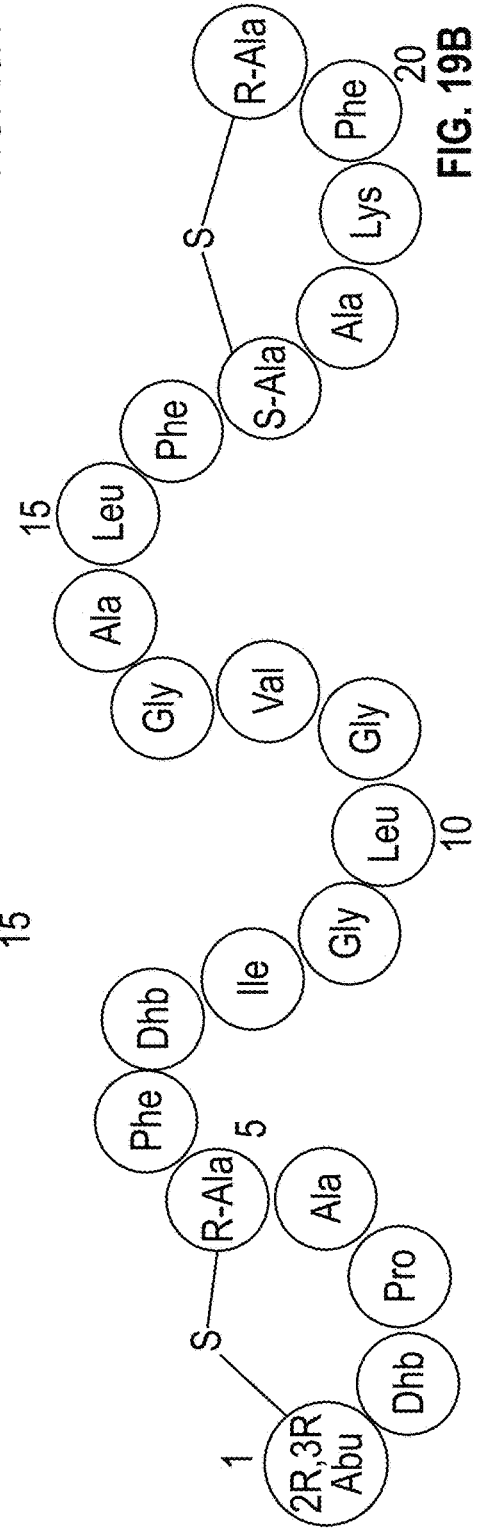
FIG. 19A
FIG. 19B

BIOMARKER AND TREATMENT TARGET FOR ALCOHOLIC HEPATITIS

CROSS-REFERENCE TO RELATED APPLICATIONS

This application is a U.S. National Stage Filing under 35 U.S.C. 371 from International Application No. PCT/US2019/024703, filed on Mar. 28, 2019, and published as WO 2019/191508 A1 on Oct. 3, 2019, which claims the benefit of the filing date of U.S. application No. 62/649,446, filed on Mar. 28, 2018, the disclosure of each of which is incorporated by reference herein.

STATEMENT OF GOVERNMENT RIGHTS

This invention was made with government support under grant number U0IAA 021856 awarded by the National Institutes of Health. The government has certain rights in the invention.

INCORPORATION BY REFERENCE OF SEQUENCE LISTING

This application contains a Sequence Listing which has been submitted electronically in ST25 format (CRF, .txt, ASCII) and is hereby incorporated by reference in its entirety. Said ST25 file, created on Dec. 22, 2023, is named "2396208.xml" and is 2,002 bytes in size.

BACKGROUND

Chronic liver disease due to alcohol use disorder contributes markedly to the global burden of disease and mortality (Lozano et al., 2010; Lee et al., 2019; Rehm et al., 2014). Alcoholic liver disease affects several million people in the United States. Chronic alcoholic liver disease may progress from simple steatosis to steatohepatitis, liver fibrosis and to cirrhosis in 15-40% of patients, an end-stage disease, a major cause of morbidity and mortality worldwide.

Alcoholic hepatitis is a severe and life-threatening form of alcohol-related liver disease. Alcoholic hepatitis (A-H) is a distinct clinical entity characterized by cholestasis, jaundice and liver failure that generally occurs after decades of heavy alcohol use. Recovery from AH is dictated by abstinence from alcohol, the presence of mild clinical symptoms and the implementation of appropriate therapy. Unfortunately, patients with severe AH have a high mortality rate of about 40% to 50% despite optimal medical management. A significant percentage of patients succumb to infections, with infection attributed mortality of 12% to 54%, underscoring a disrupted gut barrier with subsequent translocation of bacteria to extraintestinal sites. The gut microbiota promotes ethanol-induced liver disease in mice (Liopis et al., 2016).

SUMMARY

As described herein, cytolysin, a two-subunit bacteriocin secreted by *Enterococcus faecalis*, causes hepatocyte death and liver injury. Compared to non-alcoholic controls or patients with alcohol use disorder, patients with alcoholic hepatitis have increased fecal numbers of *E. faecalis*. The presence of cytolysin-positive (cytolytic) *E. faecalis* correlated with liver disease severity and mortality in patients with alcoholic hepatitis. The therapeutic effects of bacteriophages that target cytolytic *E. faecalis*, isolated from feces of patients with alcoholic hepatitis, were tested. It was found that these phages decrease cytolysin in liver and reduce ethanol-induced liver disease in mice. The findings link cytolytic *E. faecalis* with worse clinical outcomes and mortality in patients with alcoholic hepatitis. Bacteriophages provide a method to precisely edit the intestinal microbiota; and as some isolates can specifically target cytolytic *E. faecalis*, providing a new therapeutic approach for patients with alcoholic hepatitis.

Thus, fecal cytolysin produced by the bacterial species *Enterococcus faecalis* was determined to be an extremely good biomarker for outcome in an alcoholic hepatitis patient cohort. In one embodiment, a nucleic acid based amplification reaction, e.g., a PCR, of a stool sample results in a positive vs negative outcome. Essentially all positive patients eventually die within a few months (odds ratio 54). This test outperforms MELD in predicting mortality in AH patients, which is routinely used in clinical practice (ROC for MELD 0.7, ROC for Cytolysin 0.81). This was tested in 78-79 patients.

Therefore, the disclosure provides a method to predict time to death, to detect liver disease severity or to detect a need for therapy in a mammal with liver disease. The method includes detecting or determining a presence or an amount of *Enterococcus faecalis* cytolysin or cytolytic *Enterococcus faecalis* in a physiological sample, such as a fecal sample, wherein the presence or the amount of *Enterococcus faecalis* cytolysin or cytolytic *Enterococcus faecalis* is indicative of a decreased time to death, an increased risk of severe liver disease or a need for therapy in the mammal relative to a mammal that does not have liver disease or a mammal that does not have *Enterococcus faecalis* cytolysin or cytolytic *Enterococcus faecalis* in a corresponding sample. In one embodiment, the sample from the test mammal has at least 10-fold, 100-fold, 500-fold, 1000-fold, 2000-fold, 3000-fold or more *Enterococcus faecalis* than the sample from a control mammal. In one embodiment, the presence or amount of the large or the small subunit of cytolysin, or nucleic acid encoding the small or large, or both, is detected or determined. In one embodiment, the presence or amount of the large and/or the small subunit of cytolysin is detected or determined. In one embodiment, the presence or amount of nucleic acid encoding the large and/or the small subunit of cytolysin is detected or determined. In one embodiment, the presence or amount of *Enterococcus faecalis* cytolysin or cytolytic *Enterococcus faecalis* is indicative of mortality of the mammal within less than 6, 3, 2 or 1 months. In one embodiment, the presence or amount of *Enterococcus faecalis* cytolysin or cytolytic *Enterococcus faecalis* is indicative of acute or chronic liver failure. In one embodiment, the presence or amount of *Enterococcus faecalis* cytolysin or cytolytic *Enterococcus faecalis* is indicative of a need for therapy. In one embodiment, the presence or amount of *Enterococcus faecalis* cytolysin or cytolytic *Enterococcus faecalis* DNA or RNA in the sample is detected or determined. In one embodiment, an amplification reaction is employed to detect or determine cytolysin. In one embodiment, one or more primers are employed comprising GTAAAATAAGTAAAATCAAGAAAACTATTACTC (SEQ ID NO:1), CAAAAGAAGGACCAACAAGTTCTAATT (SEQ ID NO:2), CTGTTGCGGCGACAGCT (SEQ ID NO:3), CCACCAACCCAGCCACAA (SEQ ID NO:4) or a nucleotide sequence with at least 80% nucleotide sequence identity thereto, or any combination thereof. In one embodiment, the presence or amount of *Enterococcus faecalis* cytolysin or cytolytic *Enterococcus faecalis* in the sample is detected or determined using an antibody. In one embodiment, the presence or amount of *Enterococcus faecalis* cytolysin or cytolytic *Enterococcus faecalis* in the sample is detected or determined by detecting or determining the presence or amount of lanthionine. In one embodiment, the mammal has nonalcoholic steatohepatitis (NASH). In one embodiment, the mammal has liver cirrhosis. In one embodiment, the mammal has hepatitis. In one embodiment, the mammal has alcoholic hepatitis. In one embodiment, the mammal is a human. In one embodiment, the indicative amount is over 2 fold, 5 fold, 10 fold, 100 fold, or 1000 fold greater than the amount in a corresponding control mammal.

Also provided is a method to detect progression of liver disease in a mammal, comprising: detecting over time an amount of *Enterococcus* cytolysin or cytolytic *Enterococcus faecalis* in a fecal or blood sample of the mammal; and determining whether the amount over time increases. In one embodiment, the mammal is a human. In one embodiment, the amount of *Enterococcus faecalis* cytolysin or cytolytic *Enterococcus faecalis* DNA or RNA in the sample is detected. In one embodiment, an amplification reaction is employed. In one embodiment, the reaction employs one or more primers such as primers comprising GTAAAATAAGTAAAATCAAGAAAACTATTACTC (SEQ ID NO:1), CAAAAGAAGGAC-CAACAAGTTCTAATT (SEQ II) NO:2), CTGTTGCGGCGACAGCT (SEQ ID NO:3), CCAC-CAACCCAGCCACAA (SEQ ID NO:4) or a nucleotide sequence with at least 80% nucleotide sequence identity thereto, or any combination thereof.

Further provided is a method to treat alcoholic hepatitis, NASH, liver cirrhosis, or liver failure in a mammal. The method includes administering to the mammal an effective amount of a composition comprising one or more lytic phage specific for *Enterococcus faecalis*. In one embodiment, the mammal is a human. In one embodiment, the composition comprises a Myoviridae, Podoviridae, Spounaviridae or Siphoviridae phage, or any combination thereof. In one embodiment, one or more of the phage are isolated from the mammal, and optionally amplified, prior to administration. In one embodiment, one or more of the phage have broad host specificity, and/or is a genetically modified phage. In one embodiment, levels of *Enterococcus* cytolysin or cytolytic *Enterococcus faecalis* are monitored after administration of the composition. In one embodiment, a cocktail of lytic phage is administered. In one embodiment, the composition is orally administered. In one embodiment, the composition is a tablet. In one embodiment, the composition is a sustained release dosage form.

In addition, a method to monitor therapeutic efficacy in a mammal with liver disease is provided. The method includes providing a mammal with liver disease that is treated with a drug regimen or a liver transplant; and monitoring levels of *Enterococcus* cytolysin or cytolytic *Enterococcus faecalis* in the feces or blood of the mammal over time, wherein a decrease in *Enterococcus* cytolysin or cytolytic *Enterococcus faecalis* levels over time is indicative of efficacy. In one embodiment, levels of *Enterococcus* cytolysin nucleic acid are monitored. In one embodiment, levels of *Enterococcus* cytolysin DNA are monitored. In one embodiment, the drug comprises a steroid.

BRIEF DESCRIPTION OF THE FIGURES

FIGS. 3A-D. A) Fold-change in fecal *E. faecalis* in controls, AUD or alcoholic hepatitis samples. B) Percentage of controls, AUD or alcoholic hepatitis samples that are cytolysin positive. C) Percent survival of cytolysin negative versus cytolysin positive subjects. D) Sensitivity versus specificity for MELD model ROC curve and cytolysin model ROC curve.

FIGS. 4A-D. A) Table showing univariable logistic regression analysis of laboratory and clinical parameters associated with cytolysin. B) Table showing univariable logistic regression analysis of laboratory and clinical parameters associated with 90 day mortality. C) Table showing association of 90 day mortality with cytolysin. D) Demographic an laboratory results for controls, alcohol dependent pateints and patients with alcoholic hepatitis.

FIGS. 9A-D. Intestinal dysbiosis in patients with alcoholic hepatitis. (A) 16S rRNA sequencing of fecal samples from controls (n=14), patients with alcohol use disorder (AUD; n=43), or alcoholic hepatitis (n=75). The graph demonstrates the relative abundance of sequence reads in each genus. (B) Bacterial diversity (Shannon-Index and Simpson-Index) and richness (Chao-Richness) was calculated in controls (n=14), patients with AUD (n=43), or alcoholic hepatitis (n=75). All diversity and richness is significantly different between each group of samples. (C) Percentage of fecal samples positive for *E. faecalis* in controls (n=25), patients with AUD (n=38), or alcoholic hepatitis (n=82), assessed by qPCR. *E. faecalis* was detected in feces from 80% of patients with alcoholic hepatitis vs 36% of controls. (D) ROC curves and AUC for the comparison of 90-day mortality and MELD (left panel) and 90-day mortality and cytolysin positivity (right panel) in patients with alcoholic hepatitis (n=83). Results are expressed as median with range (B). P values are determined by permutational multivariate analysis of variance (PERMANOVA) followed by false discovery rate (FDR) procedures (A), or Kruskal-Wallis test with Dunn's post-hoc test (B). *P<0.05, P<0.01, *P<0.001, ****P<0.0001.

FIGS. 13A-K. Phages reduce translocation of cytolysin to the liver and reduce ethanol-induced liver disease Atp4a$^{Sl/Sl}$ mice. (A-K) Wild-type (WT) and their Atp4a$^{Sl/Sl}$ littermates were fed oral isocaloric (control) or chronic-binge ethanol diets and gavaged with vehicle (PBS), control phages against *C. crescentus* ($10^{10}$ PFUs), or a cocktail of 4 different phages targeting cytolytic *E. faecalis* ($10^{10}$ PFUs) 1 day before ethanol binge. (A) Serum levels of ALT. (B) Hepatic triglyceride content. (C) Representative oil red 0-stained liver sections. (D-F) Hepatic expression of mRNAs encoding inflammatory cytokines. (G) Proportions of cylL$_S$ detected in liver, measured by qPCR (Control diet: WT mice: PBS, n=7; *C. crescentus* phages, n=6; *E. faecalis* phages, n=5; Atp4a$^{Sl/Sl}$ mice: PBS, n=6; *C. crescentus* phages, n:=8; *E. faecalis* phages, n=7; Ethanol diet: WT mice: PBS, n=14; *C. crescentus* phages, n=12; *E. faecalis* phages, n=13; Atp4a$^{Sl/Sl}$ mice: PBS, n=15; *C. crescentus* phages, n=15; *E. faecalis* phages, n=15). (H) Fecal CFUs of *Enterococcus*. (I) Fecal samples were collected and 16S rRNA genes were sequenced. Principal coordinate analysis based on Jaccard dissimilarity matrices found no significant difference in fecal microbiota among mice given PBS, control phage, or phages targeting cytolytic *E. faecalis* in each group (Control diet: WT mice: PBS, n:=6; *C. crescentus* phages, n=6; *E. faecalis* phages, n=5; Atp4a$^{Sl/Sl}$ mice: PBS, n=6; *C. crescentus* phages, n=8; *E. faecalis* phages, n=7; Ethanol diet: WIT mice: PBS, n=14; *C. crescentus* phages, n=12; *E. faecalis* phages, n=13; Atp4a$^{Sl/Sl}$ mice: PBS, n=9; *C. crescentus* phages, n=9; *E. faecalis* phages, n=14). (J and K) Serum levels of ethanol and hepatic levels of Adh1 and Cyp2e1 m RNAs did not differ significantly among colonized mice after ethanol feeding. Scale bar=100 km. Results are expressed as mean±s.e.m (A-F, H, J, K). P values are determined by One-way ANOVA with Tukey's post-hoc test (A-F, H, J, K), Fisher's exact test followed by FDR procedures (G), or PERMANOVA followed by FDR procedures (i). *P<0.05, P<0.01, *P<0.001.

FIGS. 14A-B. Isolation and amplification of bacteriophages against cytolytic *E. faecalis* isolated from patients with alcoholic hepatitis. (A) BHI agar plates showing bacteriophage plaque morphology. (B) Transmission electron microscopy revealed that bacteriophages isolated were either siphophages (5_2, 5_4, 5_5, 5_6 and 2_6) or myophages (2_1 and 2_8). Phages specific to cytolytic *E. faecalis* strains isolated from feces of cytolysin-positive patients with alcoholic hepatitis were named as Efφ with patient number plus a digit (Ef for *E. faecalis*, φ for phage, last digit for isolation order). (Transmission electron microscopy graphs of bacteriophage 2_1 and 2_8, stained with phosphotungstic acid showing contracted tails. Scale bar=50 nm.

FIGS. 15A-D. Phages that target cytolytic *E. faecalis* reduce ethanol-induced liver disease in gnotobiotic mice. (A-D) C57BL/6 germ-free mice were colonized with feces from two different cytolysin-positive patients with alcoholic hepatitis (feces from 1 patient is used in FIG. 7). The mice were then fed oral isocaloric (control) or chronic-binge ethanol diets, and gavaged with vehicle (PBS), control phages against *C. crescentus* ($10^{10}$ PFUs), or a cocktail of 3 or 4 different phages targeting cytolytic *E. faecalis* ($10^{10}$ PFUs) 1 day before an ethanol binge. (A) Fecal CFUs of *Enterococcus*. (B) Fecal samples were collected and 16S rRNA genes were sequenced. Principal coordinate analysis based on Jaccard dissimilarity matrices shows no significant differences in fecal microbiota of mice gavaged with control phage and phages targeting cytolytic *E. faecalis* in each group (Control diet: Patient #5: *C. crescentus* phages, n=5; *E. faecalis* phages, n=5; Patient #2: *C. crescentus* phages, n=4; *E. faecalis* phages, n=5; Ethanol diet: Patient #5: *C. crescentus* phages, n=14; *E. faecalis* phages, n=16; Patient #2: *C. crescentus* phages, n=16; *E. faecalis* phages, n=15). (C and D) Serum levels of ethanol and hepatic levels of Adh1 and Cyp2e1 mRNAs did not differ significantly among colonized mice after ethanol feeding. Results are expressed as mean±s.e.m (A,C,D. P values are determined by One-way ANOVA with Tukey's post-hoc test (A,C,D), or PERMANOVA followed by FDR procedures (b). *P<0.05.

FIGS. 16A-C. Isolation and amplification of bacteriophages against non-cytolytic *E. faecalis* isolated from patients with alcoholic hepatitis. (A) BHI agar plates showing bacteriophage plaque morphology. (B) Transmission electron microscopy revealed that bacteriophages isolated were either podophages (6_1, 6_2, 6_3, 7_2, 73 and 7_4) or siphophages (6_4 and 7_1). Phages specific to non-cytolytic *E. faecalis* strains isolated from feces of cytolysin negative alcoholic hepatitis patients were named as Efφ with patient number plus a digit (Ef for *E. faecalis*, φ for phage, last digit for isolation order). Scale bar=50 nm. (C) Phylogenetic tree of all bacteriophages used in this study.

FIGS. 17A-K. Phages that target non-cytolytic *E. faecalis* do not reduce ethanol-induced liver disease in gnotobiotic mice. (A-K) C57BL/6 germfree mice were colonized with feces from two different cytolysin-negative patients with alcoholic hepatitis. Transplanted gnotobiotic mice were fed oral isocaloric (control) or chronic-binge ethanol diets and gavaged with vehicle (PBS), control phages against *C. crescentus* ($10^{10}$ PFUs), or a cocktail of 4 different phages targeting non-cytolytic *E. faecalis* ($10^{10}$ PFUs) 1 day before an ethanol binge (A) Serum levels of ALT. (B) Hepatic triglyceride content. (C) Representative oil red O-stained liver sections. (D-F) Hepatic levels of mRNAs encoding inflammatory cytokines. (G) Proportions of cylL$_S$ detected in liver, measured by qPCR (Control diet: Patient #6: *C. crescentus* phages, n=6; *E. faecalis* phages, n=6; Patient #7: *C. crescentus* phages, n=5; *E. faecalis* phages, n=6; Ethanol diet: Patient #6: *C. crescentus* phages, n=14; *E. faecalis* phages, n=15; Patient #7: *C. crescentus* phages, n=13; *E. faecalis* phages, n=13). (H) Fecal CFUs of *Enterococcus*. (I) Fecal samples were collected and 16S rRNA genes were sequenced. Principal coordinate analysis based on Jaccard dissimilarity matrices found no significant difference in fecal microbiota among mice gavaged with control phages and phages targeting cytolytic. *faecalis* in each group (Control diet: Patient #6: *C. crescentus* phages, n=5; *E. faecalis* phages, n=6; Patient #7: *C. crescentus* phages, n=4; *E. faecalis* phages, n=6; Ethanol diet: Patient #6: *C. crescentus* phages, n=13; *E. faecalis* phages, n=14; Patient #7: *C. crescentus* phages, n=13; *E. faecalis* phages, n=13). (J and K) Serum levels of ethanol and hepatic levels of Adh1 and Cyp2e1 rRNAs did not differ significantly among colonized mice after ethanol feeding. Scale bar=100 pr. Results are expressed as mean±s.e.m (A-F,H,J,K). P values are determined by One-way ANOVA with Turkey's post-hoc test (A-F,H,J,K), Fisher's exact test followed by FDR procedures (G), or PERMANOVA followed by FDR procedures (i). *P<0.0

FIGS. 18A-C. A) Demographic and laboratory results of controls, patients with AUD and patients with alcoholic hepatitis. B) Characteristics of alcoholic hepatitis patients for cytolysin analysis. C) univariable logistic regression analysis of laboratory and clinical parameters associated with cytolysin.

FIGS. 19A-B. Schematic of cytolysin short and long chains (SEQ ID Nos. 5 and 6).

DETAILED DESCRIPTION

Definitions

Figure 1A:
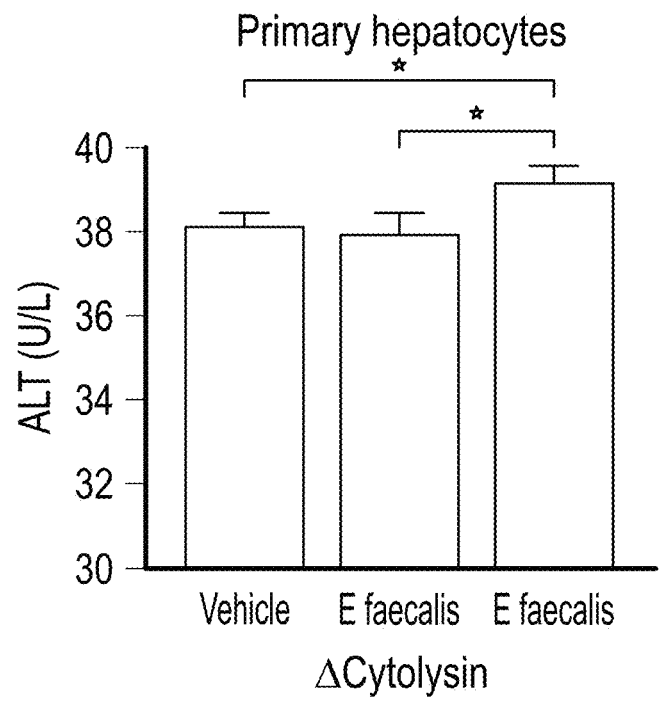
FIGS. 1A-B. ALT concentration in primary hepatocytes (A) or a mouse model (B) exposed to vehicle, *E. faecalis* with a deletion in the cytolysin gene, or *E. faecalis*.

As used herein, the term "isolated" in the context of phage or cytolysin refers to a phage or cytolysin which is separated from other molecules which are present in the natural source of the phage or cytolysin.

The term "purified" with respect to a bacteriophage means that the phage has been measurably increased in concentration by any purification process, including but not limited to, isolation from the environment or culture, e.g., isolation from culture following propagation and/or amplification, centrifugation, etc., thereby partially, substantially, nearly completely, or completely removing impurities, such as host cells and host cell components.

As used herein, the terms "therapeutic agent" and "therapeutic agents" refer to an agent, such as a bacteriophage or bacteriophage cocktail, that can be used in the treatment, management, or control of one or more symptoms of a disease or disorder.

As used herein, the terms "treat", "treatment" and "treating" refer to obtaining a therapeutic benefit in a subject receiving a pharmaceutical composition. With respect to achieving a therapeutic benefit, the object is to eliminate, lessen, decrease the severity of, ameliorate, or slow the progression of the symptoms or underlying cause (e.g., bacterial infection) associated with the pathological condition or disorder. A "therapeutically effective amount" refers to that amount of a therapeutic agent, such as a phage cocktail pharmaceutical composition, sufficient to achieve at least one therapeutic benefit in a subject receiving the composition.

As used herein, the terms "prevent", "prevention" and "preventing" refer to obtaining a prophylactic benefit in a subject receiving a pharmaceutical composition. With respect to achieving a prophylactic benefit, the object is to delay or prevent the symptoms or underlying cause (e.g., bacterial infection) associated with the pathological condition or disorder. A "prophylactically effective amount" refers to that amount of a prophylactic agent, such as a phage cocktail composition, sufficient to achieve at least one prophylactic benefit in a subject receiving the composition.

Diagnostic, Predictive and Detection Methods

As described herein, the presence or amount of *E. faecalis* cytolysin or cytolytic *Enterococcus faecalis* in a physiological sample, such as a fecal sarape, was found to be useful to predict whether a mammal has a short life expectancy, e.g., due to the severity of disease in the mammal, including liver disease. The presence or amount of *E. faecalis* cytolysin or cytolytic *Enterococcus faecalis* in a physiological sample, such as a fecal sample, may also be useful to determine whether a mammal is in liver failure, whether liver disease is progressing, whether intervention is warranted or whether a therapy is effective.

The presence or amount of *E. faecalis* cytolysin or cytolytic *Enterococcus faecalis* in a physiological sample may be detected by any means, direct or indirect. For example, the presence or amount of the large subunit of *E. faecalis* cytolysin or the small subunit of *E. faecalis* cytolysin, or both, may be detected using an antibody to cytolysin. The presence or amount of *E. faecalis* cytolysin or cytolytic *Enterococcus faecalis* in a physiological sample may be detected by detecting lanthionine. The presence or amount of *E. faecalis* cytolysin or cytolytic *Enterococcus faecalis* in a physiological sample may be detected by detecting RNA that encodes the large subunit, the small subunit, or both, of *E. faecalis* cytolysin, or detecting genomic DNA that encodes the large subunit, the small subunit, or both, *E. faecalis* cytolysin. In one embodiment, the method detects *E. faecalis* cytolysin or cytolytic *Enterococcus faecalis*, e.g., in bacteria found in human intestines, but not the cytolysin of closely related organisms, e.g. *E. lactis, E. caccae, E. avium, E. canis, E. durans, E. ratti* or other bacterial species found in the gut.

In one embodiment, any primer may be employed to detected *E. faecalis* cytolysin nucleic acid, e.g., that encodes the large subunit or the small submit, e.g., one encoding SEQ ID NO:5 or SEQ ID NO:6 (FIG. 19). In one embodiment, one or more oligonucleotides are employed as primers in a nucleic acid amplification reaction. In one embodiment, at least one of the oligonucleotides has a length of about 5 to about 50, about 10 to about 25, about 15 to about 40, or about 15 to about 25 nucleotides. In one embodiment, at least one of the oligonucleotides has about 70%, 72&, 75%, 77%, 80%, 82%, 85%, 88%, 89%, 90%, 92%, 95%, 98% or more nucleic acid identity to one of GTAAAATAAGTJAAAATCAAGAAAACTATTACTC (SEQ ID NO):1), CAAAAGAAGGAC-CAACAAGTTCTAATT (SEQ ID NO:2), CTGTTGCGCCGACAGCT (SEQ ID NO:3), CCAC-CAACCCAGCCACAA (SEQ ID NO:4). Thus, oligonucleotides within the scope of this disclosure include those having 1, 2, 3, 4, 5, or 6 nucleotide substitutions, lengths that are shorter, e.g., by 1, 2, 3, 4, 5, 6, 7, 8, 9 or 10 nucleotides, or lengths greater than, one of SEQ ID Nos, 1-4, or a combination thereof.

Mammals having cytolytic *E. faecalis* detected in a physiological sample may be subjected to therapy, including phage therapy, to reduce the number of *E. faecalis*.

Phage Therapy

Bacteriophages, or phages for short, are viruses infecting bacteria that usually have a narrow host range. During infection of a bacterium, a phage has two principal life cycles it can enter—the lytic cycle and the lysogenic cycle. Both cycles are initiated by the attachment of the phage to a surface structure, which usually is species- and even strain-specific. After attachment, the phage injects its genetic material, which could be either DNA or RNA. After this injection, the phage can enter several different life cycles, with the lytic and lysogenic life cycle being the most common.

While all phages are capable of entering the lytic cycle (virulent phages), some phages (temperate phages) can also enter the lysogenic cycle. The lytic cycle results in production of phage particles; at the end of the cycle, the lysis cassette of the phage is expressed: this results in bacterial lysis and eventually in the release of new mature phage progeny.

Naturally occurring lytic phages are known for their antibacterial potential. To use bacteriophages as a therapeutic agent, naturally occurring bacteriophages that are able to lyse/kill *Enterococcus faecalis* were isolated. Germ-free mice were colonized with feces from a patient with AH. Using a chronic-plus-binge model of alcoholic liver disease, AH can be ameliorated using a personalized medicine approach with bacteriophages targeting *Enterococcus faecalis*. Phage therapy is safe and has been used in many clinical trials.

Exemplary phage useful in the therapeutic method include but are not limited to: those in any phage family that infects and optionally lyses or otherwise decreases the viability and/or replicative capacity of *Enterococcus faecalis*, e.g., EFDG1 (Khalifa et al., *Appl. Environ. Microbiol.*, DOI: 10.1128/AEM.00096.15), φEf11 or variants thereof (see Zhang et al., *Microbiology*, 159:1023 (2013), IME-EFI (Zhang et al., *PloS One*, doi.org/10.1371/journal-.pone.0080435), including Myoviridae (non-enveloped, with head-tail (with a neck) geometries, and genomes are linear, double-stranded DNA, around 33-244 kb in length), Podoviridae (non-enveloped, with icosahedral and head-tail geometries where the double stranded DNA genome is linear, around 40-42 kb in length), Siphoviridae (non-enveloped, with icosahedral and head-tail geometries or a prolate capsid; genomes are double stranded and linear, around 50 kb in length).

The table below lists exemplary phage for use in the therapeutic methods:

| Phages of *E. faecalis* | Lytic/lysogenic phage | Accession number | Family |
|---|---|---|---|
| phiEF24C | Lytic | AP009390.1 | Myoviridae |
| ECP3 | Lytic | KJ801817.1 | Myoviridae |
| IME-EF1 | Lytic | KF1920531 | Siphoviridae |
| SAP6 | | JF731128.1 | Siphoviridae |
| BC611 | | AB712291.1 | Siphoviridae |
| EfaCPT1 | | JX193904.1 | Siphoviridae |
| EFDG1 | Lytic | KP339049.1 | Myoviridae |
| EFLK1 | Lytic | KR049063.1 | Myoviridae |
| Q69 | | | |
| Phi4D | | | Myoviridae |
| IME__EF3 | Lytic | KF728385 | Siphoviridae |
| EFRM31 | Lytic | GU815339 | Siphoviridae |
| EFRM42 | Lytic | | Siphoviridae |
| EFRM54 | Lytic | | Siphoviridae |
| PhiFL1A | Lysogenic | GQ478081 | Siphoviridae |
| PhiFL1B | Lysogenic | GQ478082 | Siphoviridae |
| PhiFL1C | Lysogenic | GQ478083 | Siphoviridae |
| PhiFL2A | Lysogenic | GQ478084 | Siphoviridae |
| PhiFL2B | Lysogenic | GQ478085 | Siphoviridae |
| PhiFL3A | Lysogenic | GQ478086 | Siphoviridae |
| PhiFL3B | Lysogenic | GQ478087 | Siphoviridae |
| PhiFL4A | Lysogenic | GQ478088 | Siphoviridae |
| EFC-1 | Lysogenic | KJ608188 | Siphoviridae |

Exemplar Compositions and Therapeutic Methods

Thus, phage with the capacity of infecting bacteria and specifically, lytic phages, through infection of host bacteria, and are capable of decreasing populations of its host (target) bacteria without affecting other non-target bacterial strains, are useful in compositions and the methods described herein. By using more than one phage isolate or strain with a different specificity, resistance to the combination of phage is less likely. In one embodiment, the phage are employed that bind to different receptors (e.g., using a phage cocktail), to lower the risk of developing resistance.

In the present disclosure, the choice of the lytic phage specific for *E. faecalis* decreases the population of target bacteria. Thus, phage can be employed to treat disorders associated with *E. faecalis*, such as liver disease. The phage is administered using, for instance, a delivery vehicle, such as a tablet, systemically or locally.

In one aspect, a composition comprising one phage isolate is employed. In one aspect, the composition comprises phage cocktails. In some embodiments, the composition comprises at least two different isolated strains of phage. In another aspect, the composition comprises a phage cocktail and a pharmaceutically acceptable carrier. In some embodiments, the pharmaceutical composition is formulated for systemic or local application. In some embodiments, the pharmaceutical composition comprises a sterile buffer, e.g., a buffer comprising about 0.05 M Tris-HCl, about 0.1M NaCl, and about 10 mM $MgSO_4$. In some embodiments, the composition further comprises an additional agent, e.g., an agent selected from the group consisting of an antibiotic agent, an anti-inflammatory agent, an antiviral agent, a local anesthetic agent, and a corticosteroid. In some embodiments, the composition is for use in treating a bacterial infection, and each of the phage strains is present in the composition in an amount corresponding to $10^3$ to $10^{20}$ phage particles. In one embodiment, the daily dosage may be from $10^3$ to $10^{10}$ phage particles, $10^5$ to $10^{10}$ phage particles, $10^{10}$ to $10^{20}$ phage particles, $10^5$ to $10^{20}$ phage particles, or $10^{20}$ to $10^{25}$ phage particles. The daily dosage may be administered in one or more doses. In some embodiments, each of the phage strains is present in the composition in an amount corresponding to $10^3$ to $10^5$ phage, $10^5$ to $10^8$ phage, $10^5$ to $10^{10}$ phage, or $10^7$ to $10^9$ phage. In some embodiments, the subject is a mammal, e.g., a human. In some embodiments, the treatment comprises administering a tablet or other orally compatible delivery vehicle having the composition.

In one aspect, cocktail compositions of different phage strains are administered to a human with liver disease, e.g., associated with alcohol use. The "cocktail" may comprise at least two different isolated strains of phage, for example, two, three, four, five, six, seven, eight, nine, ten, or more different isolated bacteriophage strains. The cocktail may be used alone or in further combination with other therapies, e.g., antibiotic agents and/or growth factors. In some embodiments, the phage cocktail comprises at least 2 phage strains, at least 3 phage strains, at least 4 phage strains, at least 5 phage strains, at least 6 phage strains, at least 7 phage strains, at least 8 phage stains, at least 9 phage strains, at least 10 phage strains, or more. In some embodiments, the phage cocktail comprises 2-20 phage strains, 2-15 phage strains, 2-10 phage strains, 3-8 phage strains, or 4-6 phage strains. In more embodiments, the combination does not impair or reduce (or does not substantially or significantly impair or reduce) infecting ability and/or lytic activity of the individual bacteriophage in the presence of distinct bacteriophage strains The phage or phage cocktails are incorporated into a composition for the use in treatment of a disease. A cocktail of different phage strains, or a single phage isolate, may be combined with a pharmaceutically acceptable carrier, such as an excipient or stabilizer, e.g., to form a tablet. Examples of pharmaceutically acceptable carriers, excipients, and stabilizers include, but are not limited to, buffers such as phosphate, citrate, and other organic acids; antioxidants including ascorbic acid; low molecular weight polypeptides; proteins, such as serum albumin and gelatin; hydrophilic polymers such as polyvinylpyrrolidone; amino acids such as glycine, glutamine, asparagine, arginine or lysine; monosaccharides, disaccharides, and other carbohydrates including glucose, mannose, or dextrins; sugar alcohols such as mannitol or sorbitol; salt-forming counterions such as sodium.

The bacteriophage or cocktail compositions may also be combined with one or more non-phage therapeutic and/or prophylactic agents, useful for the treatment and/or prevention of bacterial infections, as known in the art (e.g. one or more antibiotic agents). Other therapeutic and/or prophylactic agents that may be used in combination with the phage or phage cocktails include, but are not limited to, antibiotic agents, anti-inflammatory agents, antiviral agents, and corticosteroids. In some embodiments, the phage or phage cocktail is administered in the absence of a non-phage based antibiotic agent.

Standard antibiotics that may be used with pharmaceutical compositions comprising a phage cocktail include, but are not limited to, amikacin, gentamicin, kanamycin, neomycin, netilmicin, paromomycin, rhodostreptomycin, streptomycin, tobramycin, apramycin, rifamycin, naphthomycin, mupirocin, geldanamycin, ansamitocin, carbacephems, imipenem, meropenem, ertapenem, faropenem, doripenem, panipenem/betamipron, biapenem, PZ-601, cephalosporins, cefacetrile, cefadroxil, cefalexin, cefaloglycin, cefalonium, cefaloridine, cefalotin, cefapirin, cefatrizine, cefazaflur, cefazedone, cefazolin, cefradine, cefroxadine, ceftezole, cefaclor, cefonicid, cefprozil, cefuroxime, cefuzonam, cefnietazole, cefotetan, cefoxitin, cefcapene, cefdaloxime, cefdinir, cefditoren, cefetamet, cefixime, cefmenoxime, cefteram, ceftibuten, ceftiofur, ceftiolene, ceftizoxime, ceftriaxone, cefoperazone, ceftazidime latamoxef, cefclidine, cefepime, cefluprenam, cefoselis, cefozopran, cefpirome, cefquinome, flomoxef, ceftobiprole, azithromycin, clarithromycin, dirithromycin, erythromycin, roxithromycin, aztreonam, pencillin and penicillin derivatives, actinomycin, bacitracin, colistin, polymyxin B, cinoxacin, flumequine, nalidixic acid, oxolinic acid, piromidic acid, pipemidic acid, rosoxacin, ciprofloxacin, enoxacin, leroxacin, lomefloxacin, nadifloxacin, nortloxacin, ofloxacin, pefloxacin, rufloxacin, balofloxacin, gatifloxacin, grepafloxacin, levofloxacin, moxifloxacin, pazufloxacin, sparfloxacin, temafloxacin, tosufloxacin, clinafloxacin, garenoxacin, gemifloxacin, stifloxacin, trovalfloxacin, prumlifloxacin, acetazolamide, benzolamide, bumetanide, celecoxib, chlorthalidone, clopamide, dichlorphenamide, dorzolamide, ethoxyzolamide, furosemide, hydrochlorothiazide, indapamide, mafendide, mefruside, metolazone, probenecid, sulfacetamide, sulfadimethoxine, sulfadoxine, sulfanilamides, sulfamethoxazole, sulfasalazine, sultiame, sumatriptan, xipamide, tetracycline, chlortetracycline, oxytetracycline, doxycycline, lynecycline, meclocycline, methacycline, minocycline, rolitetracycline, methicillin, nafcillin, oxacilin, cloxacillin, vancomycin, teicoplanin, clindamycin, co-trimoxazole, flucloxacillin, dicloxacillin, ampicillin, amoxicillin and any combination thereof in amounts that are effective to additively or synergistically enhance the therapeutic effect of a composition having phage for a given infection.

In one embodiment, the compositions generally may include a sterile buffer, such as a sterile PBS, water, or saline buffer. One particular buffer comprises Tris-HCl, NaCl, and/or $MgSO_4 7H_2O$, e.g., about 0.05 M Tris-HCl (pH 7.4-7.5), about 0.1 M NaCl, and/or about 10 nM $MgSO_4 7H_2O$. In other embodiments, the formulation further comprises a buffer and 10 mM $MgCl_2$. In other embodiments, the phage containing formulation further comprises a buffer having about 5 mM to about 15 mM $CaCl_2$), e.g., about 10 mM $CaCl_2$.

In some embodiments, compositions are provided in a hermetically sealed container.

In one embodiment, the phage are formulated as an aqueous solution or gel. The composition may include water; esters, isopropyl myristate and isopropyl palmitate; ethers such as dicapryl ether and dimethyl isosorbide; alcohols such as ethanol and isopropanol; fatty alcohols such as cetyl alcohol, cetearyl alcohol, stearyl alcohol and biphenyl alcohol; isoparaffins such as isooctane, isododecane and is hexadecane; silicone oils such as cyclomethicone, dimethicone, dimethicone cross-polymer, polysiloxanes and their derivatives, e.g., organomodified derivatives; polyols such as propylene glycol, glycerin, butylene glycol, pentylene glycol and hexylene glycol; or any combinations or mixtures of the foregoing. Aqueous vehicles may include one or more solvents miscible with water, including lower alcohols, such as ethanol, isopropanol, and the like.

Formulations and Dosages

The phage or cocktails thereof, can be formulated as pharmaceutical compositions and administered to a mammalian host, such as a human patient in a variety of forms adapted to the chosen route of administration, e.g., orally or parenterally, by intravenous, intramuscular, or subcutaneous routes. In one embodiment, the phage or cocktails thereof may be administered as a tablet.

In one embodiment, the phage or cocktails thereof may be administered by infusion or injection. Solutions of the phage or cocktails thereof can be prepared in water, optionally mixed with a nontoxic surfactant. Dispersions can also be prepared in glycerol, liquid polyethylene glycols, triacetin, and mixtures thereof and in oils. Under ordinary conditions of storage and use, these preparations contain a preservative to prevent the growth of microorganisms.

The pharmaceutical dosage forms suitable for injection or infusion may include sterile aqueous solutions or dispersions or sterile powders comprising the active ingredient which are adapted for the extemporaneous preparation of sterile injectable or infusible solutions or dispersions, optionally encapsulated in liposomes. In all cases, the ultimate dosage form should be sterile, fluid and stable under the conditions of manufacture and storage. The liquid carrier or vehicle can be a solvent or liquid dispersion medium comprising, for example, water, ethanol, a polyol (for example, glycerol, propylene glycol, liquid polyethylene glycols, and the like), vegetable oils, nontoxic glyceryl esters, and suitable mixtures thereof. The proper fluidity can be maintained, for example, by the formation of liposomes, by the maintenance of the required particle size in the case of dispersions or by the use of surfactants. The prevention of the action of microorganisms can be brought about by various antibacterial and antifungal agents, for example, parabens, chlorobutanol, phenol, sorbic acid, thimerosal, and the like. In many cases, it may include isotonic agents, for example, sugars, buffers or sodium chloride. Prolonged absorption of the injectable compositions can be brought about by the use in the compositions of agents delaying absorption, for example, aluminum monostearate and gelatin.

The phage or cocktails thereof optionally in combination with another active compound may be administered parenterally, for example, intravenously, orally, intraperitoneally, intramuscularly, or subcutaneously. Such administration may be as a single bolus injection, multiple injections, or as a short- or long-duration infusion. Implantable devices (e.g., implantable infusion pumps) may also be employed for the periodic parenteral delivery over time of equivalent or varying dosages of the particular formulation. For such parenteral administration, the compounds (a conjugate or other active agent) may be formulated as a sterile solution in water or another suitable solvent or mixture of solvents. The solution may contain other substances such as salts, sugars (particularly glucose or mannitol), to make the solution isotonic with blood, buffering agents such as acetic, citric, and/or phosphoric acids and their sodium salts, and preservatives.

Thus, the phage or cocktails thereof or in combination with another active agent, may be systemically administered, e.g., orally, in combination with a pharmaceutically acceptable vehicle such as an inert diluent or an assimilable edible carrier. They may be enclosed in hard or soft shell gelatin capsules, may be compressed into tablets, or may be incorporated directly with the food of the patient's diet. For oral therapeutic administration, the phage or cocktails thereof optionally in combination with an active compound may be combined with one or more excipients and used in the form of ingestible tablets, buccal tablets, troches, capsules, elixirs, suspensions, syrups, wafers, and the like. Such compositions and preparations should contain at least 0.1% of active compound. The percentage of the compositions and preparations may, of course, be varied and may conveniently be between about 2 to about 60% of the weight of a given unit dosage form. The amount of conjugate and optionally other active compound in such useful compositions is such that an effective dosage level will be obtained.

The tablets, troches, pills, capsules, and the like may also contain the following: binders such as gum tragacanth, acacia, corn starch or gelatin; excipients such as dicalcium phosphate; a disintegrating agent such as corn starch, potato starch, alginic acid and the like; a lubricant such as magnesium stearate; and a sweetening agent such as sucrose, fructose, lactose or aspartame or a flavoring agent such as peppermint, oil of wintergreen, or cherry flavoring may be added. When the unit dosage form is a capsule, it may contain, in addition to materials of the above type, a liquid carrier, such as a vegetable oil or a polyethylene glycol. Various other materials may be present as coatings or to otherwise modify the physical form of the solid unit dosage form. For instance, tablets, pills, or capsules may be coated with gelatin, wax, shellac or sugar and the like. A syrup or elixir may contain the active compound, sucrose or fructose as a sweetening agent, methyl and propylparabens as preservatives, a dye and flavoring such as cherry or orange flavor. Of course, any material used in preparing any unit dosage form should be pharmaceutically acceptable and substantially non-toxic in the amounts employed. In addition, the phage or cocktails thereof optionally in combination with another active compound may be incorporated into sustained-release preparations and devices.

The phage or cocktails thereof optionally in combination with another active compound may also be administered intravenously or intraperitoneally by infusion or injection. Solutions of the phage or cocktails thereof optionally in combination with another active compound or its salts can be prepared in water, optionally mixed with a nontoxic surfactant. Dispersions can also be prepared in glycerol, liquid polyethylene glycols, triacetin, and mixtures thereof and in oils. Under ordinary conditions of storage and use, these preparations contain a preservative to prevent the growth of microorganisms.

The pharmaceutical dosage forms suitable for injection or infusion can include sterile aqueous solutions or dispersions or sterile powders comprising the active ingredient which are adapted for the extemporaneous preparation of sterile injectable or infusible solutions or dispersions, optionally encapsulated in liposomes. In all cases, the ultimate dosage form should be sterile, fluid and stable under the conditions of manufacture and storage. The liquid carrier or vehicle can be a solvent or liquid dispersion medium comprising, for example, water, ethanol, a polyol for example, glycerol, propylene glycol, liquid polyethylene glycols, and the like), vegetable oils, nontoxic glyceryl esters, and suitable mixtures thereof. The proper fluidity can be maintained, for example, by the formation of liposomes, by the maintenance of the required particle size in the case of dispersions or by the use of surfactants. The prevention of the action of microorganisms during storage can be brought about by various antibacterial and antifungal agents, for example, parabens, chlorobutanol, phenol, sorbic acid, thimerosal, and the like. In many cases, it may be useful to include isotonic agents, for example, sugars, buffers or sodium chloride. Prolonged absorption of the injectable compositions can be brought about by the use in the compositions of agents delaying absorption, for example, aluminum monostearate and gelatin.

The invention will be further described by the following non-limiting examples.

Example

Methods

Patient Cohorts 26 subjects without alcohol use disorder (controls), 44 patients with alcohol use disorder, and 88 patients with alcoholic hepatitis were evaluated. Patients fulfilling the DSM IV criteria (Ball et al., 1997) of alcohol dependence and with active alcohol consumption (self-reported >60 g/day) were recruited in a clinic with an alcohol treatment program and compared to individuals without alcohol dependency (non-alcoholic controls; social drinkers consuming less than 20 g/day). Non-alcoholic controls or patients with alcohol use disorder did not take antibiotics or immunosuppressive medication during the two months preceding enrollment. Other exclusion criteria were diabetes, inflammatory bowel disease, known liver disease of any other etiology, and clinically significant cardio-vascular, pulmonary or renal co-morbidities. Alcoholic hepatitis patients were enrolled from the InTeam Consortium (ClinicalTrials.gov identifier number: NCT02075918) from 12 participating centers in the US, Mexico, Canada, United Kingdom, France and Spain. Inclusion criteria were: 1. Age >18 years and ≤70 years, 2. Active alcohol abuse (>50 g/day for men and >40 g/day for women) in the last 3 months, 3. Aspartate aminotransferase (AST)>alanine aminotransferase (ALT) and total bilirubin >3 mg/dl in the past 3 months, 4. Liver biopsy and/or clinical picture consistent with alcoholic hepatitis. Exclusion criteria were: 1. Autoimmune liver disease (ANA>1/320), 2. Chronic viral hepatitis, 3. Hepatocellular carcinoma, 4. Complete portal vein thrombosis, 5. Extrahepatic terminal disease, 6. Pregnancy, and 7. Lack of signed informed consent (Brandl et al., 2018). In all patients, the clinical picture was consistent with alcoholic hepatitis and in patients who underwent liver biopsy, the histology was in line with the diagnosis of alcoholic hepatitis. For 3 patients who underwent liver transplantation, the transplantation date was considered as date of death. The baseline characteristics of the cohort with alcoholic hepatitis are shown in FIGS. 18A-B. Fecal 16S rRNA sequencing, *Enterococcus* culture and qPCR for cytolysin were performed. The MELD score was calculated from all patients from whom bilirubin level, JNR, and creatinine level was available. The protocol was approved by the Ethics Committee of each participating center and patients were enrolled after written informed consent was obtained from each patient.

Mice

Figure 6A:
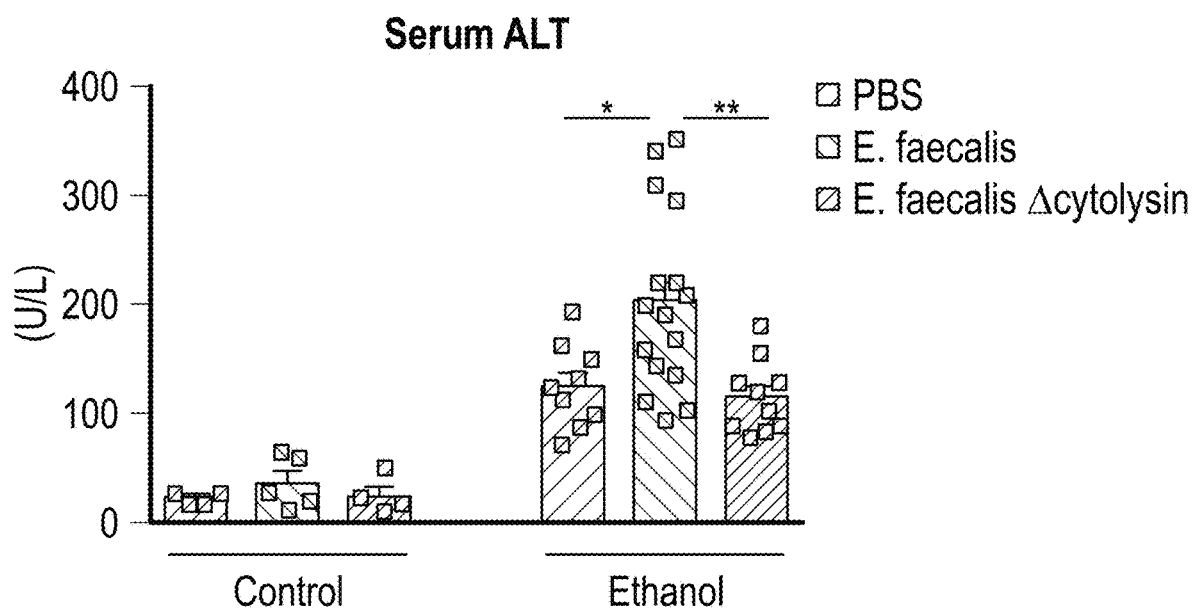
Figure 6B:
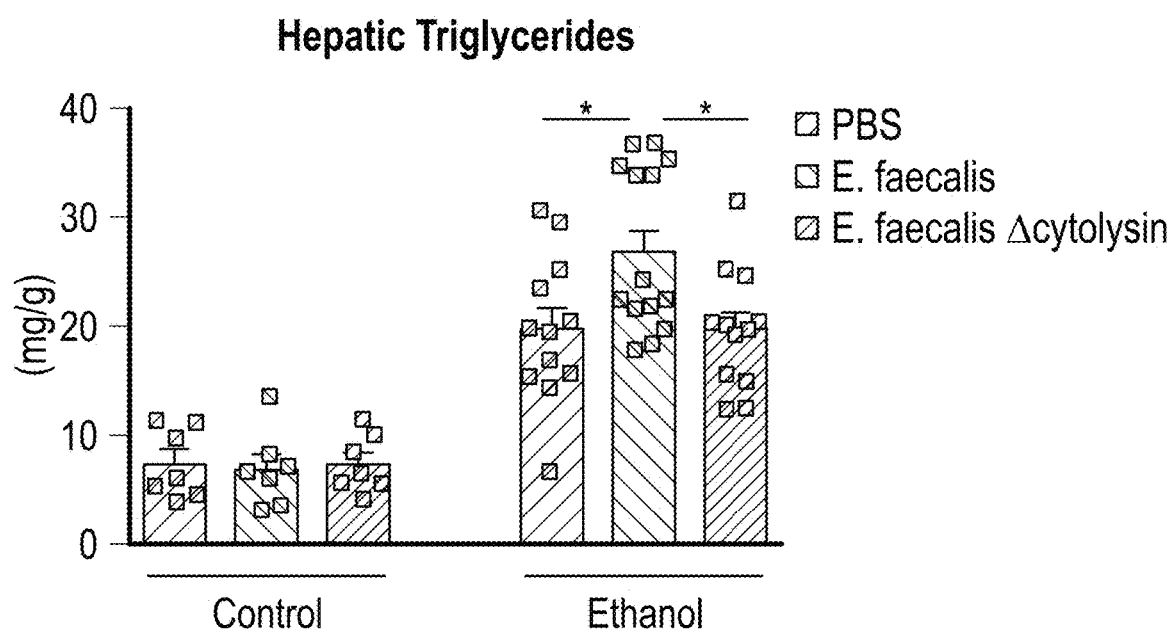
Figure 6C:
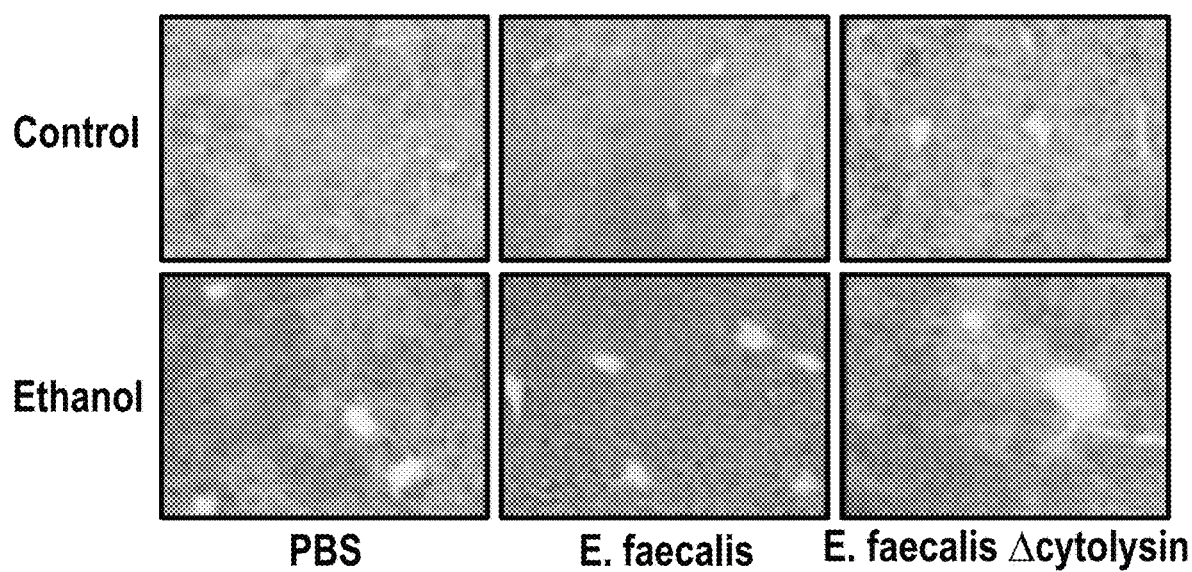
Figure 6D:
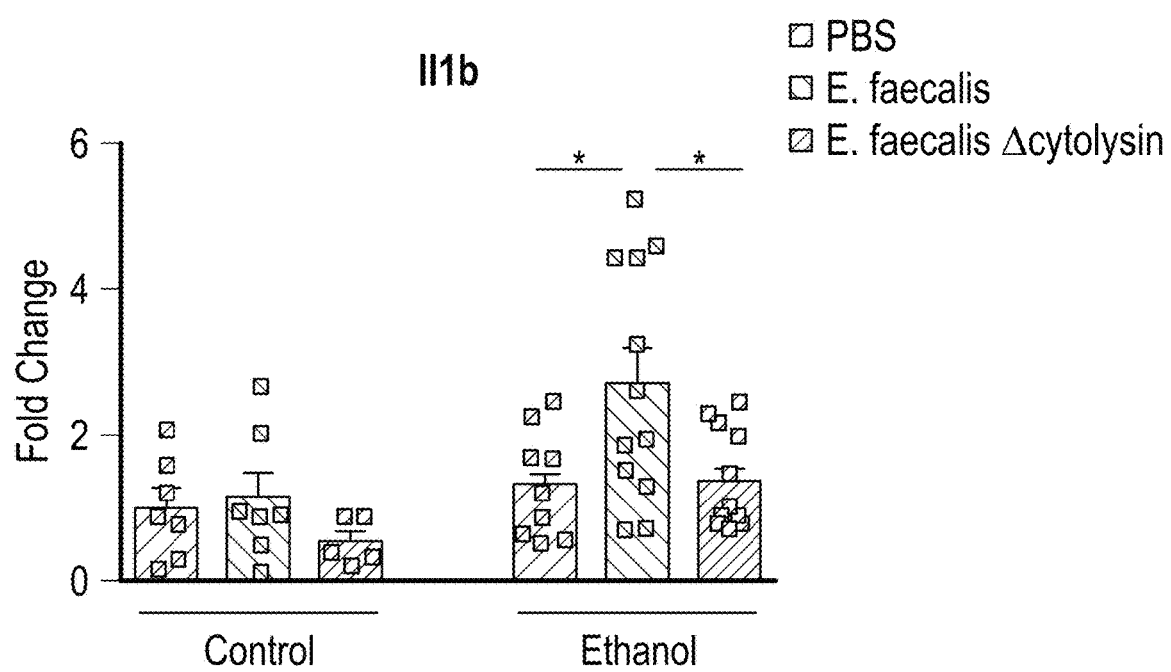
Figure 6E:
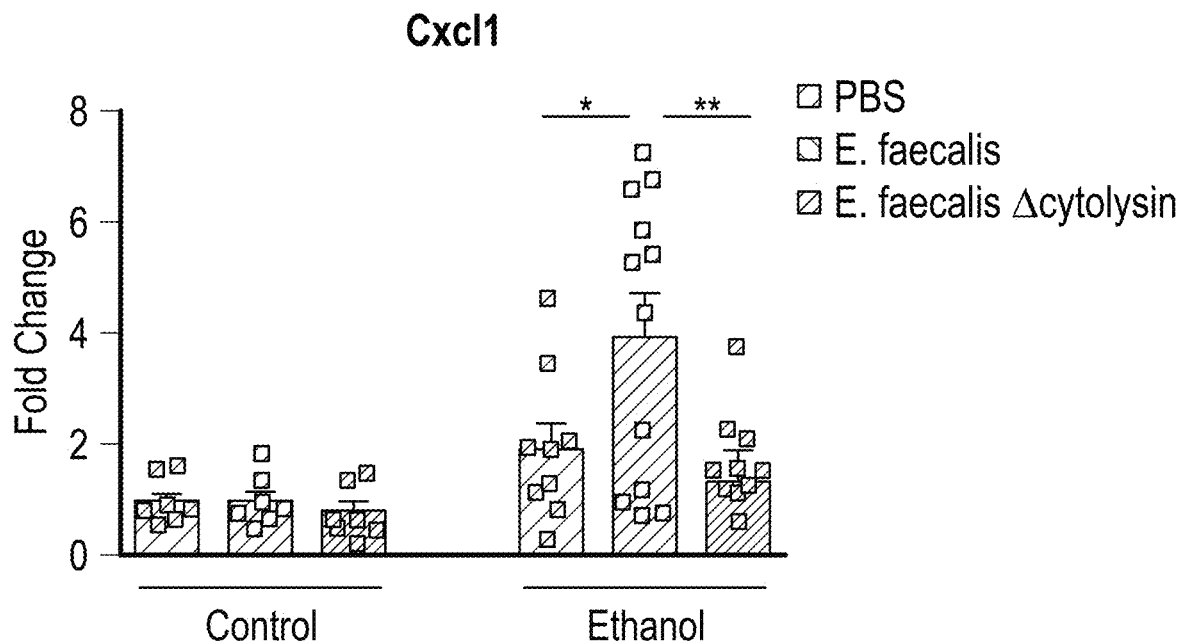
Figure 6F:
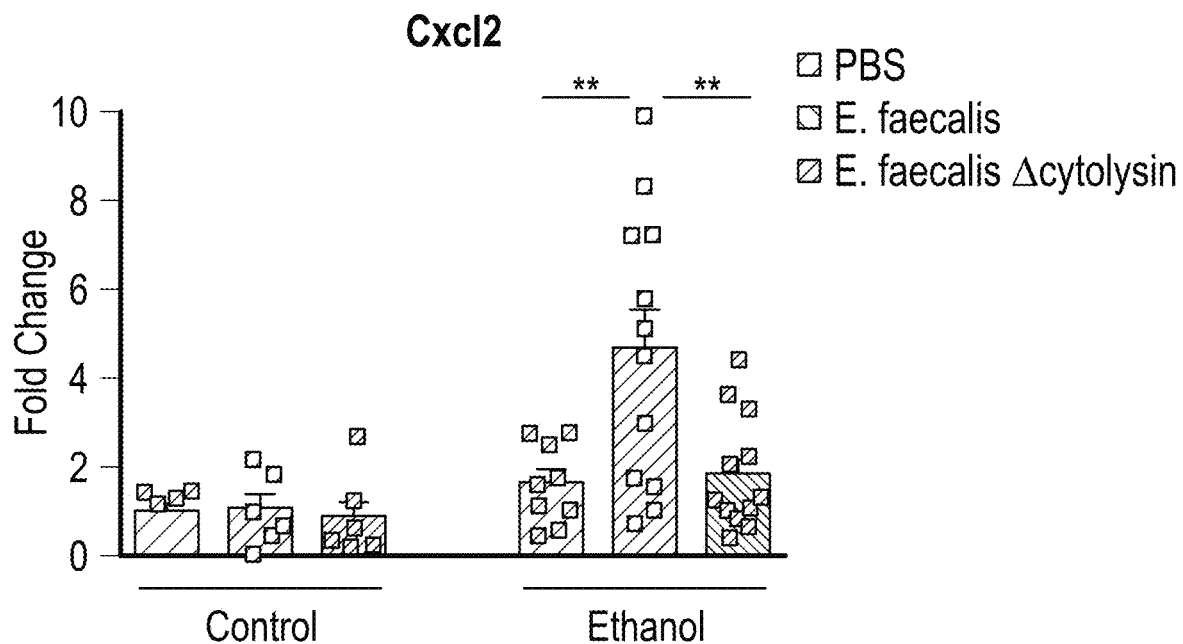
Figure 6G:
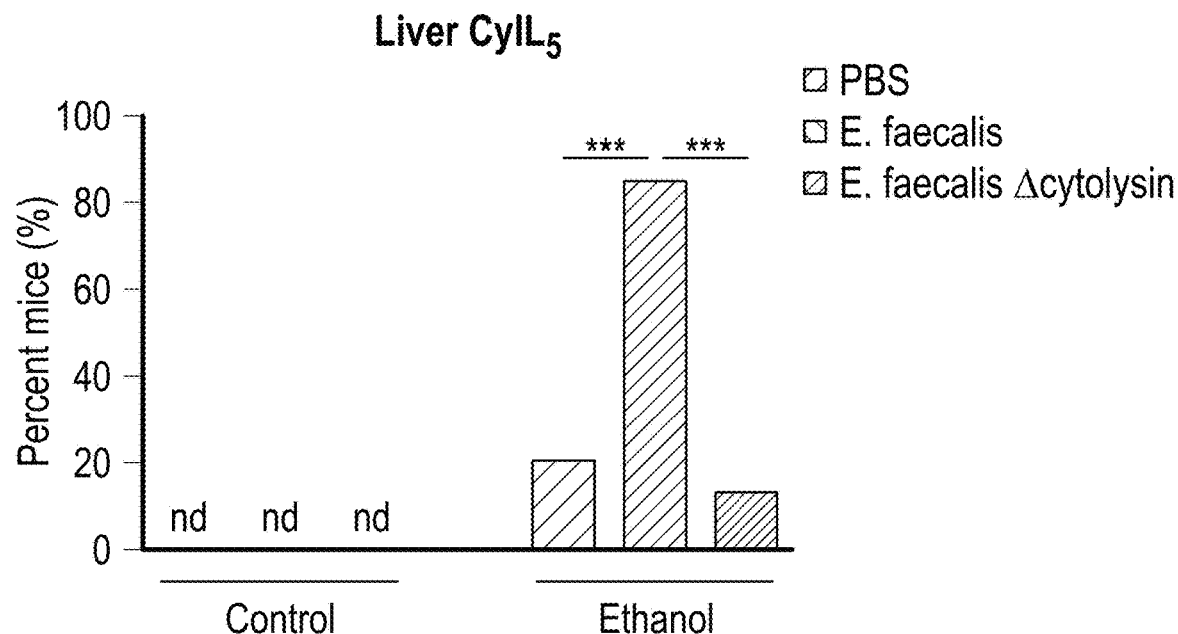
Figure 6H:
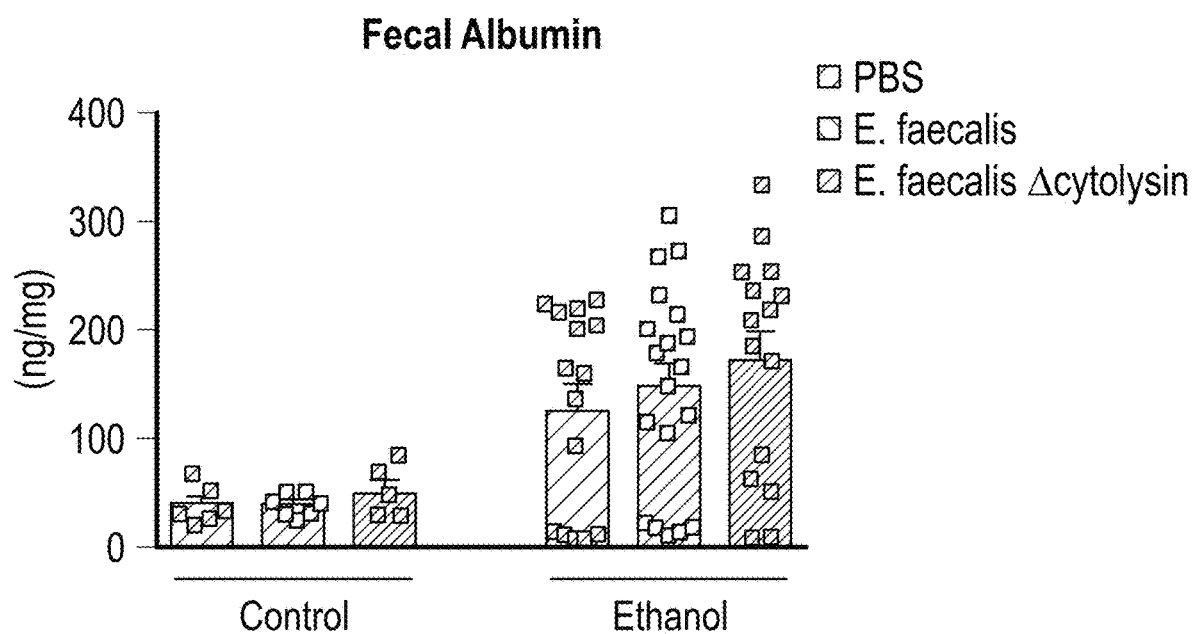
Figure 6I:
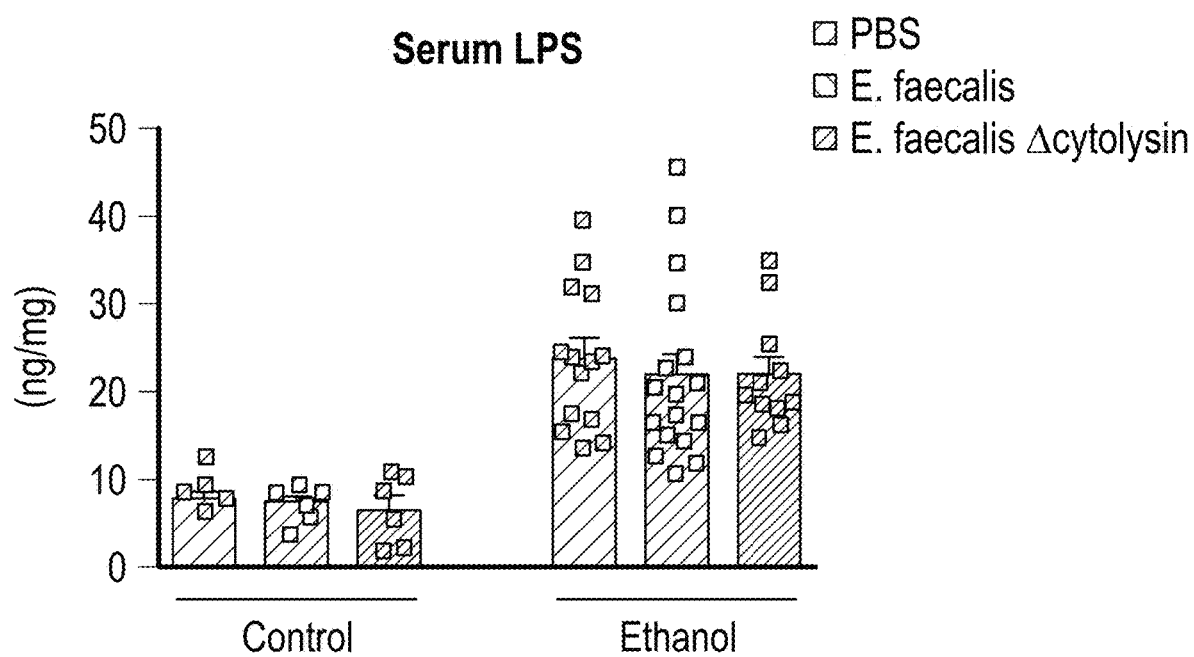
Figure 7A:
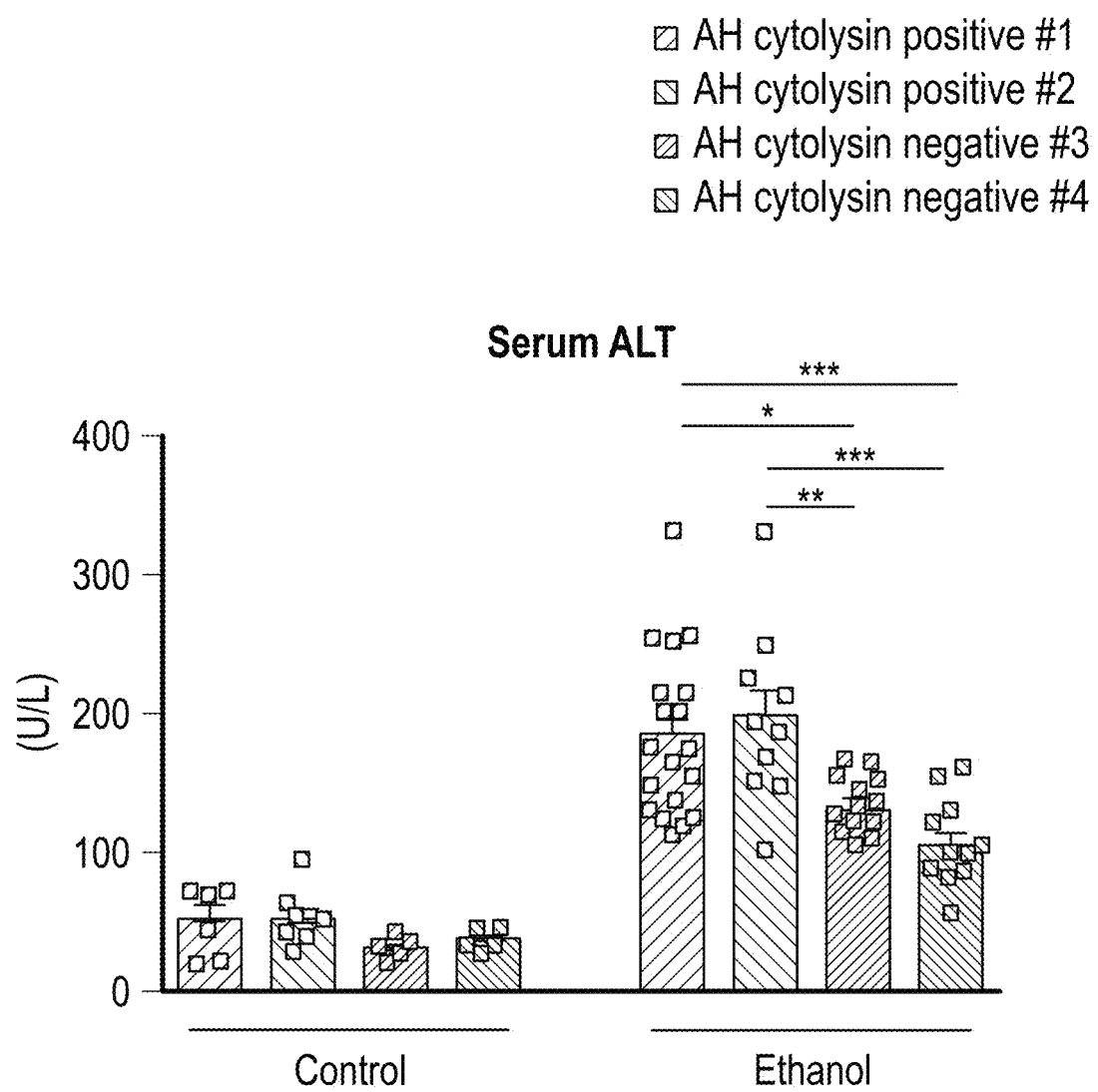
FIGS. 7A-H. Transplantation of feces from cytolysin-positive patients with alcoholic hepatitis exacerbates ethanol-induced liver disease in gnotobiotic mice. (A-G) C57BL/6 germfree mice were colonized with feces from two different cytolysin-positive and two different cytolysin-negative patients with alcoholic hepatitis. After gnotobiotic mice were transplanted with the fecal samples, they were fed oral isocaloric (control) or chronic-binge ethanol diets. (A) Serum levels of ALT. (B) Hepatic triglyceride content. (C) Representative oil red O-stained liver sections. (D-F) Hepatic levels of mRNAs encoding inflammatory cytokines. (G) Proportions of cylL$_S$ detected in liver, measured by qPCR (Control diet: A-I cytolysin positive #1, n=7 AH cytolysin positive #2, n=7; AH cytolysin negative #3, n=7; AH cytolysin negative #4, n=6; Ethanol diet: AH cytolysin positive #1, n=24; AH cytolysin positive #2, n=15; AH cytolysin negative #3, n=21; AH cytolysin negative #4, n=14). (h) LDH and MTT assays to measure viability of hepatocytes isolated from mice fed oral control (5 groups, left) or chronic-binge ethanol diets (5 groups, right) and incubated with vehicle, CylL$_S$", CylL$_L$", or both cytolysin subunits, at indicated concentrations, without (−) or with (+) ethanol (25 mM) for 16 hours. Survival of hepatocytes was determined in 3 independent experiments. Scale bar=100 μm. Results are expressed as mean±s.e.m (A-F, H). P values are determined by One-way ANOVA with Tukey's post-hoc test (A-F), Fisher's exact test followed by FDR procedures (G), or Two-way ANOVA with Tukey's post-hoc test (H). *P<0.05, P<0.01, *P<0.001, ****P<0.0001.
Figure 7B:
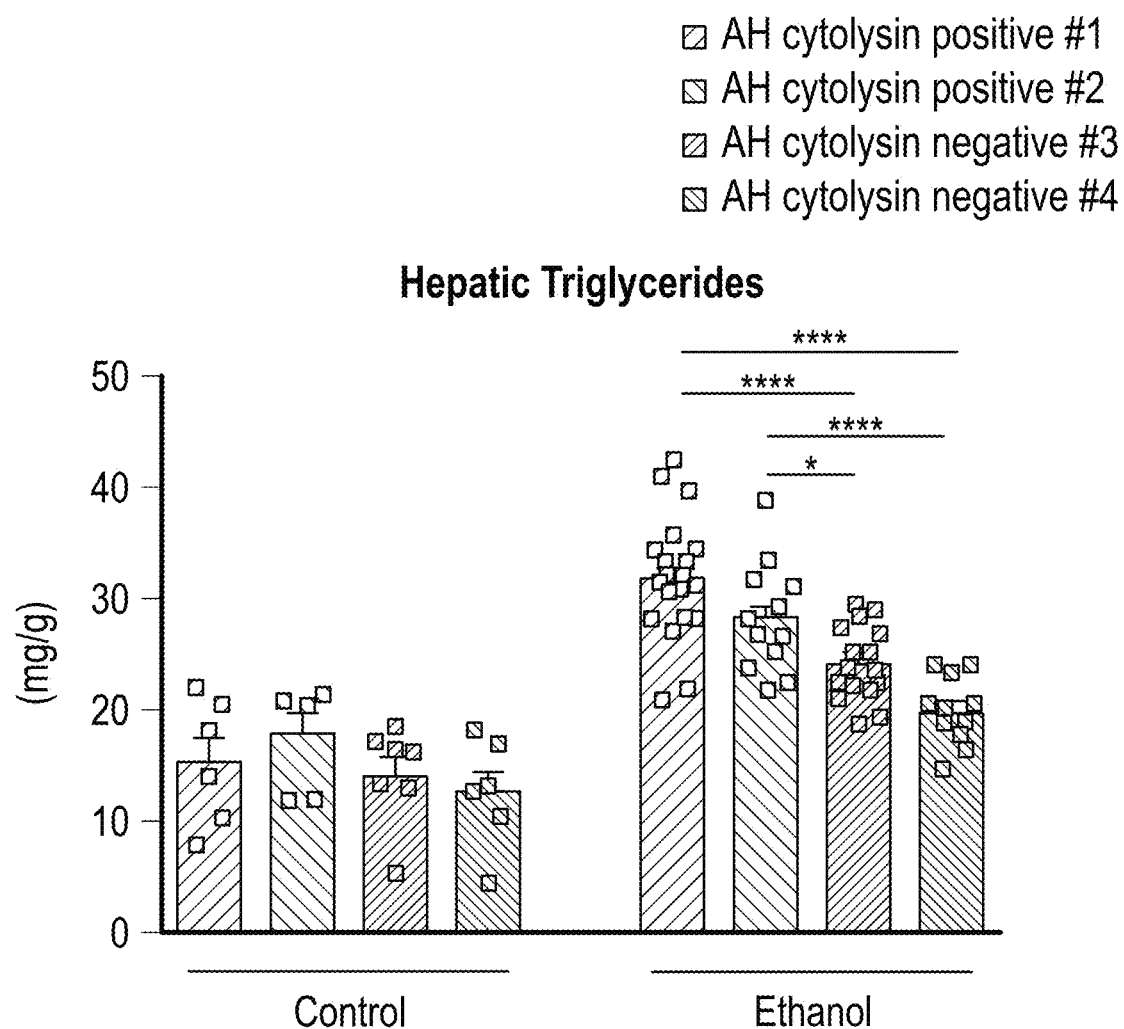
Figure 7C:
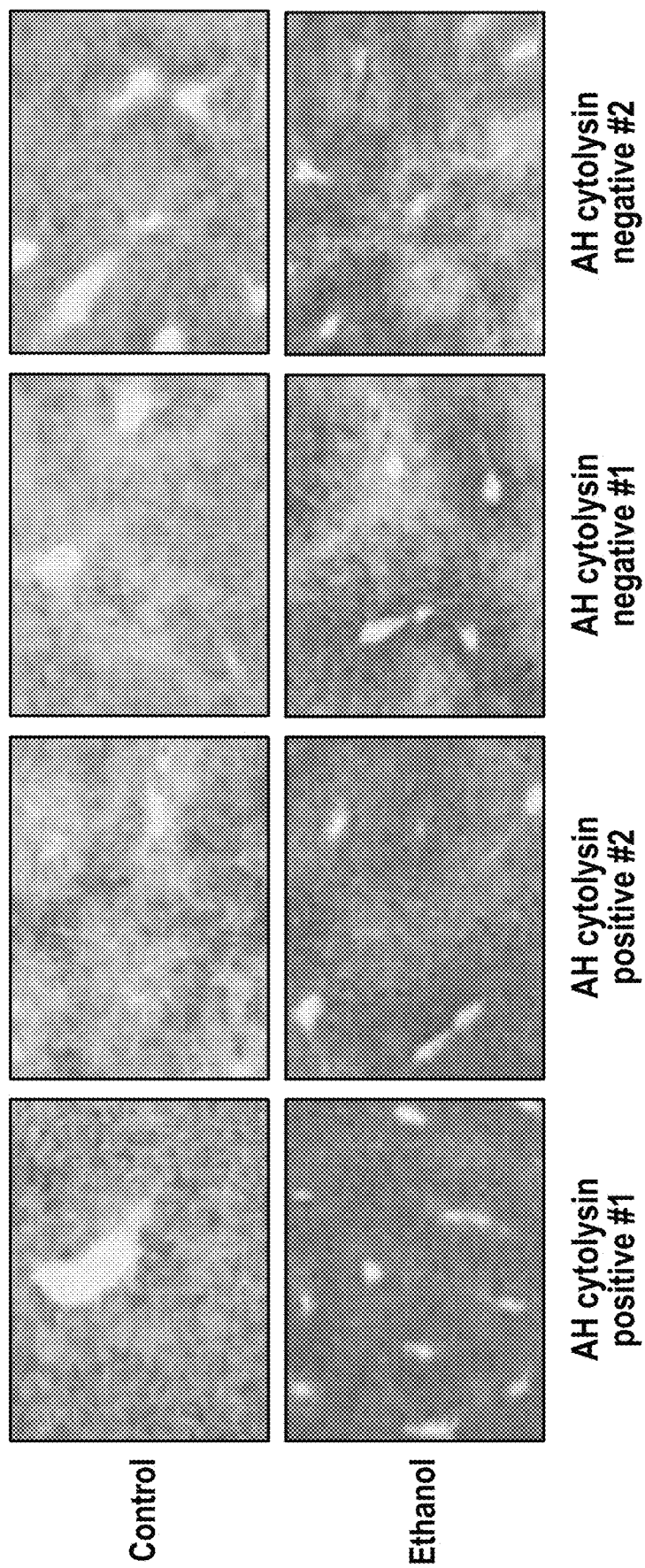
Figure 7D:
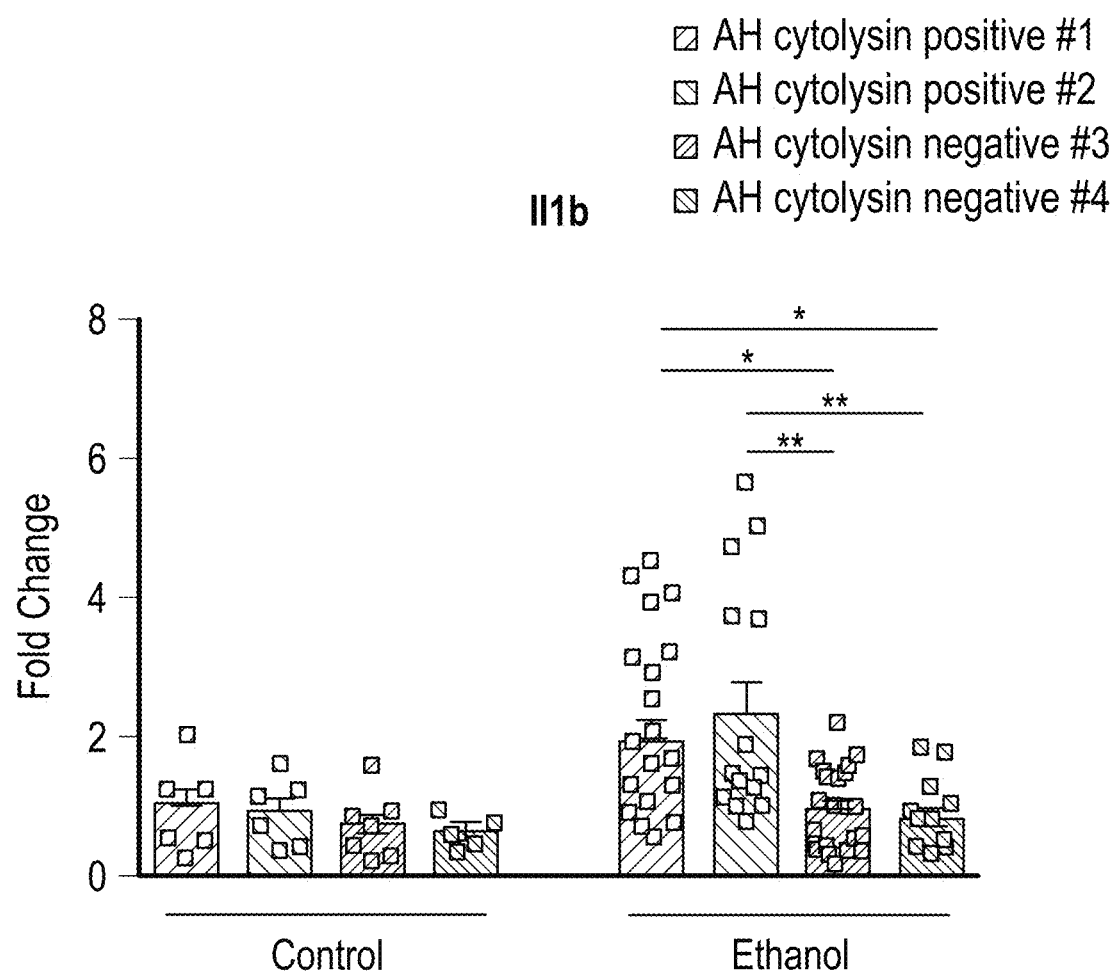
Figure 7E:
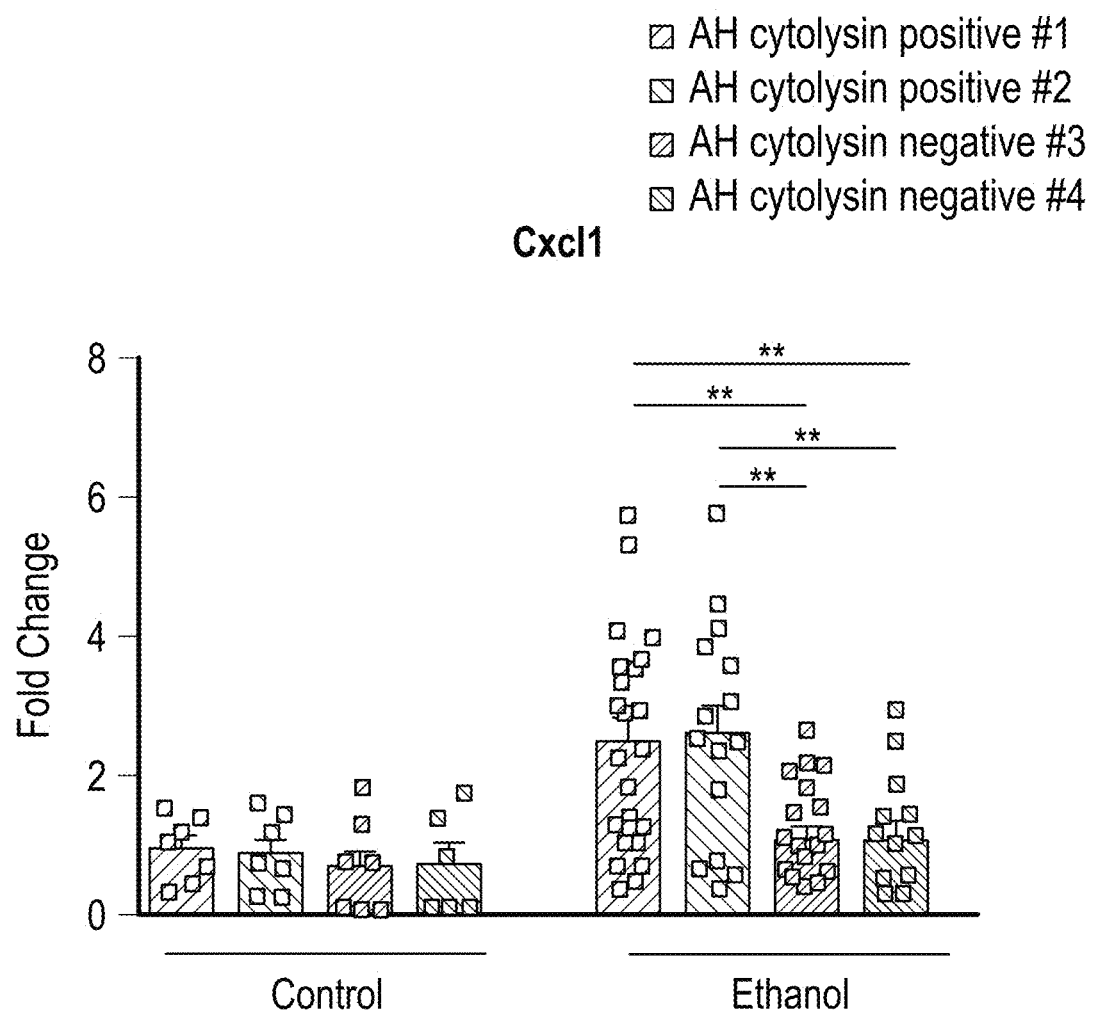
Figure 7F:
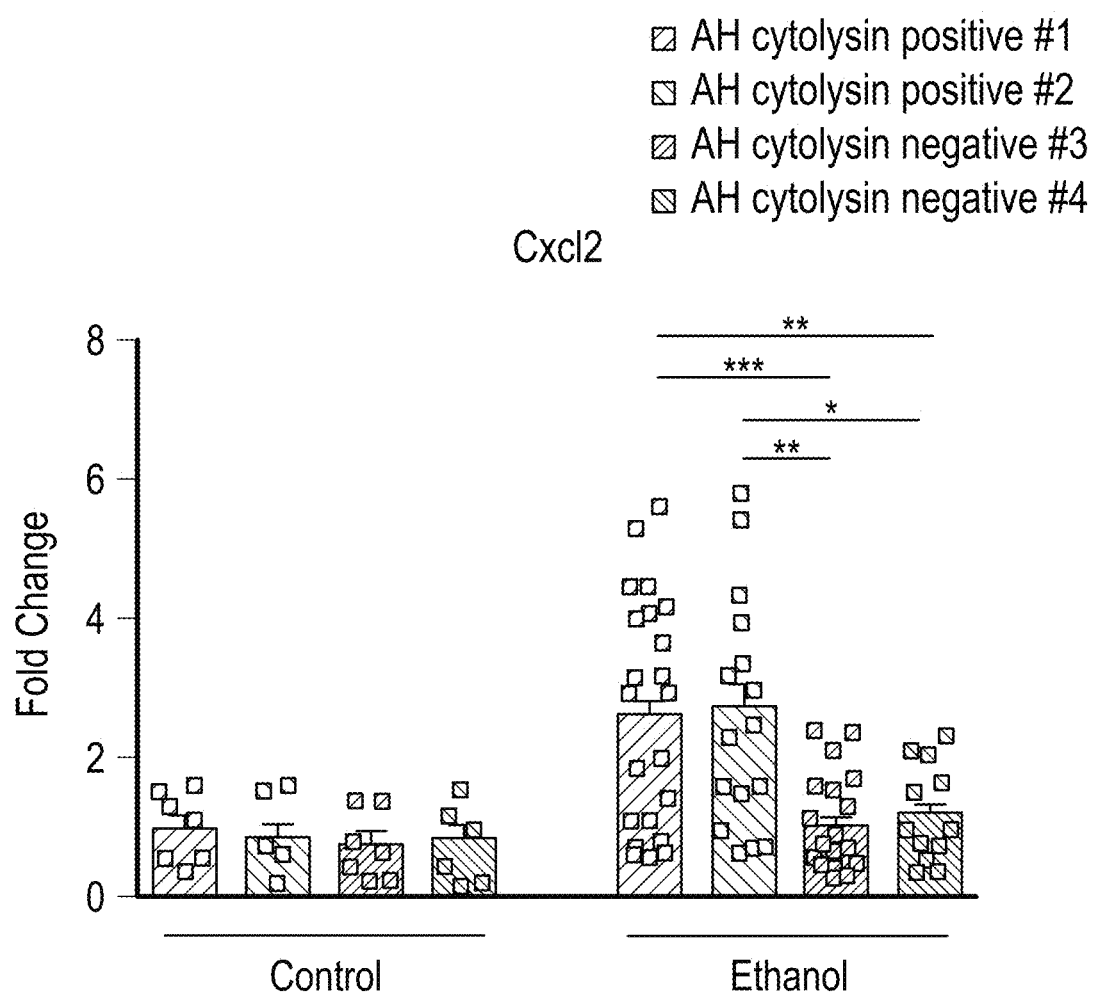
Figure 7G:
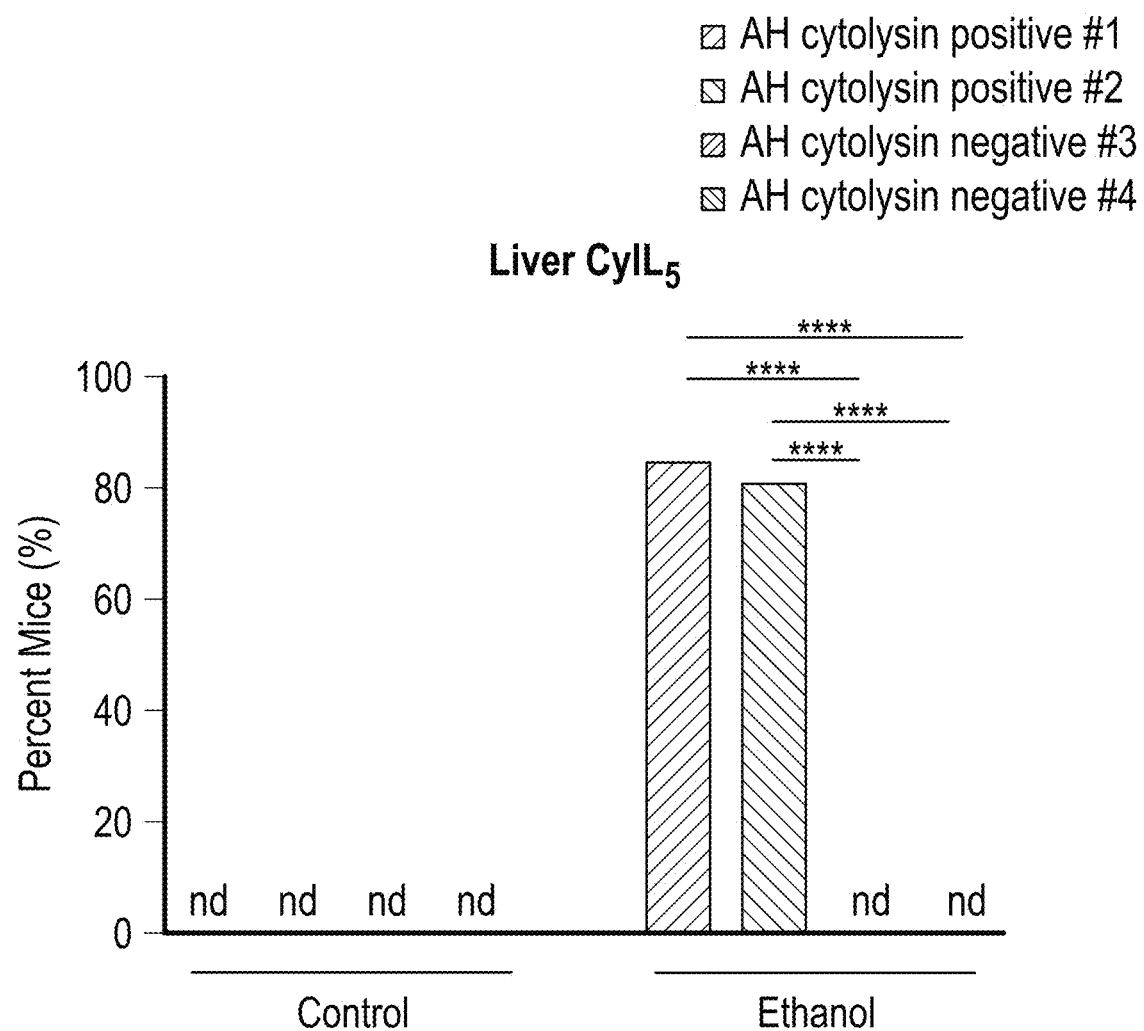
Figure 7H:
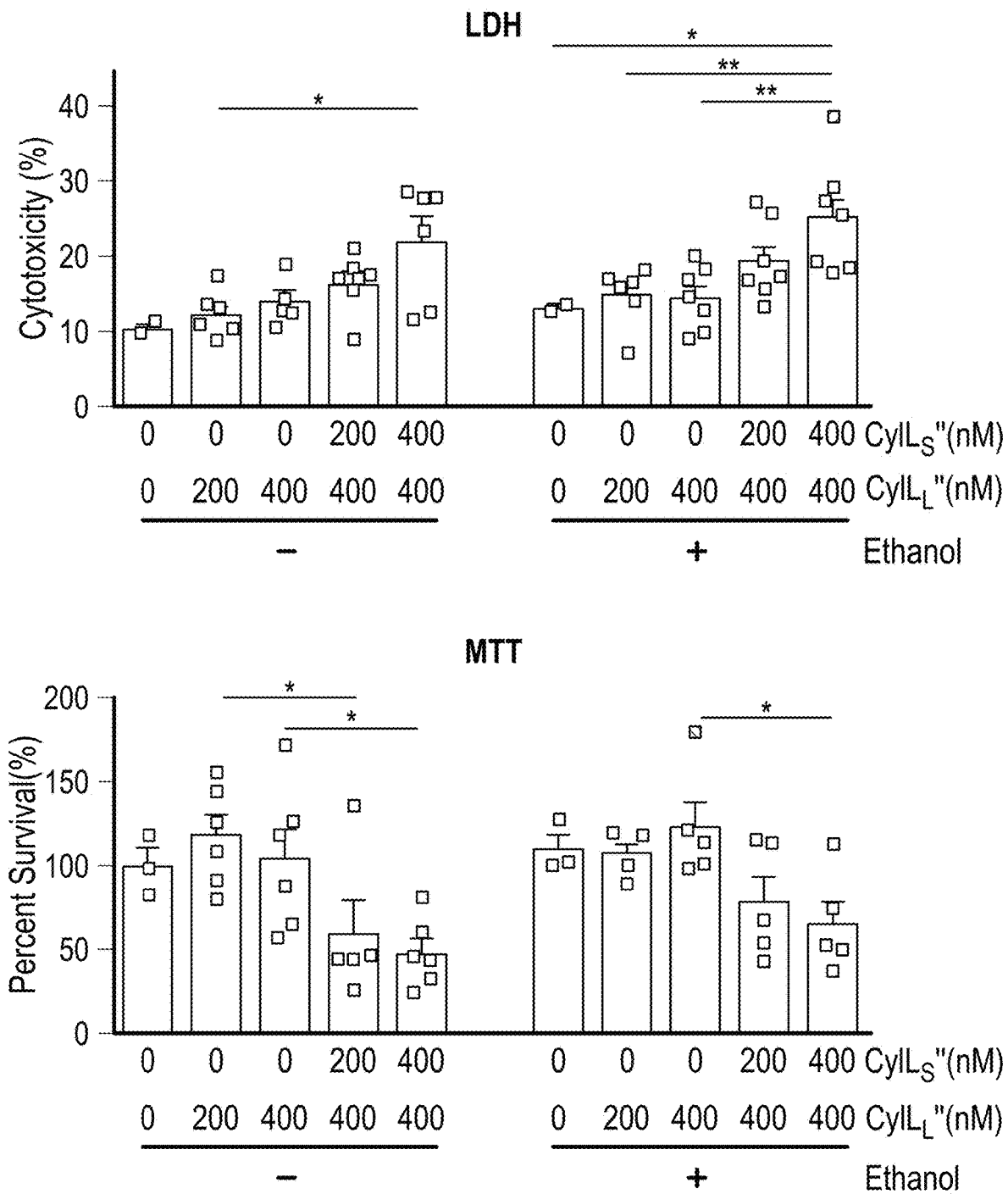
Figure 8A:
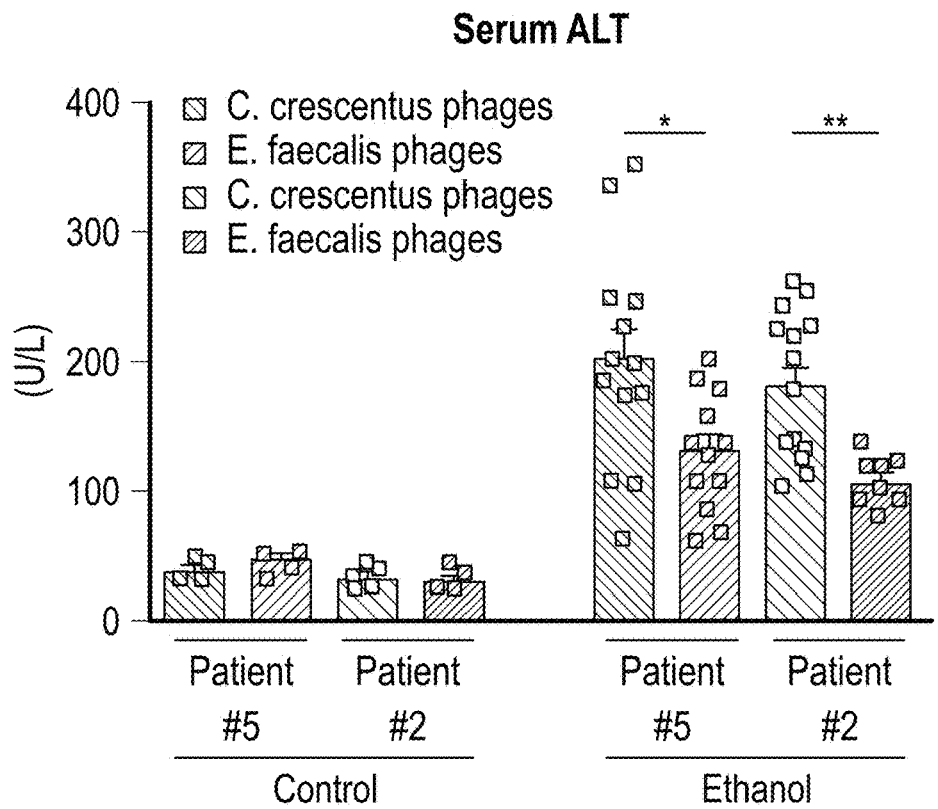
FIGS. 8A-G. Phage therapy against cytolytic *E. faecalis* reduces ethanol-induced liver disease in gnotobiotic mice. (A-G) C57BL/6 germfree mice were colonized with feces from two different cytolysin-positive patients with alcoholic hepatitis (feces from 1 patient also used in FIG. 7). The mice were placed on isocaloric (control) or chronic-binge ethanol diets, and gavaged with vehicle (PBS), control phages against *C. crescentus* ($10^{10}$ PFUs), or a cocktail of 3 or 4 different phages targeting cytolytic *E. faecalis* ($10^{10}$ PFUs) 1 day before an ethanol binge. (A) Serum levels of ALT. (B) Hepatic triglyceride content. (C) Representative oil red O-stained liver sections. (D-F) Hepatic levels of rRNAs encoding inflammatory cytokines. (G) Proportions of cylL$_S$ detected in liver, measured by qPCR (Control diet: Patient #5: *C. crescentus* phages, n=5; *E. faecalis* phages, n=5; Patient #2: *C. crescentus* phages, n=5; *E. faecalis* phages, n=5; Ethanol diet: Patient #5: *C. crescentus* phages, n=14; *E. faecalis* phages, n=16; Patient #2: *C. crescentus* phages, n=16; *E. faecalis* phages, n=15). Scale bar=100 μm. Results are expressed as mean±s.e.m (A-F). P values are determined by One-way ANOVA with Tukey's post-hoc test (A-F) or Fisher's exact test followed by FDR procedures (C). *P<0.05, P<0.01, *P<0.001.
Figure 8B:
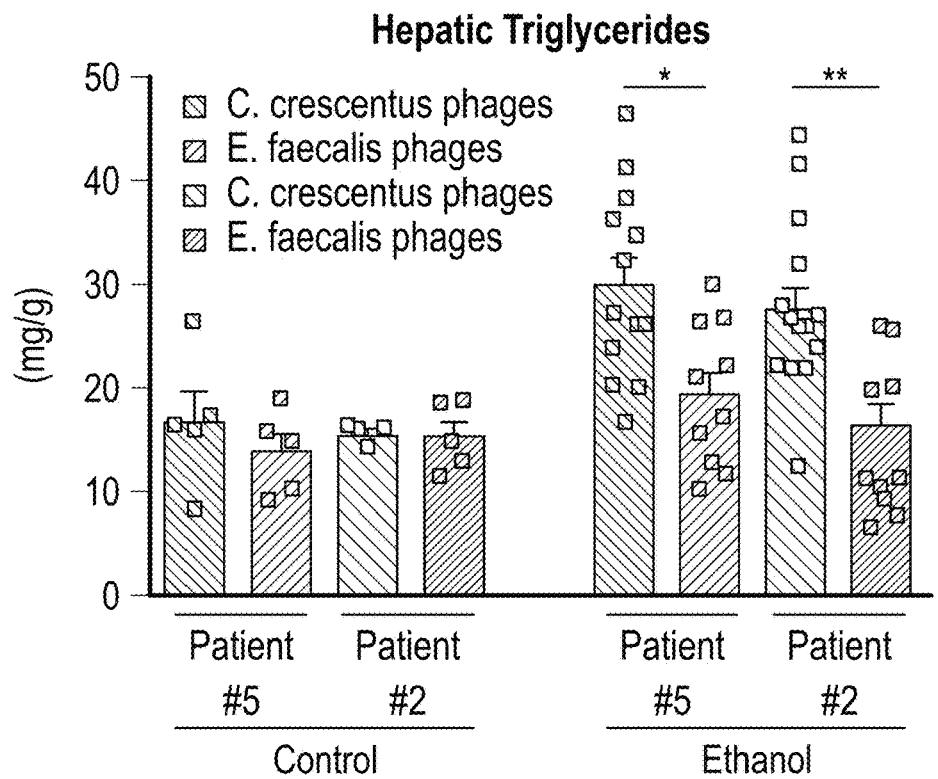
Figure 8C:
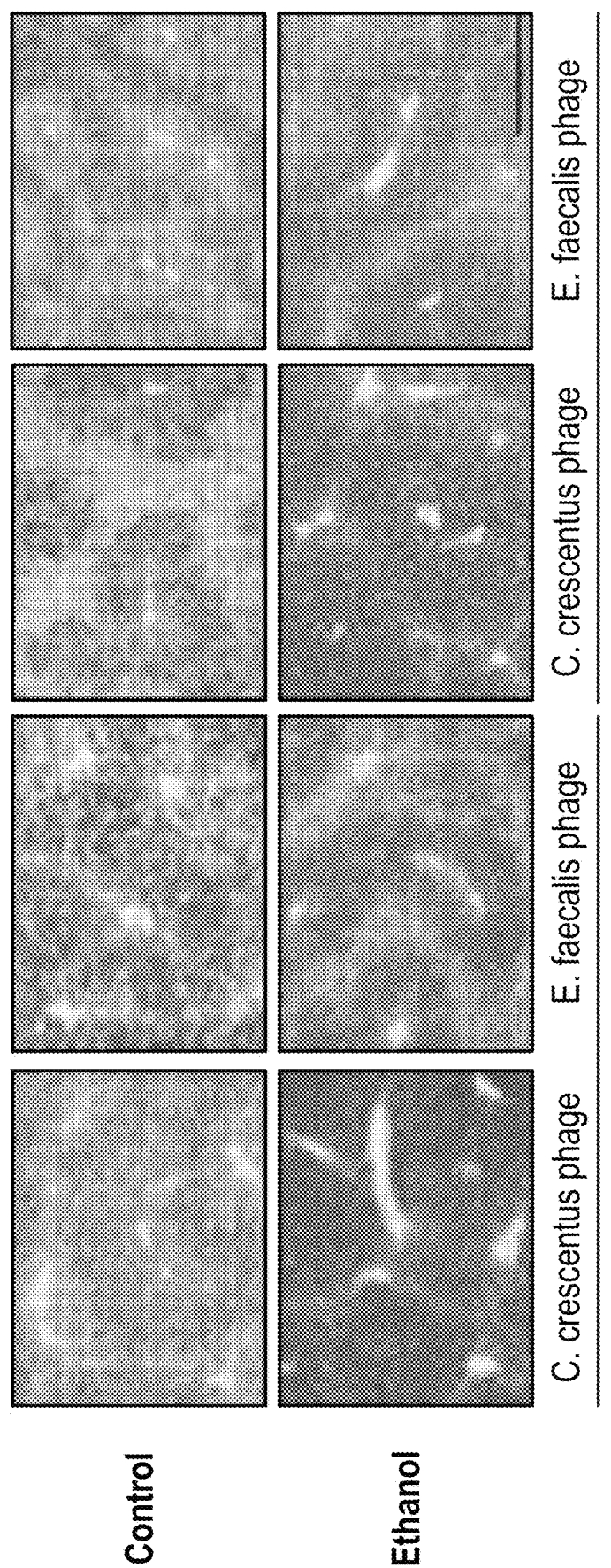
Figure 8D:
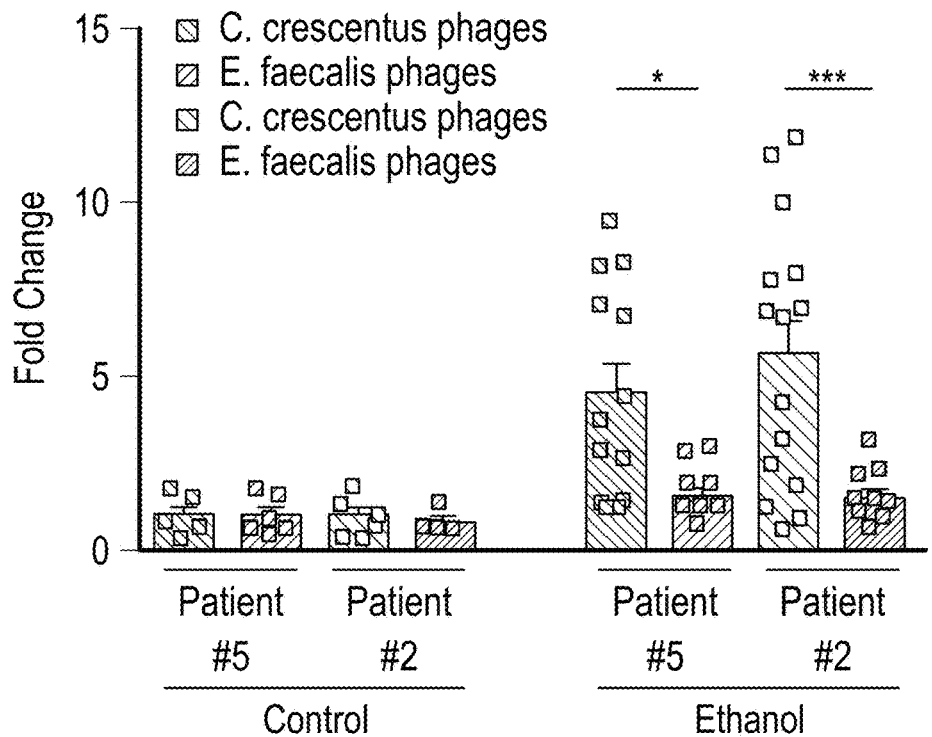
Figure 8E:
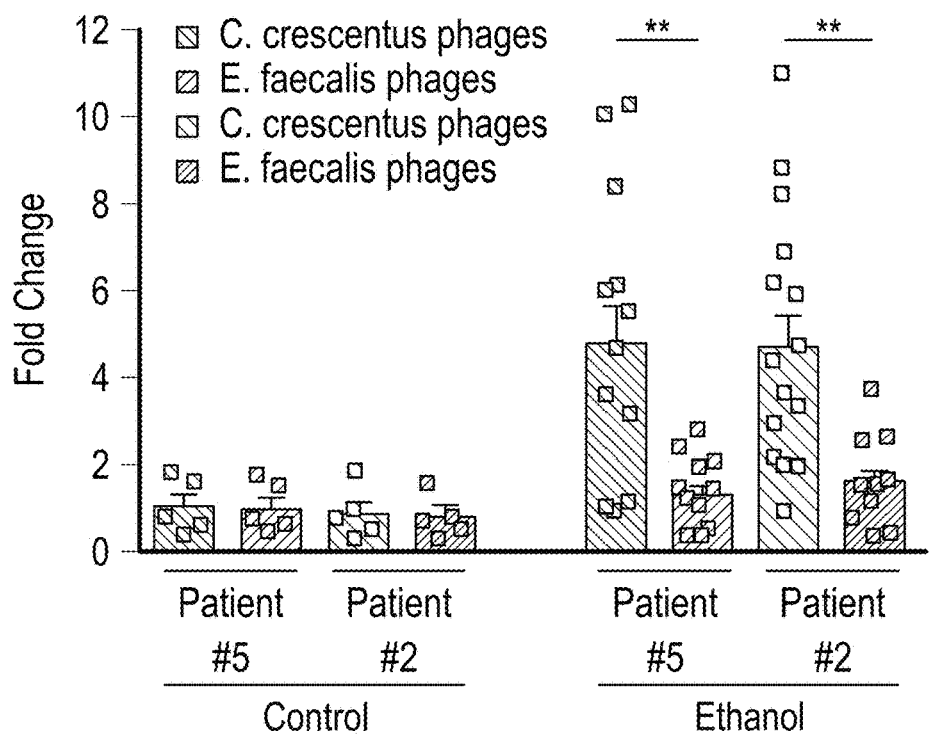
Figure 8F:
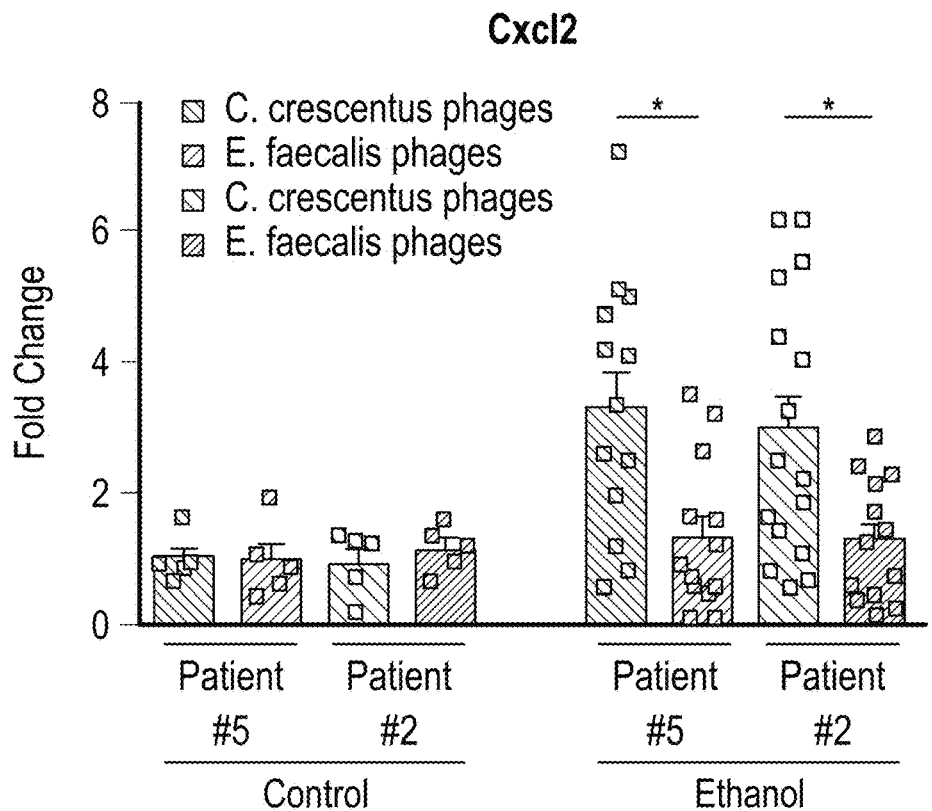
Figure 8G:
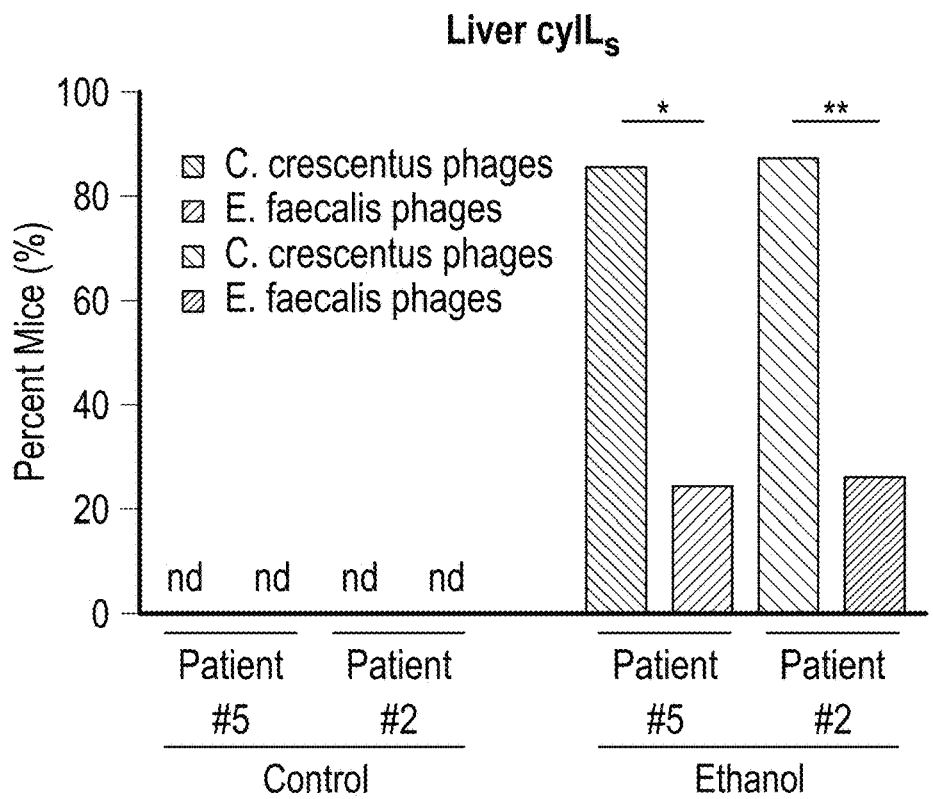

C57BL/6 mice were purchased from Charles River and used in FIG. 6, FIG. 7*h* and FIG. 10. C57BL/6 germ-free mice were bred at UCSD and used in FIG. 7*a*-3*g*, FIG. 8, FIG. 11, FIG. 15, and FIG. 17. Sublytic Atp4a$^{Sl/Sl}$ mice on a C57BL/6 background have been described (Llorente et al., 2017; Krieg et al., 2011) and heterozygous mice were used for breeding; sublytic Atp4a$^{Sl/Sl}$ littermate mice and their wild-type littermates were used in FIG. 13.

Female and male mice (age, 9-12 weeks) were placed on a chronic-binge ethanol diet (NIAAA model) as described (Bertola et al., 2013). Mice were fed with Lieber-DeCarli and the caloric intake from ethanol was 0% on days 1-5 and 36% from day 6 until the end of the study period. At day 16, mice were gavaged with a single dose of ethanol (5 g/kg body weight) in the early morning and sacrificed 9 hours later. Pair-fed control mice received a diet with an isocaloric substitution of dextrose.

Stool samples from patients with alcoholic hepatitis (see FIG. 5) were used for fecal transplantation in germ-free mice. Mice were gavaged with 100 µl of stool samples (1 g stool dissolved in 30 ml Luria-Bertani (LB) medium containing 15% glycerol under anaerobic conditions), starting at an age of 5-6 weeks and repeated two weeks later. Two weeks after the second gavage, mice were placed on the ethanol or control (isocaloric) diet.

In studies of the effects of cytolysin, 5×10$^8$ colony forming units (CFUs) of an isogenic cytolytic *E. faecalis* strain (FA2-2(pAM714)), a non-cytolytic *E. faecalis* strain that lacks cytolysin (FA2-2(pAM771)) (Ike et al., 1990) (*E. faecalis* Dcytolysin), or PBS (vehicle control) were fed to mice by gavage every third day, starting from day 6 through day 15 of ethanol feeding (see above). To determine the effect of bacteriophage treatment, 10$^{10}$ plaque forming units (PFUs) *E. faecalis* phages (or *C. crescentus* phage phiCbK as control) (Gill et al., 2012) were gavaged to the mice 24 hours before the ethanol binge (at day 16). All animal studies were reviewed and approved by the Institutional Animal Care and Use Committee of the University of California, San Diego.

Bacteriophages Isolation and Amplification

*E. faecalis* strain from mice feces was isolated before (Llorente et al., 2017) and *E. faecalis* strains from human stool samples were isolated using methods described below. All *E. faecalis* strains were grown statically in brain heart infusion (BHI) broth or on BHI agar at 37° C. *C. crescentus* phage phiCbK was purified as previously described (Gill et al., 2012).

*E. faecalis* phages were isolated from untreated raw sewage water obtained from a North City Water Reclamation Plant in San Diego, California. Fifty milliliter raw sewage water was centrifuged at 8,000×g for 1 minute at room temperature (RT) to pellet large particles. The supernatant was passed through a 0.45 µm and then a 0.2 µm syringe filter (Whatman, PES membrane). One hundred microliter of the clarified sewage was mixed with 100 µl overnight *E. faecalis* culture and then added to BHI broth top agar (0.5% agar) and poured over a BHI plate (1.5% agar). After overnight growth at 37° C., the resulting plaques were recovered using a sterile pipette tip in 500 µl PBS. Phages were replaqued on *E. faecalis* three more times to ensure that the phages were clonal isolates.

High-titer phage stocks were propagated by infecting 200 ml of exponentially growing *E. faecalis* at a multiplicity of infection (MOI) of 0.1 in BHI broth containing 10 mM MgSO$_4$. Lysis was allowed to proceed for up to six hours at 37° C. with shaking. The lysates were centrifuged at 10,000×g for 20 minutes at RT to remove the remaining bacterial cells and debris. Supernatant was then vacuum filtered through a 0.2 µm membrane filter and kept at 4° C. until use.

Before mice were gavaged, 10-20 milliliter lysates were concentrated using Corning Spin-X UF Concentrators with 100,000-molecular-weight-cutoff (MWCO) to a volume of approximately 1 ml. Following concentration, the culture medium was replaced with PBS via diafiltration. The resulting lysate was further concentrated to a final volume of 0.5 ml and adjusted to the required PFUs.

Whole-Genome Sequencing for Bacteriophages

Ten milliliter of lysates were treated with 10 µg/ml each of DNase and RNase at 37° C. for 1 hour and phages were precipitated by adding 1 M NaCl and 10% (w/v) polyethylene glycol 8000 (PEG 8000) and incubated at 4° C. overnight. Precipitated phages were then pelleted by centrifuging at 10,000×g for 10 minutes at 4° C. and resuspended in 500 µl of resuspension buffer (5 mM MgSO$_4$). Phage DNA was then extracted using Promega Wizard DNA Clean-up kit (Promega).

Electron Microscopy

Bacteriophage morphology was examined by transmission electron microscopy of negatively stained grids, prepared using the valentine method with 2% uranyl-acetate (Valentine et al., 1968), and examined at an acceleration voltage of 100 KV in the JEOL 1200 EX. Phosphotungstic acid was used to confirm the contractile tails of myophages. Transmission Electron Microscope at the Microscopy and Imaging Center at Texas A&M University.

Bacterial DNA Extraction and 16S rRNA Sequencing

DNA from human stool samples, mouse liver sections or bacterial culture was extracted as described before (Llorente et al., 2017) and DNA from mouse feces were extracted using QIAamp Fast DNA Stool kit (QIAGEN). 16S ribosomal RNA (rRNA) gene sequencing was performed as described (Llorente et al., 2017).

Real-Time Quantitative PCR

Bacterial genomic DNA was extracted from human stool samples and mouse liver (Llorente et al., 2017). RNA was extracted from mouse liver and cDNAs were generated (Llorente et al., 2017). Primer sequences for mouse genes were obtained from the NIH qPrimerDepot. Primer sequences for *E. faecalis* 16S rRNA gene, *E. faecalis* cylL$_S$ and cylL$_L$ genes were described before (Ryu et al., 2013; Haas et al., 2002). Mouse gene expression and amplification of bacterial genes were determined with Sybr Green (Bio-Rad Laboratories) using ABI StepOnePlus real-time PCR system. The qPCR value of mouse genes was normalized to 18S.

*E. Faecalis* Whole-Genome Sequencing

To isolate *E. faecalis* strains from human subjects, 50-300 mg of human stool was resuspended in 500 µl PBS, serial dilutions were made, and 100 µl was placed on plates with selective medium, BBL Enterococcosel broth (Becton Dickinson). Enterococci colonies were identified by the production of dark brown or black color generated by hydrolysis of esculin to esculetin that reacts with ferric ammonium citrate. Each *Enterococcus* colony was then picked, and we performed qPCR to identify *E. faecalis*, using specific primers against the *E. faecalis* 16S rRNA gene (Ryu et al., 2013). For each subject, 1-6 *E. faecalis* colonies were analyzed and bacterial genomic DNA was then extracted as described in above section. DNA sequencing was performed on the Illumina HiSeq X generating paired-end reads (2×151 bp). Bacterial genomes were assembled and annotated using the pipeline described previously (Page et al., 2016). For the phylogeny of *E. faecalis*, the genome assemblies of the UK clinical isolates (Raven et al., 2016) were combined with the assemblies of the study isolates, annotated with Prokka (Seemann, 2014), and a pangenomne estimated using Roary (Page et al., 2016). A 95% identity cut-off was used, and core genes were defined as those in 99% of isolates. A maximum likelihood tree of the SNPs in the core genes was created using RaxML (Stamatakis, 2014) and 100 bootstraps. The resulting tree was visualized using Microreact (Argimon et al., 2016).

*E. Faecalis* Culture

All *E. faecalis* strains were grown statically in brain heart infusion (BHI) broth or on BHI agar plate at 37° C. 50 µg/ml erythromycin was added when grew cytolytic and non-cytolytic *E. faecalis* strains used in FIG. 6 and FIG. 10.

Fecal *Enterococcus* Level Determination

To determine fecal Enterococci level in mice, 10-30 mg of mouse feces was resuspended in 500 µl PBS and serial dilutions were made. Five microliter of each dilution from each sample were spotted onto a plate with a selective medium, BBL Enterococcosel broth (Becton Dickinson). Enterococci colonies were identified by the production of dark brown or black color generated by hydrolysis of esculin to esculetin that reacts with ferric ammonium citrate. Colony numbers of each sample were then counted and CFUs were calculated.

Cytolysin Expression and Purification

To purify bioactive CylL$_L$" and CylL$_S$", an *E. coli* heterologous expression system was used. Briefly, either Hisx6-CylL$_L$ or Hisx6-CylL$_S$ were co-expressed with CylM (enzyme that performs dehydration and cyclization reactions on cytolysin) *E. coli* to yield fully dehydrated and cyclized full-length peptides. The His-tag and leader peptide were then cleaved off using recombinant CylA (27-412), the soluble domain of the native peptidase used in cytolysin maturation, to yield bioactive CylL$_L$" or CylL$_S$". The resulting core peptides were further purified by reverse-phase HPLC.

The cylL$_L$ and cylL$_S$ genes were previously cloned into the MCSI of a pRSFDuet-1 backbone vector which contained the cylM gene in MCSII (Tang and van der Donk, 2013). The cylA (27-412) gene was previously cloned into MCSI of a pRSFDuet-1 backbone vector (Tang et al., 2018). *E. coli* BL21 Star™ (DE3) cells (50 µl) were transformed with 100 ng of either the cylL$_L$_cylM:pRSFDuet, cylL$_S$_cylM:pRSFDuet or cylA (27-412):pRSFDuet plasmids via KCM chemical transformation. The cells were plated on LB agar plates supplemented with kanamycin (50 µg/ml) and grown at 37° C. overnight. One colony was picked to inoculate 15 ml of LB broth supplemented with kanamycin overnight at 37° C. The culture was used to inoculate 1.5 liters of terrific broth supplemented with kanamycin. Cultures were grown with shaking at 37° C. to an OD$_{600}$ of 0.8. The temperature of the incubator was lowered to 18° C. and expression was induced with the addition of 0.3 mM final concentration of isopropyl β-D-thiogalactoside. The cultures were allowed to incubate at 18° C. for 18 hours. The cells were collected by centrifugation at 5000×g for 12 minutes. The cell paste was collected and frozen at −70° C.

For the purification of the protease CylA (27-412), the cell paste was thawed and resuspended in 50 ml LanP buffer (20 mM HEPES, 1 M NaCl, pH 7.5). The cell suspension was lysed by homogenization. The lysate was clarified by centrifugation at 13,000×g for 45 minutes and filtered through a 0.45 µm centrifugal filter (Thermo Scientific). The clarified lysate was applied to a pre-equilibrated HisTrap HP 5 ml column (GE Healthcare) through a peristaltic pump. The loaded column was connected to an AKITA pure 25 M system. The protein was eluted by a linear gradient of LanP buffer and Elution Buffer (20 mM HEPES, 1 M NaCl, 500 mM imidazole, 10% glycerol, pH 7.5). The purest fractions, as determined by 4%-20% SDS-PAGE, were combined, concentrated to 1 mg/ml by Amicon Ultra Centrifugal Filters (30 kDa MWCO), and buffer exchanged into storage buffer (20 nM HEPES, 300 mM KC, 10% glycerol, pH 7.5) by PD-10 desalting column (GE Healthcare). Protein concentration was determined by absorbance at 280 nm.

For the purification of CylL$_L$ and CylL$_S$ peptides, the cell paste was thawed and resuspended in 50 ml of LanA Buffer B1 (6 M guanidine HCl, 20 mM NaH$_2$PO$_4$, 500 mM NaCl, 0.5 mM imidazole, pH 7.5). The cell suspension was lysed via sonication (2 see pulse on, 5 seconds pulse off, 7 minutes total pulse on time). The cell lysate was clarified by centrifugation at 13,000×g for 45 minutes. The clarified cell lysate was filtered through a 0.45 µm centrifugal filter and applied via gravity flow to a pre-equilibrated, 2 ml bed volume of His60 Ni Superflow Resin (Clonetech). After the lysate had been applied, the resin was washed with 15 ml of LanA Buffer B2 (4 M guanidine HCl, 20 mM NaH$_2$PO$_4$, 500 mM NaCl, 30 mM imidazole, pH 7.5). The resin was washed again with 15 ml of LanA Wash Buffer (20 mM NaH$_2$PO$_4$, 500 mM NaCl, 30 mM imidazole, pH 7.5) to remove the guanidine HCl. The peptides were eluted with 10 ml of LanA Elution Buffer (20 mM NaH$_2$PO$_4$, 500 mM NaCl, 500 mM imidazole, pH 7.5). A 0.02 mg/ml final concentration of CylA (27-412) was added to the elution fraction and allowed to incubate at room temperature overnight to remove the leader peptide.

The digestion was quenched by adding 2% (v/v) final concentration of trifluoroacetic acid. The solution was centrifuged at 4500×g for 10 minutes and filtered through a 0.45 µm syringe filter (Thermo Scientific). The core peptides were purified by semi-preparative reverse phase HPLC using a Phenonmenex Jupiter Proteo column (10 mm×250 mm, 4 lam, 90 Å) connected to an Agilent 1260 Infinity II liquid chromatography system. The peptides were separated using a linear gradient of 3% (v/v) solvent B (acetonitrile+

0.1% trifluoroacetic acid) in solvent A (water+0.1% trifluoroacetic acid). The fractions were spotted on MALDI target plate by mixing 1 μl of sample with 1 μl of a 25 mg/ml solution of Super-DIB (Sigma) in 80% acetonitrile/water+0.1% trifluoroacetic acid. The fractions were analyzed by MALDI-TOF MIS on a Broker UltrafleXtreme MALDI-TOF/TOF operating in positive ionization, reflector mode.

Primary Mouse Hepatocytes

Hepatocytes were isolated from C57BL/6 female mice fed the chronic-binge ethanol diet (NIAAA model) (Bertola et al, 2013). Livers were perfused in situ with 0.5 mM EGTA containing calcium-free salt solution and then perfused with a solution containing 0.02% (w/v) collagenase D (Roche Applied Science). Livers were then carefully minced and filtered using a 70 μm nylon cell strainer. Hepatocytes were centrifuged at 50×g for 1 minute after three times washing. Hepatocyte viability was assessed by Trypan Blue (Thermo Fisher Scientific). $1.5 \times 10^5$ hepatocytes were seeded on 12-well plates coated with rat collagen type I in DMEM-F12 (Thermo Fisher Scientific) with insulin-transferrin-selenium (1% v/v) (Thermo Fisher Scientific) and 40 ng/ml dexamethasone (MP Biomedical s) containing 10% (v/V) fetal bovine serum (FBS; Gemini Bio-Products) and antibiotics. After 4 hours, the culture was washed with DMEM-F12 media and changed to the same complemented media without FBS (Iwaisako et al., 2012). Then 16 hours later, hepatocytes were cultured with 0 or 25 mM ethanol and stimulated with 0, 200 or 400 nM $CylL_S"$ and/or $CylL_L"$ in the same culture medium without FBS. After 3 hours stimulation, hepatocyte cytotoxicity was assessed using Pierce LDH Cytotoxicity Detection Kit (Thermo Fisher Scientific). After 6 hours stimulation, the viability of hepatocytes was determined by incubation with 0.3 mg/ml 3-(4,5-dimethylthiazol-2-yl)-2,5'-diphenyltetrazolium bromide solution (MTT; Sigma-Aldrich) in DMEM-F12 media with 10% (v/v) FBS and incubated at 37° C. for one hour. The medium was then removed and dimethyl sulfoxide (Sigma-Aldrich) was added to dissolve the formazan. Formazan concentration was determined by absorbance at 550 nm and the survival percentage was calculated accordingly (hepatocytes not stimulated with cytolysin peptides were set as 100% survival).

Biochemical Analysis

Serum levels of ALT were determined using Infinity ALT kit (Thermo Scientific). Hepatic triglyceride levels were measured using Triglyceride Liquid Reagents kit (Pointe Scientific). Levels of serum LPS and fecal albumin were determined by ELISA kits (Lifeome Biolabs and Bethyl Labs, respectively). Serum levels of ethanol were measured using Ethanol Assay kit (BioVision).

Staining Procedures

To determine lipid accumulation, liver sections were embedded in OCT compound. 8 μm frozen sections were then cut and stained with Oil Red 0 (Sigma-Aldrich). Representative pictures from each group of mice were shown in each figure.

Statistical Analysis

Results are expressed as mean±s.e.m. (except when stated otherwise). Univariate Cox regression analysis was used to detect associations of cytolysin and MELD with overall mortality. Univariate logistic regression analysis of laboratory and clinical parameters associated with cytolysin was performed. A multivariate logistic regression model was performed controlling for MELD and platelet numbers. Multicollinearity was examined using the variance inflation factor (VIF). Kaplan-Meier curves were used to compare survival between cytolysin positive and negative alcoholic hepatitis patients. Fecal *E. faecalis*, bacterial diversity and richness from controls and patients were compared using Kruskal-Wallis test with Dunn's post-hoc test. Percentage of subjects with fecal samples positive for *E. faecalis* and cytolysin was compared using Fisher's exact test followed by false discovery rate (FDR) procedures. Jaccard dissimilarity matrices were used for principal coordinate analysis (PCoA) and p-values were determined by permutational multivariate analysis of variance (PERMANOVA) followed by FDR procedures to correct for multiple comparisons.

For mouse and cell culture studies, significance of multiple groups was evaluated using one-way or two-way analysis of variance (ANOVA) with Tukey's post-hoc test. Fisher's exact test was used in the analysis of liver $cylL_S$. FDR correction was applied to the p-values from Fisher's exact test to correct for multiple comparisons. Kaplan-Meier curves were used to compare survival between experimental mouse groups. PCoA based on Jaccard dissimilarity matrices was performed between experimental mouse groups and the p-values were determined by PERMANOVA followed by FDR procedures to correct for multiple comparisons.

Statistical analyses were performed using R statistical software, R version 3.5.1, 2018 the R Foundation for Statistical Computing and GraphPad Prism v6.01. A p-value <0.05 was considered to be statistically significant.

Results

The number of patients with chronic liver disease is increasing rapidly liver cirrhosis is now the $12^{th}$ leading cause of death worldwide (Lozano et al., 2012) and more than 50% of cases are associated with chronic alcohol abuse (Rehn et al., 2013). Alcohol-associated liver disease recently became the leading cause for liver transplantation in the United States (Lee et al., 2019). The most severe form of alcohol-related liver disease is alcoholic hepatitis; mortality ranges from 20% to 40% at 1-6 months, and as many as 75% of patients die within 90 days of a diagnosis of severe alcoholic hepatitis (Thursz et al., 2015; Maddrey et al., 1978; Dominguez et al., 2008). Therapy with corticosteroids is only marginally effective (Thursz et al., 2015). Early liver transplantation is the only curative therapy, but is offered only at some centers, to a select group of patients (Mathurin and Lucey, 2012).

Alcohol-related liver disease can be transmitted via fecal microbiota. Colonization of germ-free mice with feces from patients with alcoholic hepatitis exacerbates ethanol-induced liver disease, compared to feces from conventionally colonized mice (Llopis et al., 2016). We investigated microbes and microbial factors responsible for this transmissible phenotype and for progression of alcohol-related liver disease.

Figure 1B:
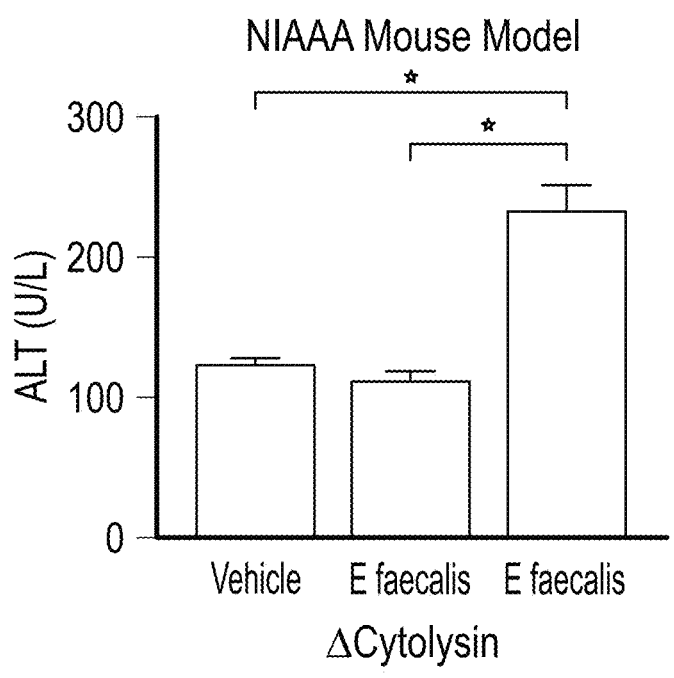
Figure 9B:
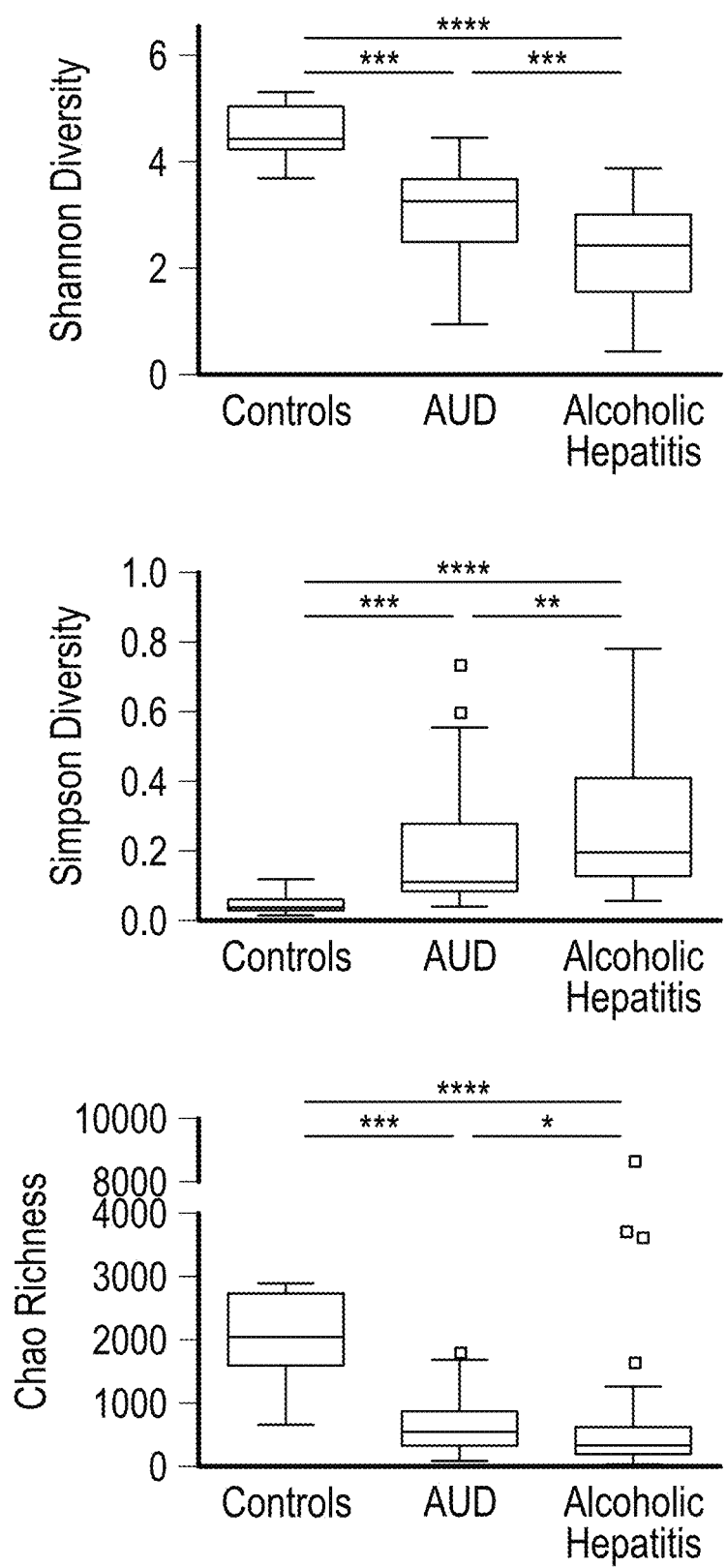

To determine whether chronic alcohol use and alcoholic hepatitis are associated with an altered composition of the gut microbiota, changes in the fecal microbiota were analyzed by 16S ribosomal RNA (rRNA) gene sequencing. Changes in fecal microbiota composition were rioted in patients with alcohol use disorder or alcoholic hepatitis, compared to subjects without alcohol use disorder (controls) (FIG. 5a; FIGS. 9a and 1b; FIGS. 18a-b). One significant change that was observed was an increase in proportion of *Enterococcus* spp. In patients with alcoholic hepatitis, about 5% fecal bacteria were *Enterococcus* spp, compared with almost none in patients with alcohol use disorder or controls. Fecal samples from patients with alcoholic hepatitis had about 2700-fold more *Enterococcus faecalis* (*E. faecalis*) than samples from controls, measured by quantitative PCR (qPCR) (FIG. 5b), consistent with 16S rRNA sequencing results. However, proportions of E. faecalis did not correlate with disease severity in patients with alcoholic hepatitis (data not shown).

Figure 5A:
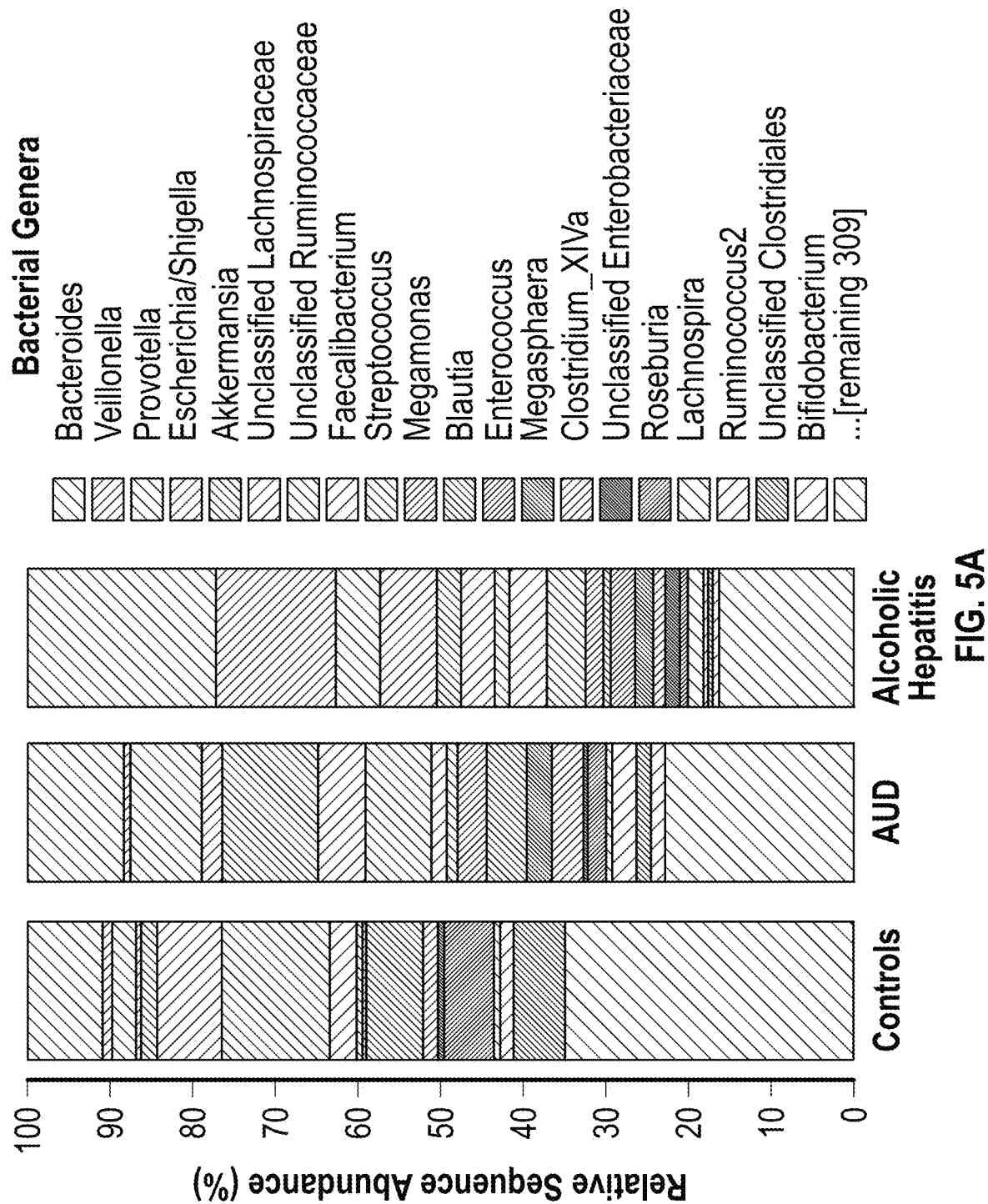
FIGS. 5A-FT. *E. faecalis* cytolysin associates with mortality in patients with alcoholic hepatitis. (A) 16S rRNA sequencing of fecal samples from controls (n=14), patients with alcohol use disorder (AUD; n==43), or alcoholic hepatitis (n=75). Principal coordinate analysis (PCoA) based on Jaccard dissimilarity matrices was used to show β-diversity among groups, at the genus level. Composition of fecal microbiota was significantly different between each group ($P<20.01$). The axes are the two most discriminating axes, based on binary Jaccard index distance metric; 29.25% of the variances are explained by principal coordinate 1 (PC1) and 17.86% by PC2. (B) *E. faecalis* in fecal samples from controls (n=25), patients with AUD (n=38), or alcoholic hepatitis (n=82), assessed by qPCR. (C) Percentage of subjects with fecal samples positive for $cylL_L$ and $cylL_S$ DNA sequences (cytolysin positive), in controls (n=25), patients with AUD (n=38), or alcoholic hepatitis (n=82), assessed by qPCR. (D) Kaplan-Meier curve of survival of patients with alcoholic hepatitis whose fecal samples were cytolysin positive (n=25) or cytolysin negative (n=54). (E) Hazard ratio (FIR) for overall mortality in patients with alcoholic hepatitis, based on univariate logistic Cox regression analysis. (F) Core genome single nucleotide polymorphism (SNP) tree of *E. faecalis* strains isolated from controls (black; n=7 from 2 patients), patients with AUD (green; n=48 from 14 patients) or alcoholic hepatitis (orange; n=93 from 24 patients), or patients with bloodstream infections from United Kingdom (blue; n=168), showing phylogenetic diversity of cytolysin-positive *E. faecalis*. Of note, *E. faecalis* isolates from two AUD patients were cytolysin positive by whole genome sequencing, but fecal cytolysin was not detectable by qPCR in the same patients. Scale bar represents the nucleotide substitutions per SNP site. Results are expressed as mean±s.e.m (b). P values are determined by Kruskal-Wallis test with Dunn's post-hoc test (b). *$P<0.05$, ***$P<0.001$, FIGS. 6A-I. Cytolytic *E. faecalis* causes progression of ethanol-induced liver disease in mice. (A-H) C5713L/6 mice were fed oral isocaloric (control) or chronic-binge ethanol diets and gavaged with vehicle (PBS), an isogenic cytolytic *E. faecalis* strain (FA2-2(pAM714)) (*E. faecalis*) ($5×10^8$ colony forming units ((CFUs)), or a non-cytolytic *E. faecalis* strain lacking cytolysin (FA2-2(pAM771)) (Ike et al., 1990) (*E. faecalis* Dcytolysin) ($5×10^8$ CFUs) every third day. (A) Serum levels of ALT. (B) Hepatic triglyceride content. (C) Representative oil red O-stained liver sections. (D-F) Hepatic levels of mRNAs. (G) Proportions of $cylL_S$ (the gene encoding cytolysin subunit CylL$_S$") in liver, measured by qPCR (Control diet: PBS, n=7; *E. faecalis*, n=7; *E. faecalis* Dcytolysin, n=7; Ethanol diet: PBS, n=15; *E. faecalis*, n=19; *E. faecalis* Dcytolysin, n=15). (H) Paracellular intestinal permeability was evaluated by +measuring fecal albumin content and serum levels of lipopolysaccharide (LPS) by ELISAs. Scale bar=100 μm. Results are expressed as mean±s.e.m (A-F, H). P values are determined by One-way ANOVA with Tukey's post-hoc test (A-F, H) or Fisher's exact test followed by false discovery rate (FDR) procedures (G). *P<0.05, P<0.01, *P<0.001.
Figure 5B:
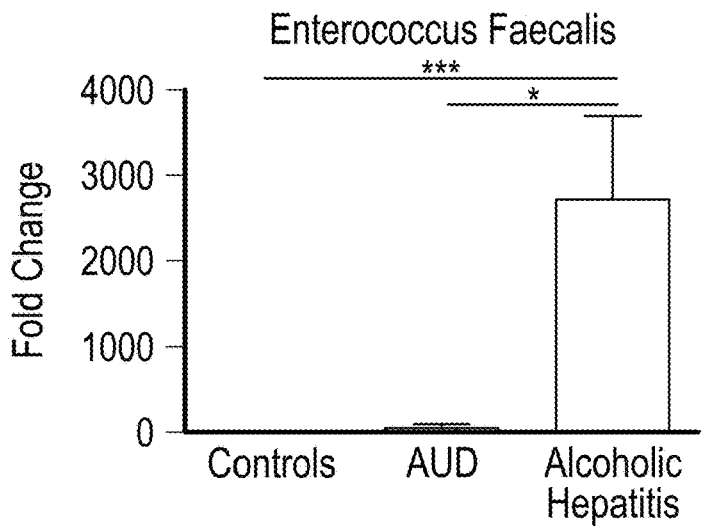
Figure 5C:
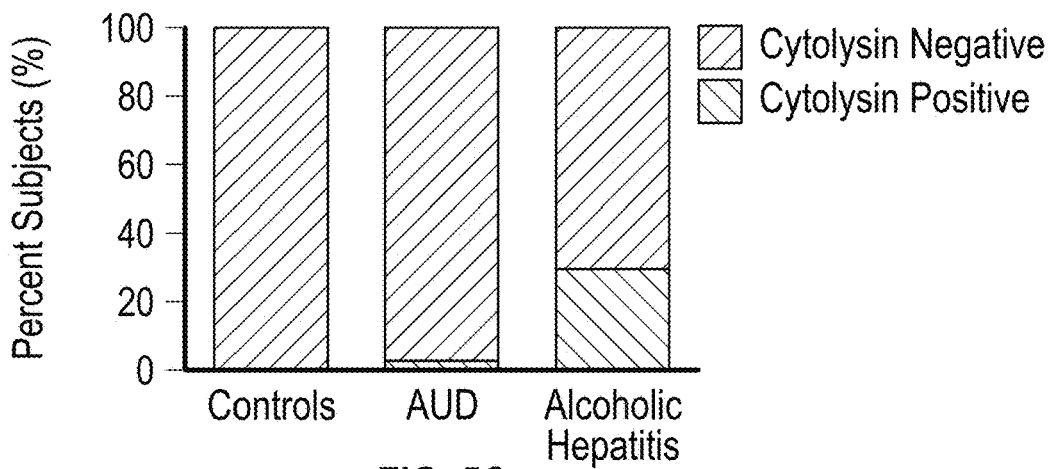
Figure 5D:
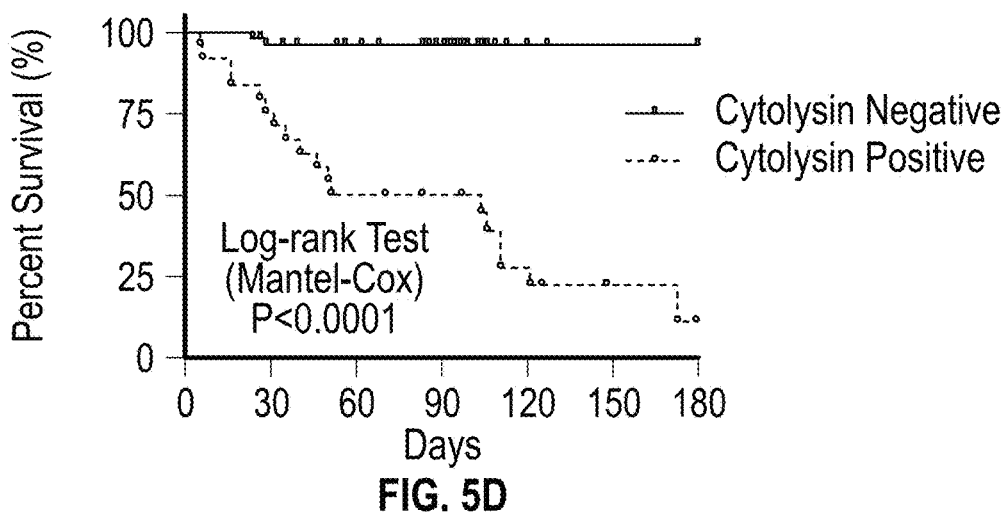

Colonization of nice with E. faecalis induces mild hepatic steatosis and exacerbates ethanol-induced liver disease (Lorente et al., 2017) by unclear mechanisms. Cytolysin is a bacterial exotoxin or bacteriocin produced by E. faecalis (Huycke et al., 1991) that contains two post-translationally modified peptides, $CylL_L$" and $CylL_S$" (Tang and van der Donk, 2013). Cytolysin has lytic activity against not only Gram-positive bacteria but also eukaryotic cells (Cox et al., 2005). $cylL_L$ and $cylL_S$ genomic DNA (cytolysin positive) was detected in fecal samples of 30% of patients with alcoholic hepatitis; none of the fecal samples from controls and the sample from only one patient with alcohol use disorder (out of a total of 38) was cytolysin positive, detected by qPCR (FIG. 5c). After this patient was enrolled in a physician-supervised abstinence program, their fecal sample became negative for cytolysin (not shown). Importantly, 78% of cytolysin-positive patients with alcoholic hepatitis died within 180 days after admission (FIG. 5d).

Figures 5E, 5F:
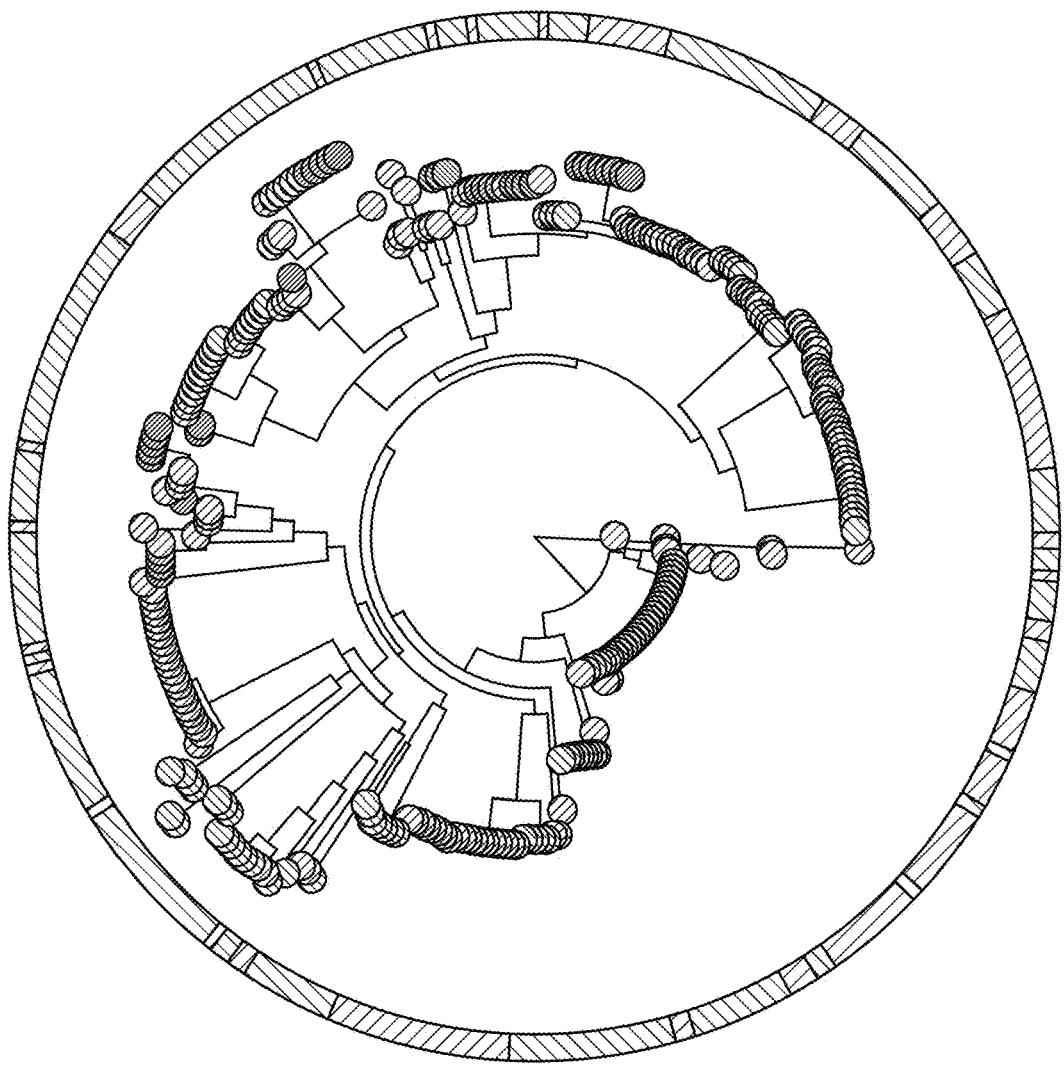

Univariate logistic regression of laboratory and clinical parameters associated detection of cytolysin in feces with international normalized ratio (INR), platelet numbers, model for end-stage liver disease (MELD) score, sodium MELD (MELDNa) score, and death (FIG. 18c). Detection of cytolysin correlated with overall mortality in alcoholic hepatitis patients with a hazard ratio of 22.24 (95% CI, 5.136-96.3; P=3e-09), whereas MELD score, which is used to predict mortality in clinical practice, had a hazard ratio of 1.068 (95% CI, 1.009-1.13; P=0.02) (FIG. 5e). When we performed receiver operating characteristic (ROC) curve analysis, MELD had an area under the curve (AUC) of 0.7, whereas detection of cytolysin had an AUC of 0.81 (FIG. 9d). Whole-genome sequencing of 148 E. faecalis isolates revealed the phylogenetic diversity of cytolysin-positive E. faecalis from patients with alcohol-associated hepatitis (FIG. 5f). Based on our findings, detection of cytolysin is a prognostic factor for worse liver-related outcomes and death.

Figures 2A, 2B, 2C:
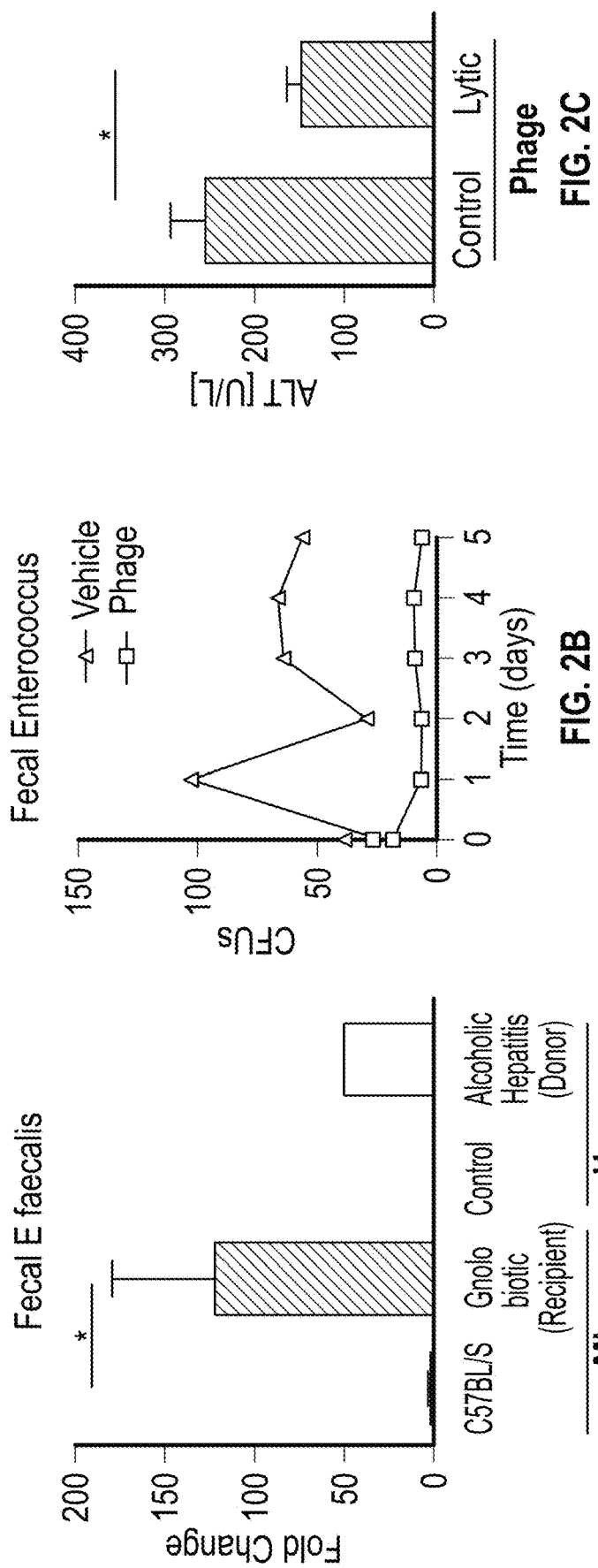
FIGS. 2A-C. A) Fold-change in fecal *E. faecalis* in control mice or mice receiving gnotobiotic, and control humans or humans with alcoholic hepatitis. B) CFUs in fecal *Enterococcus* in control or phage treated samples. and C) ALT concentration in control or phage treated samples.

To determine whether cytolysin contributes to liver damage mediated by E. faecalis, mice were gavaged with an isogenic cytolytic E. faecalis strain (FA2-2(pAM714)) or an E. faecalis strain that lacks cytolysin (FA2-2(pAM771)) (Ike et al., 1990) (non-cytolytic); the mice were then placed on a chronic-plus-binge ethanol diet (Bertola et al., 2013). Compared to mice given phosphate-buffed saline (PBS), mice fed ethanol after they were colonized with cytolytic E. faecalis developed more severe liver injury, indicated by higher level of alanine amino-transferase (ALT) (FIG. 6a) and hepatic steatosis (FIGS. 6b and 2c). The mice fed ethanol after they were colonized with cytolytic E. faecalis also had more liver inflammation with higher expression levels of mRNAs encoding inflammatory cytokines and chemokines (Il1b, Cxcl1, and Cxcl2) (FIG. 6d-2f) compared to mice given PBS. Mice fed ethanol after they were colonized with non-cytolytic E. faecalis had significantly less ethanol-induced liver injury, steatosis, and inflammation (FIG. 6a-2f) and longer survival times (FIG. 10a), compared with mice fed ethanol after they were colonized with cytolytic E. faecalis.

To explore the mechanism of cytolysin-associated liver damage, we measured cytolysin in the liver. $CylL_S$ was significantly increased in livers of mice colonized with cytolytic E. faecalis but not mice that were not given E. faecalis is or mice colonized with non-cytolytic E. faecalis following chronic ethanol administration (FIG. 6g). Cytolysin was not detectable in livers of mice fed an isocaloric (control) diet, indicating that ethanol-induced changes in the gut barrier are necessary for translocation of cytolytic E. faecalis from the intestine to the liver. Increased intestinal permeability was observed in ethanol-fed mice compared with isocaloric diet-fed mice, but there were no significant differences among mice that were not given E. faecalis ais and mice colonized with cytolytic or non-cytolytic E. faecalis following chronic ethanol administration (FIG. 6h), indicating that cytolysin does not affect intestinal barrier function.

Figure 10A:
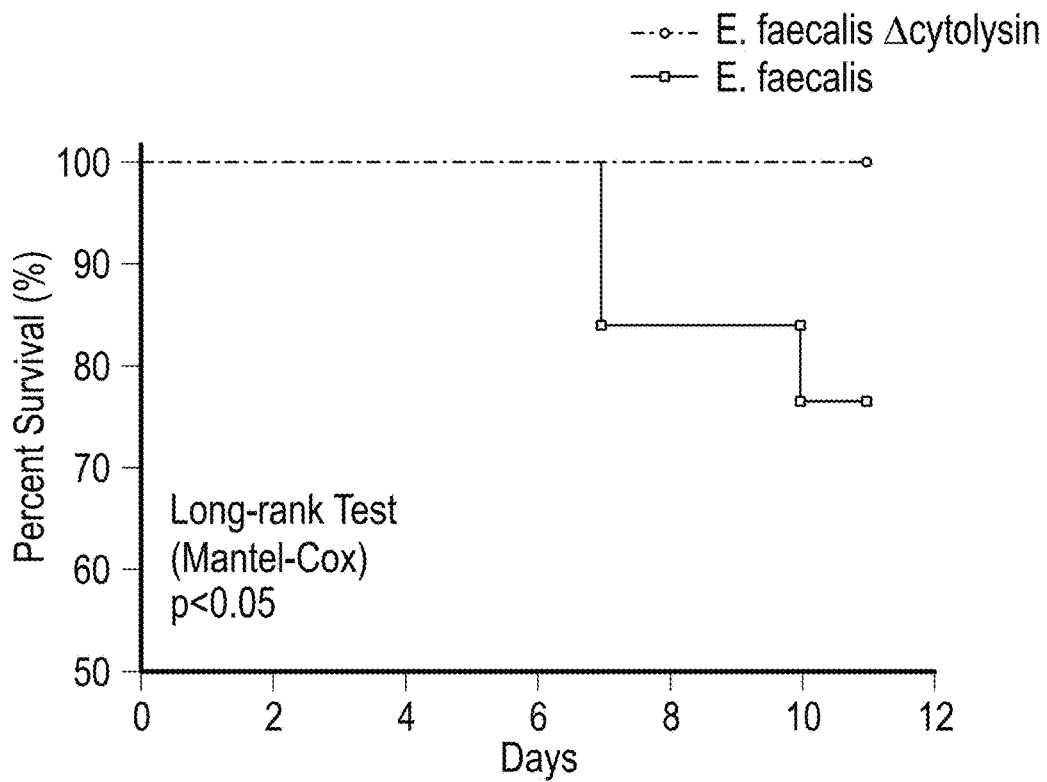
FIGS. 10A-E. Mice colonized with cytolytic *E. faecalis* are more susceptible to ethanol-induced liver disease. (A-D) C57BL/6 mice were fed oral isocaloric (control) or chronic-binge ethanol diets and gavaged with vehicle (PBS), an isogenic cytolytic *E. faecalis* strain (FA2-2(pAM714)) (*E. faecalis*) ($5 \times 10^8$ CFUs), or a non-cytolytic *E. faecalis* strain lacking cytolysin (FA2-2(pAM771)) (Ike et al., 1990) (*E. faecalis* Dcytolysin) ($5 \times 10^8$ CFUs) every third day. (A) Kaplan-Meier curve of survival of mice on chronic-plus-binge ethanol diets (day 0, start of ethanol feeding). Mice gavaged with PBS all survived and were not included in figure. A higher proportion of mice (n=15) gavaged with non-cytolytic *E. faecalis* survived than mice (n=19) gavaged with cytolytic *E. faecalis*. (B) Fecal samples were collected and 16S rRNA genes were sequenced. Principal coordinate analysis based on Jaccard dissimilarity matrices showed no significant differences among mice gavaged with PBS, cytolytic or non-cytolytic *E. faecalis* following the diets (Control diet: PBS, n=7; *E. faecalis*, n=7; *E. faecalis* Dcytolysin, n=7; Ethanol diet: PBS, n==15; *E. faecalis*, n=19; *E. faecalis* Dcytolysin, n=15). Compared to control-diet fed mice, mice fed with ethanol diet had significant different fecal microbiomes after colonizing with *E. faecalis* (P=0.015). (C and D) Serum levels of ethanol and hepatic levels of Adh1 and Cyp2e1 mRNAs did not differ significantly among these mice after ethanol feeding. Results are expressed as mean±s.e.m (C, D). P values are determined by PERMANOVA followed by FDR procedures (b), or One-way ANOVA with Tukey's post-hoc test (c, d).
Figure 10B:
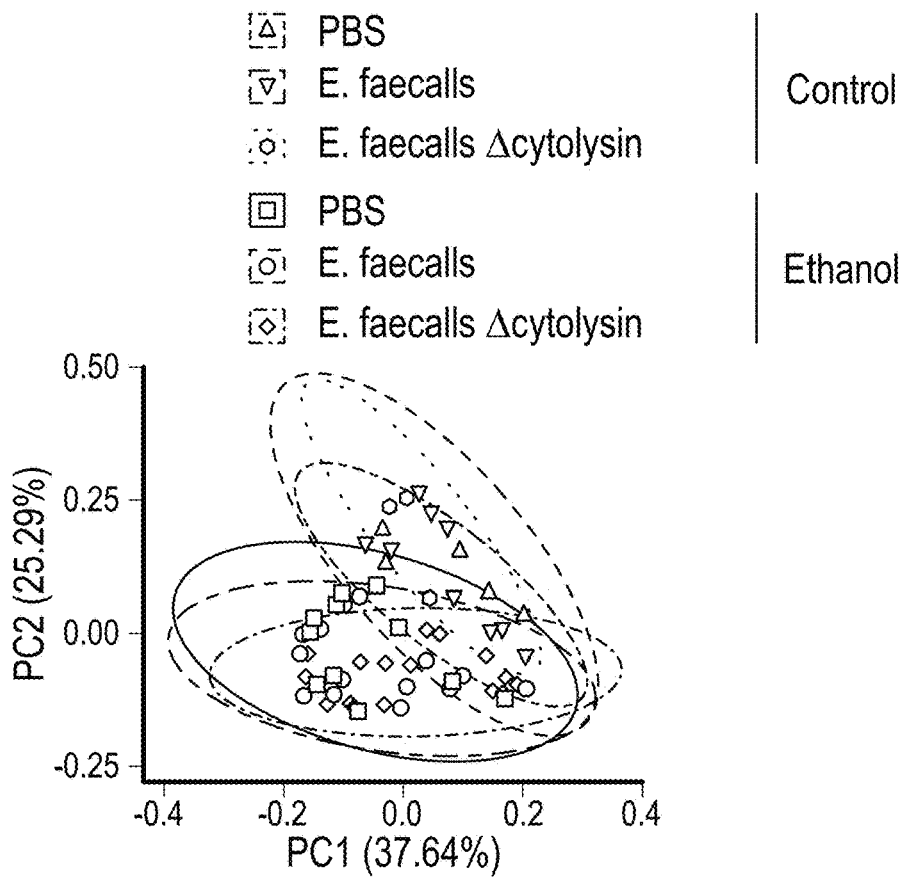
Figure 10C:
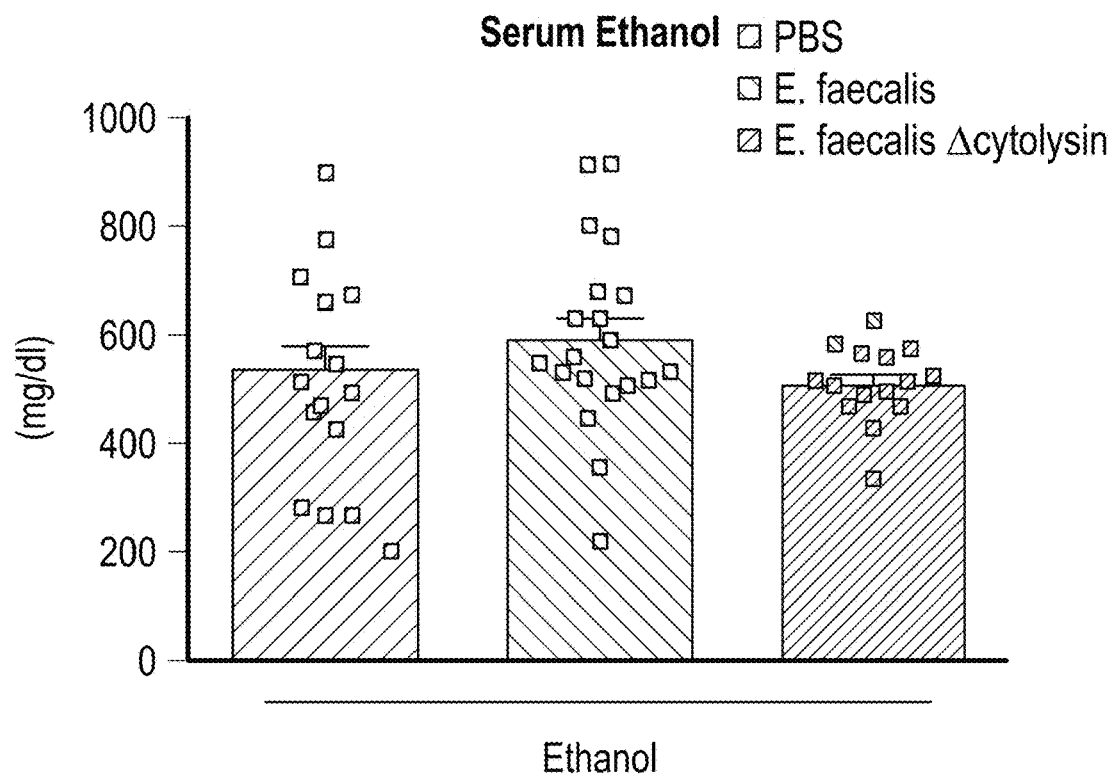
Figure 10D:
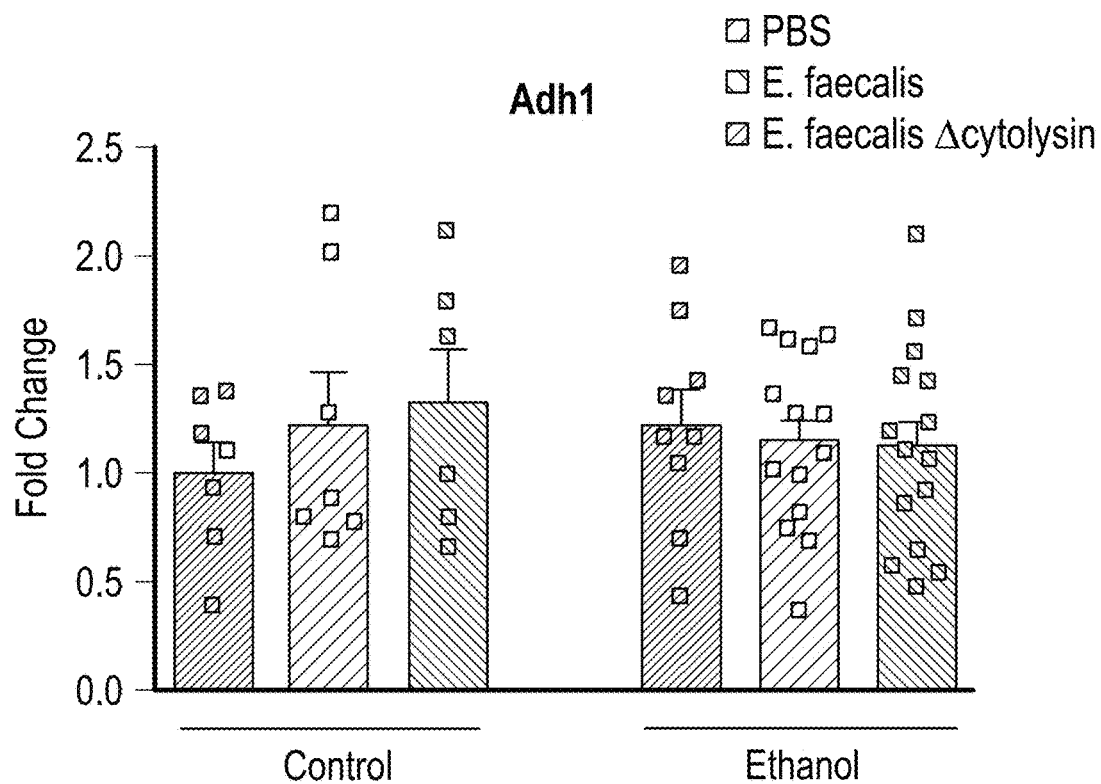
Figure 10E:
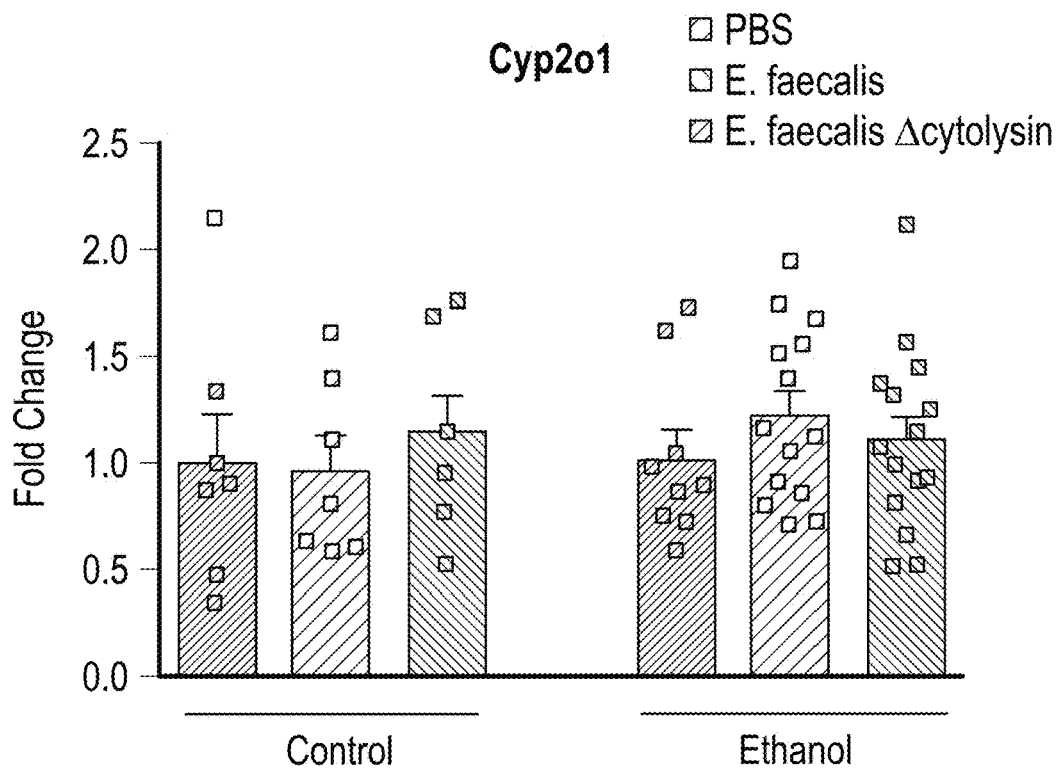

Colonization of mice with cytolytic or non-cytolytic E. faecalis did not significantly change the composition of the intestinal microbiota, based on 16S rRNA gene sequencing (FIG. 10b). Cytolytic E. faecalis did not affect intestinal absorption or hepatic metabolism of ethanol, based on serum levels of ethanol and liver levels of Adh1 or Cyp2e1 mRNAs (encode enzymes that metabolize ethanol in the liver) (FIGS. 10c and 10d). These results indicate that E. faecalis that produce cytolysin promotes ethanol-induced liver disease in mice.

Figure 11A:
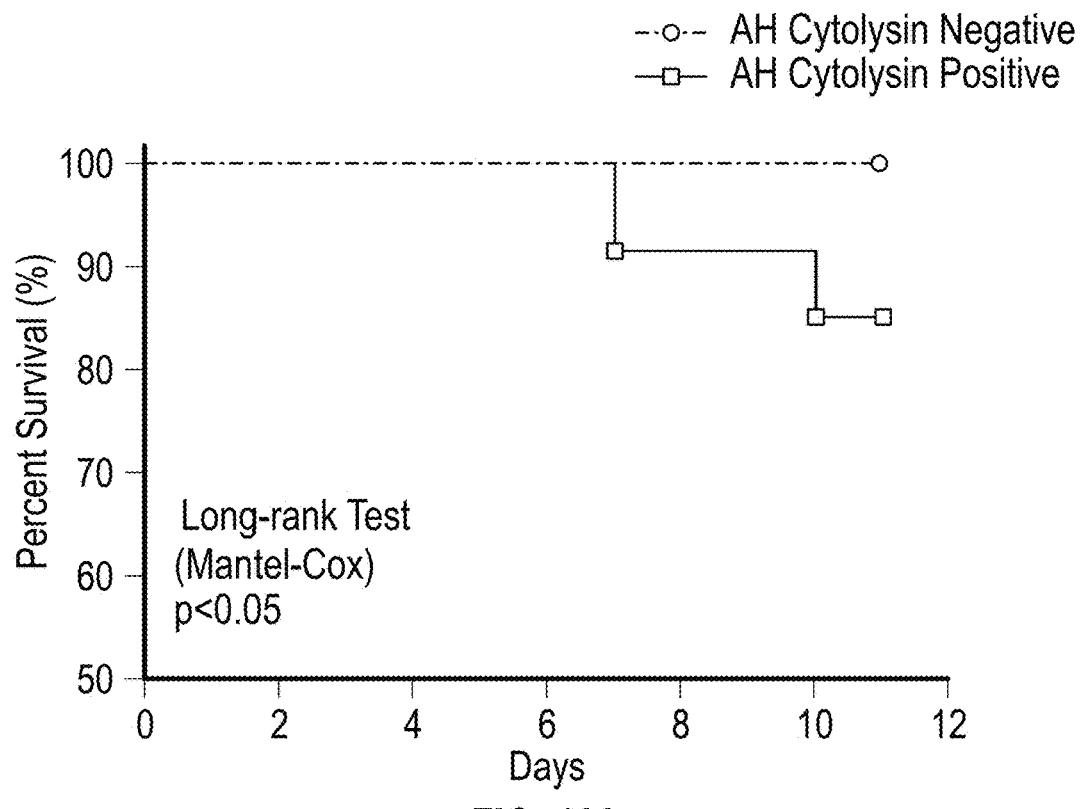
FIGS. 11 A-G. Transplantation of cytolysin-positive feces increases ethanol-induced liver disease in gnotobiotic mice. (A-C, E-F) C57BL/6 germ-free mice were colonized with feces from two different cytolysin-positive and two different cytolysin-negative patients with alcoholic hepatitis, and then fed isocaloric (control) or chronic-binge ethanol diets. (A) Kaplan-Meier curve of survival of mice on chronic-plus-binge ethanol diets (day 0, start of ethanol feeding) gavaged with feces from cytolysin-positive (n=41 mice) or cytolysin-negative (n=38 mice) patients with alcoholic hepatitis. (B) Fecal samples were collected and 16S rRNA genes were sequenced. The graph shows principal coordinate analysis of fecal microbiomes (Control diet: AH cytolysin positive #1, n=6; AH cytolysin positive #2, n=6; AH cytolysin negative #3, n=11; AH cytolysin negative #4, n=7; Ethanol diet: All cytolysin positive #1, n=24; AH cytolysin positive #2, n=16; AH cytolysin negative #3, n=24; AH cytolysin negative #4, n=11). No significant difference was observed between mice colonized with feces from cytolysin positive or negative alcoholic hepatitis donors following the control diet. Mice transplanted with feces from cytolysin-positive alcoholic hepatitis patient #2 showed a significantly different microbiota than the other mouse groups following ethanol administration (P=0.006). (C) Fecal CFUs of *Enterococcus*. (D) Percentage of cytolysin-positive. *faecalis* in 4 patients with alcoholic hepatitis. (E) Serum levels of ethanol were comparable among colonized mice after ethanol feeding. (F) Hepatic levels of Adh1 and Cyp2e1 mRNAs did not differ significantly among colonized mice on control or ethanol diets. Results are expressed as mean±s.e.m (C, E, F). P values are determined by PERMANOVA followed by FDR procedures (B), or One-way ANOVA with Tukey's post-hoc test (C, E, F). *P<0.05.
Figure 11C:
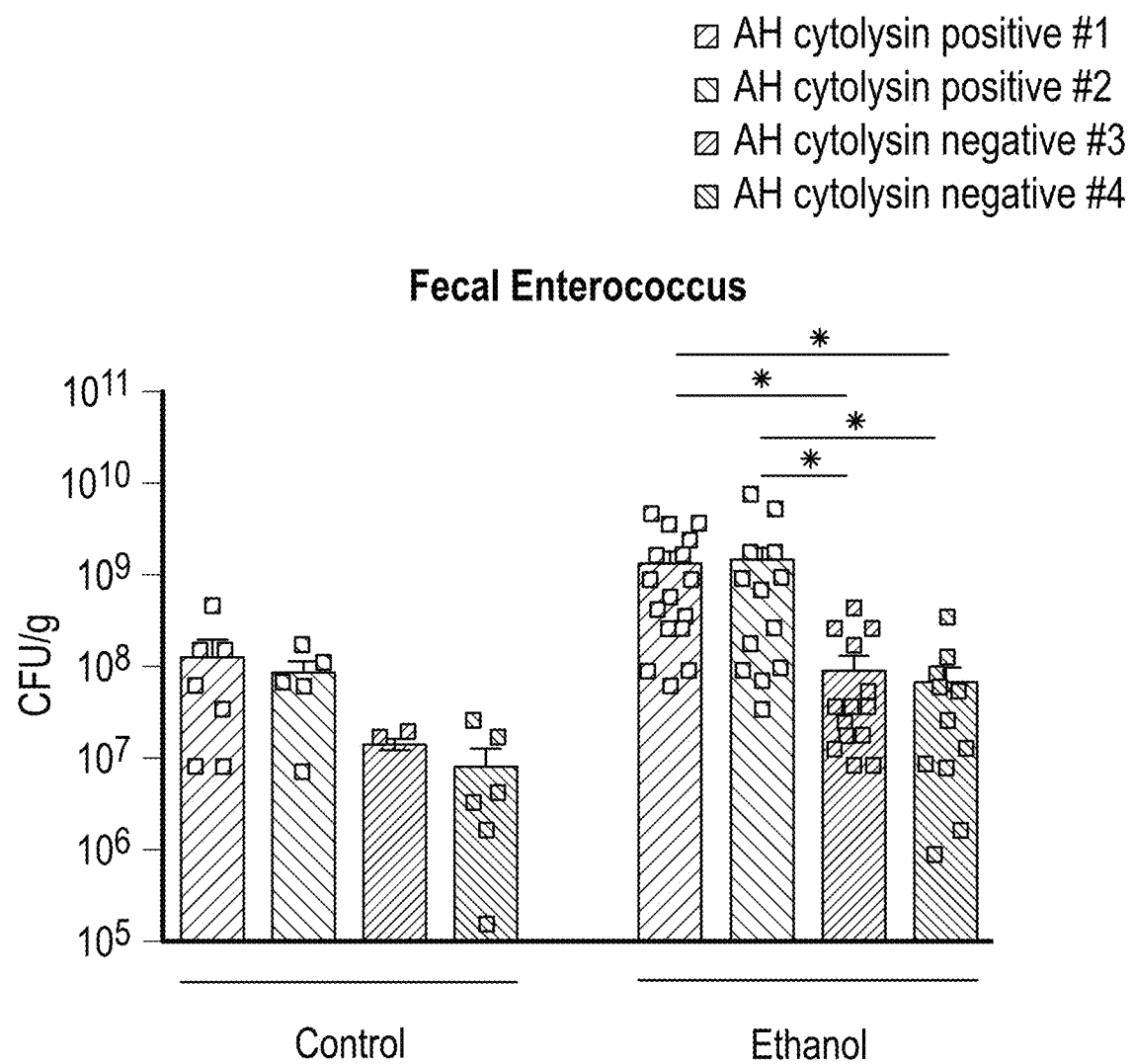
Figure 11D:
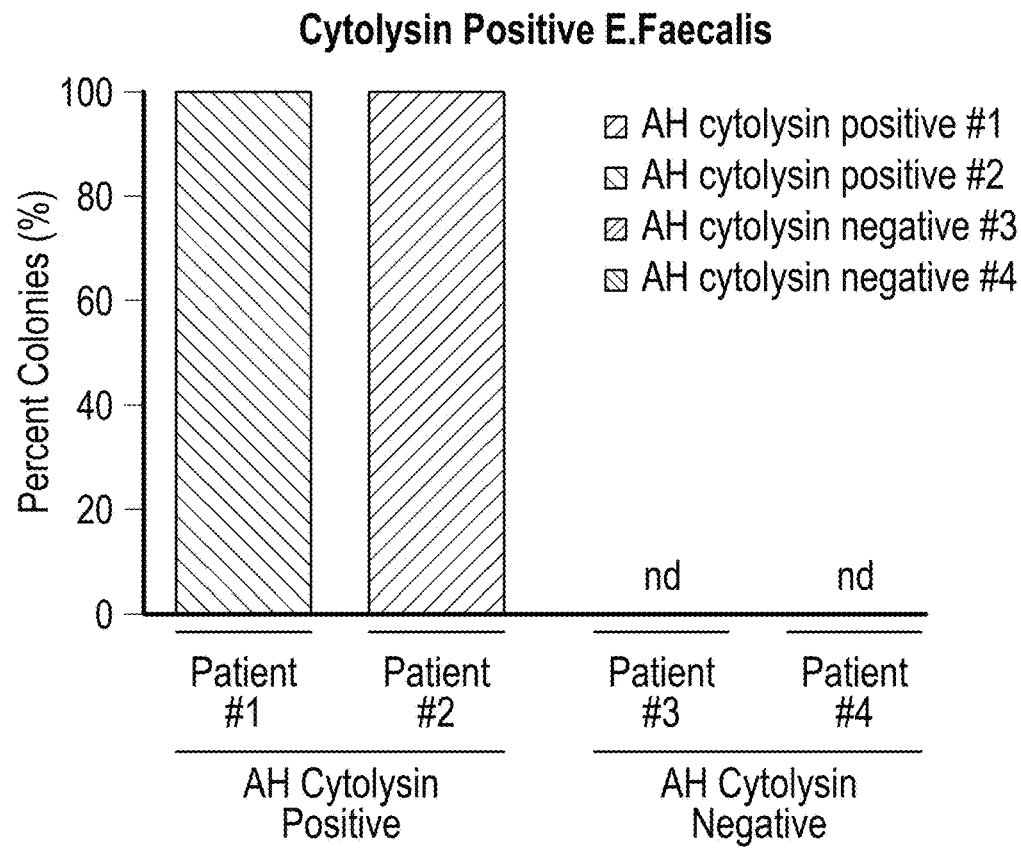
Figure 11E:
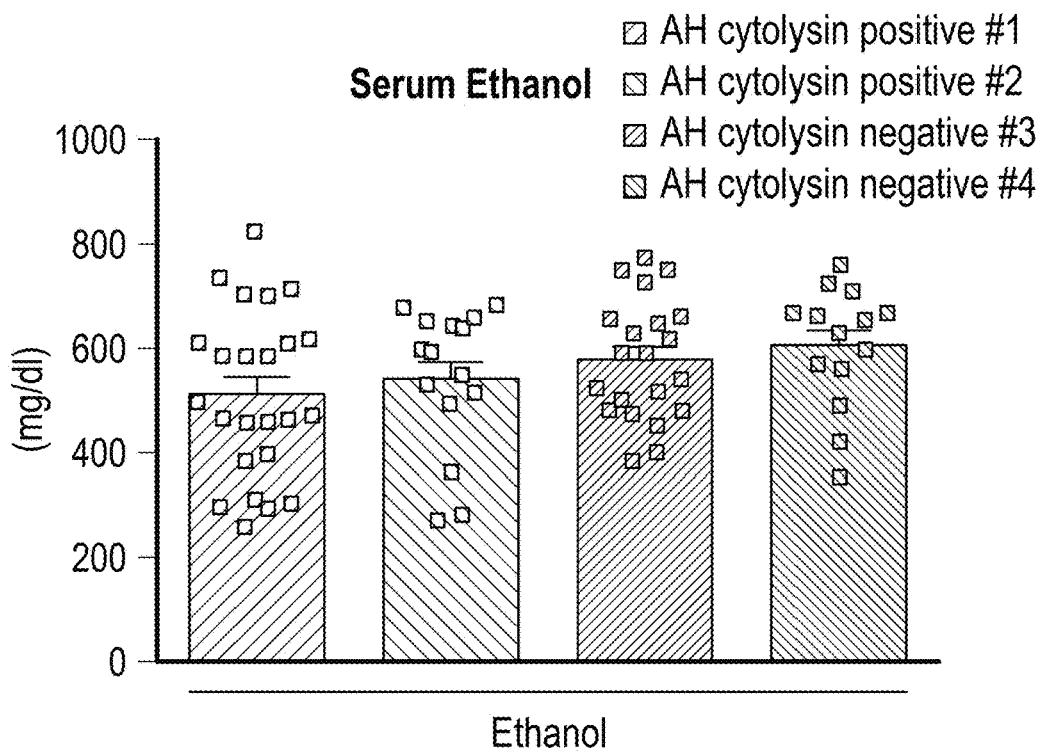
Figure 11F:
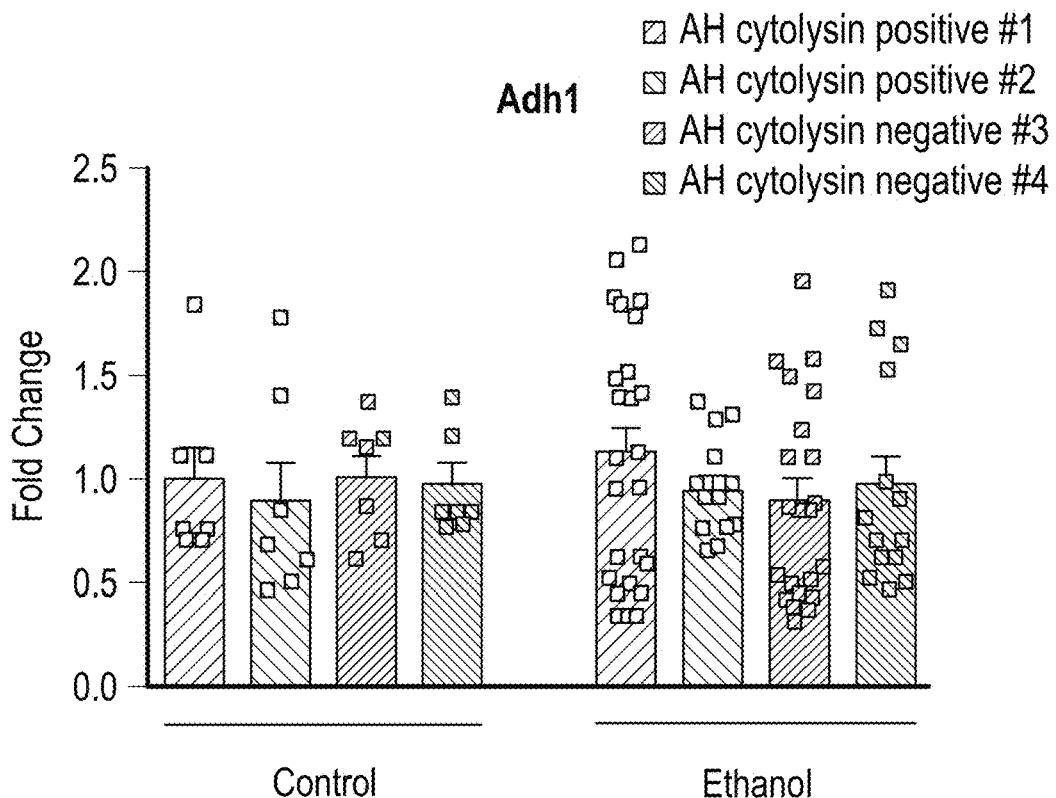
Figure 11G:
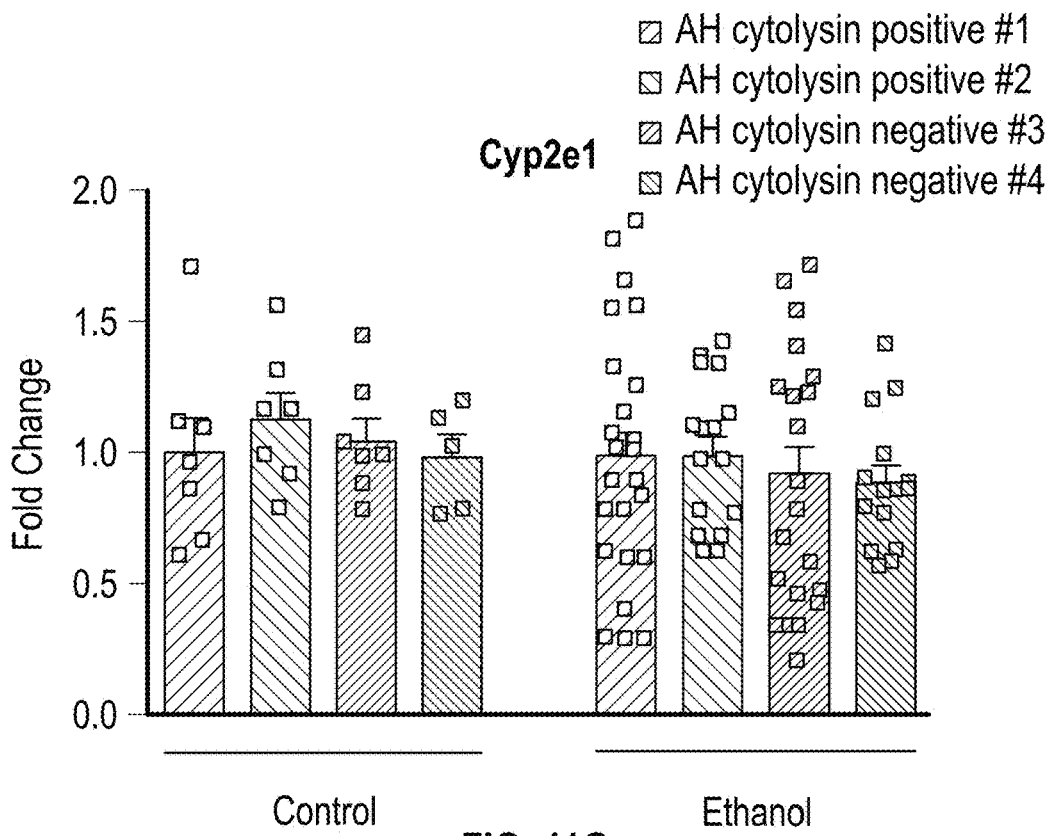

Germ-free mice were colonized with feces from cytolysin-negative and -positive patients with alcoholic hepatitis. Consistent with the findings from mice colonized with cytolytic E. faecalis, gnotobiotic C57BL/6 mice colonized with feces from two different cytolysin-positive patients developed more severe ethanol-induced liver injury, steatosis, and inflammation than mice given feces from two different cytolysin-negative patients (FIG. 7a-3f). Transplantation of feces from cytolysin-positive patients reduced survival time of the mice (FIG. 11a) and increased translocation of cytolytic E. faecalis to the liver following ethanol administration (FIG. 7g). Composition of the intestinal microbiota was not different between mice colonized with feces from cytolysin positive or negative alcoholic hepatitis donors following the control diet, based on 16S rRNA gene sequencing. Mice transplanted with feces from one cytolysin-positive alcoholic hepatitis patient (#2) showed a significantly different microbiota than the other mouse groups following ethanol administration (FIG. 11b). Numbers of Enterococcus were higher in feces from ethanol-fed mice given feces from cytolysin-positive than cytolysin-negative patients, but there was no significant difference between these mice if they were on the control diet (FIG. 11c). Interestingly, stool samples from donors with cytolytic E. faecalis did not appear to contain cytolysin-negative E. faecalis (FIG. 11d). No differences were observed between mice colonized with feces from cytolysin-positive vs cytolysin-negative patients in intestinal absorption or hepatic metabolism of ethanol (FIGS. 11e and 11f). These results provide further evidence that cytolysin promotes ethanol-induced liver disease.

To determine the mechanism by which cytolysin increases liver disease, we isolated hepatocytes from mice on ethanol or control diets and stimulated them with pure bioactive cytolysin peptides ($CylL_L$ and $CylL_S$) (Tang and van der Donk, 2013). Incubation of the primary mouse hepatocytes with two cytolysin subunits caused a dose-dependent increase in cell death compared to hepatocytes incubated with vehicle or with one subunit alone (FIG. 11h). Interestingly, when hepatocytes were isolated from ethanol-fed mice and then incubated with ethanol, increased levels of cytolysin-induced cell death were not observed compared to hepatocytes isolated from mice on the control diet. The cytotoxic effects of cytolysin are likely mediated by pore formation, resulting in cell lysis (Van Tyne et al., 2013). The results indicate that ethanol-associated gut barrier dysfunction and subsequent translocation of cytolytic *E. faecalis* from the intestine to the liver contributes to liver cell damage.

Figure 12A:
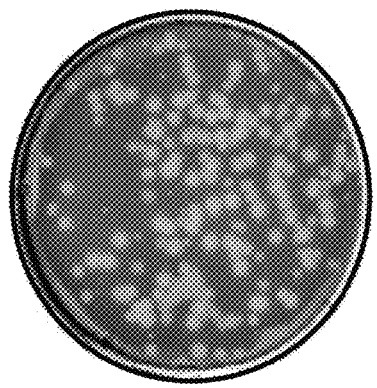
FIGS. 12A-C. Isolation and amplification of bacteriophages against cytolytic *E. faecalis* isolated from mice. (A) BHI agar plate showing bacteriophage plaque morphology. Bacteriophage cocktail (100 μl, $10^2$-$10^3$ PFUs) was mixed with overnight grown *E. faecalis* culture (100 μl) and then added to BHI broth top agar (0.5% agar) and poured over a BHI plate (1.5% agar). After overnight growth at 37° C., images were captured on an Epson Perfection 4990 Photo scanner. (B) Illustration of different bacteriophage morphology. Siphophages have long, flexible, noncontractile tails (left), myophages have contractile tails (middle), and podophages have short, noncontractile tails (right). (C) Transmission electron microscopy revealed that bacteriophages isolated were all podophages (mus_1, mus_2, mus_3 and mus_4). Phages specific to *E. faecalis* strain isolated from mouse feces were named as Efφmus with a number (Ef for *E. faecalis*, φ for phage, mus for mouse, digit for isolation order). Scale bar=50 nm.
Figure 12B:
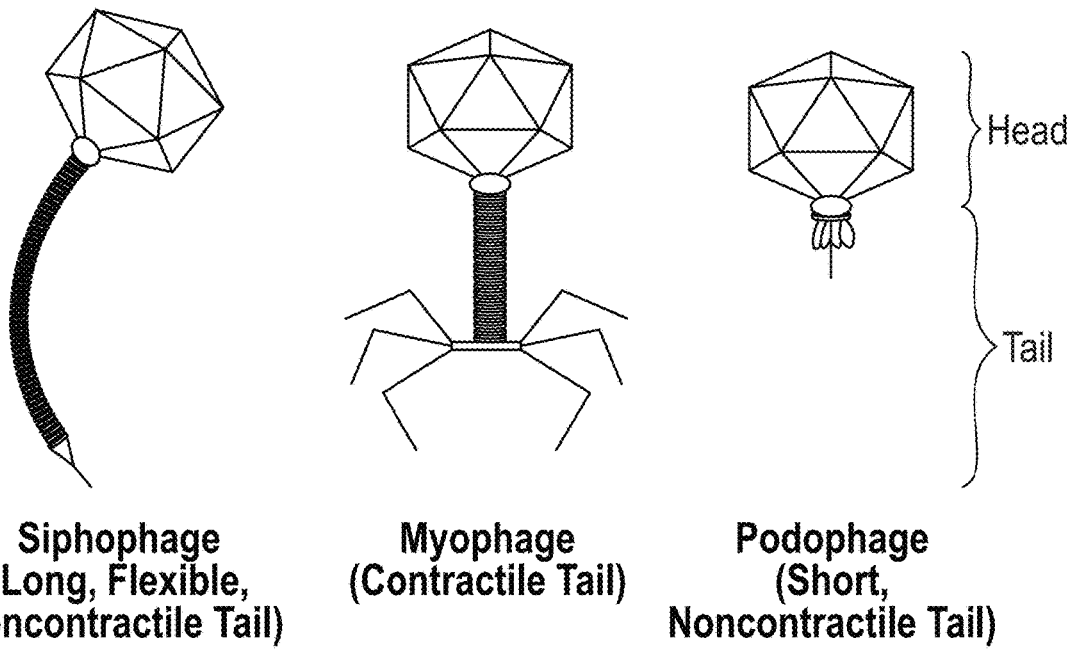
Figure 12C:
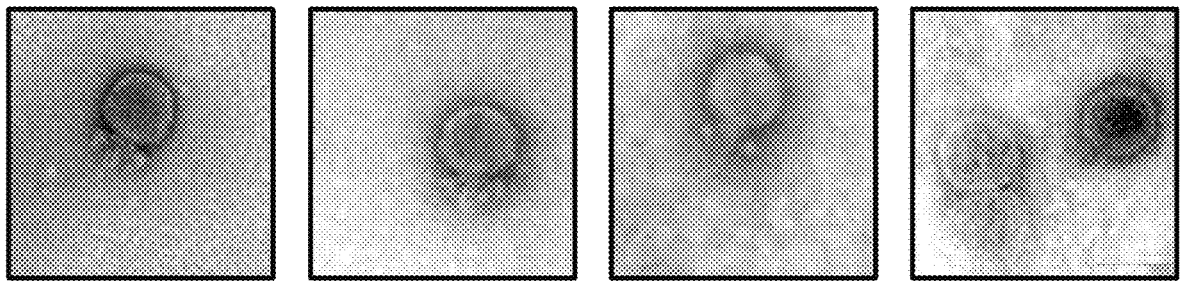
Figure 13A:
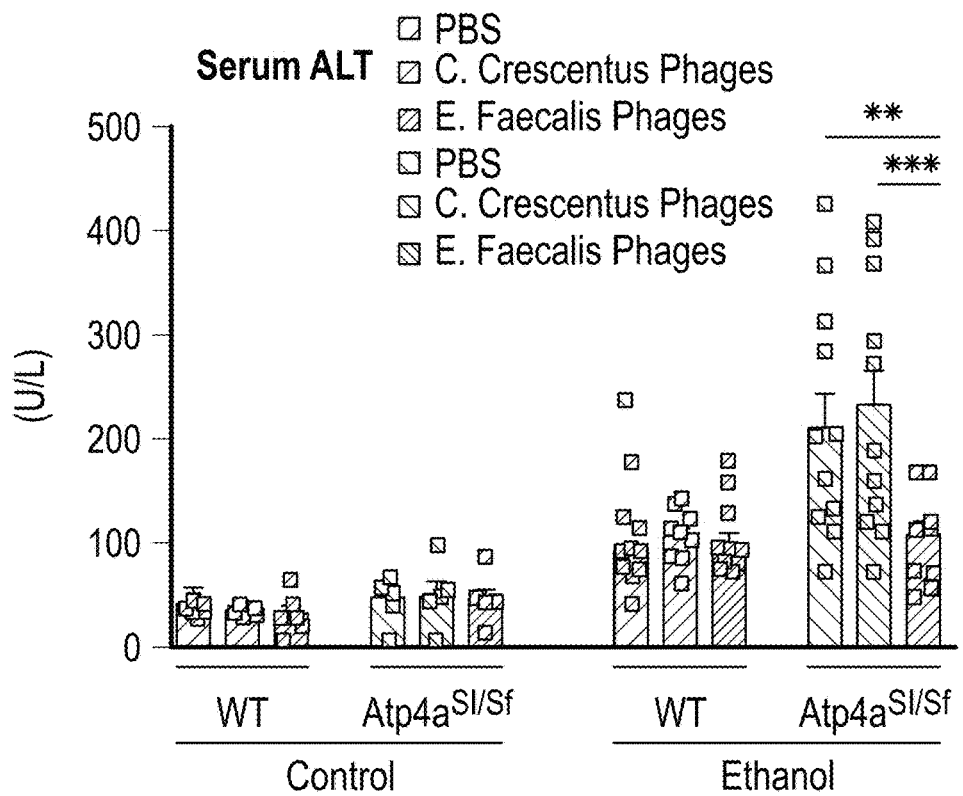
Figure 13B:
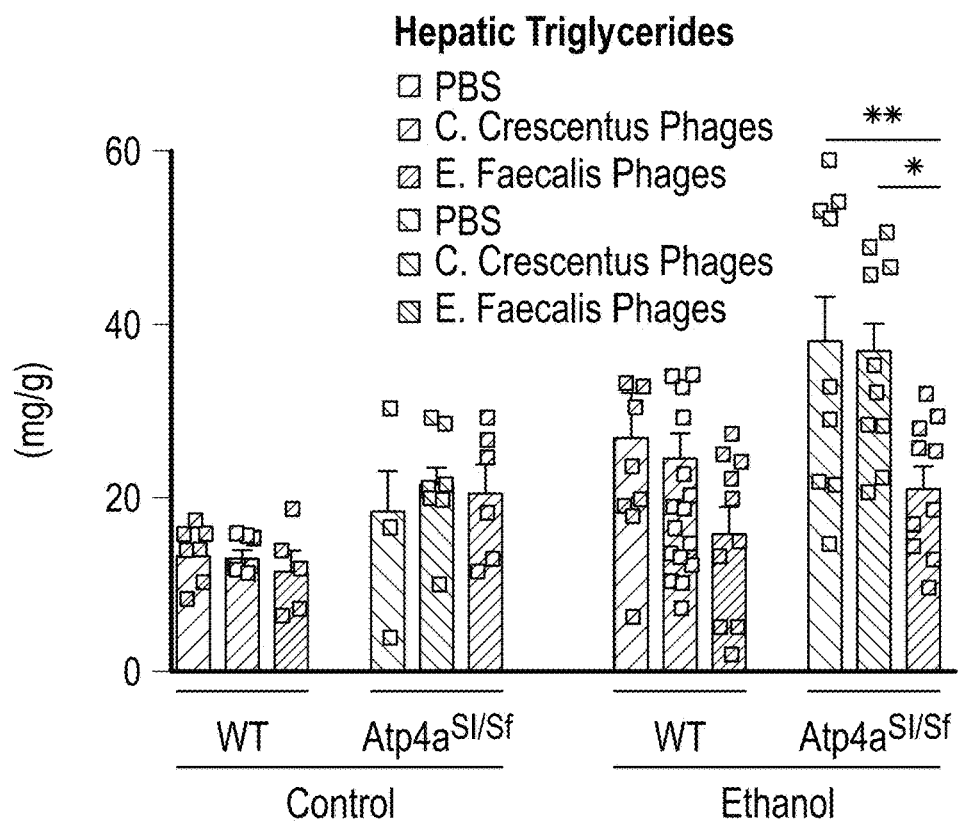
Figure 13C:
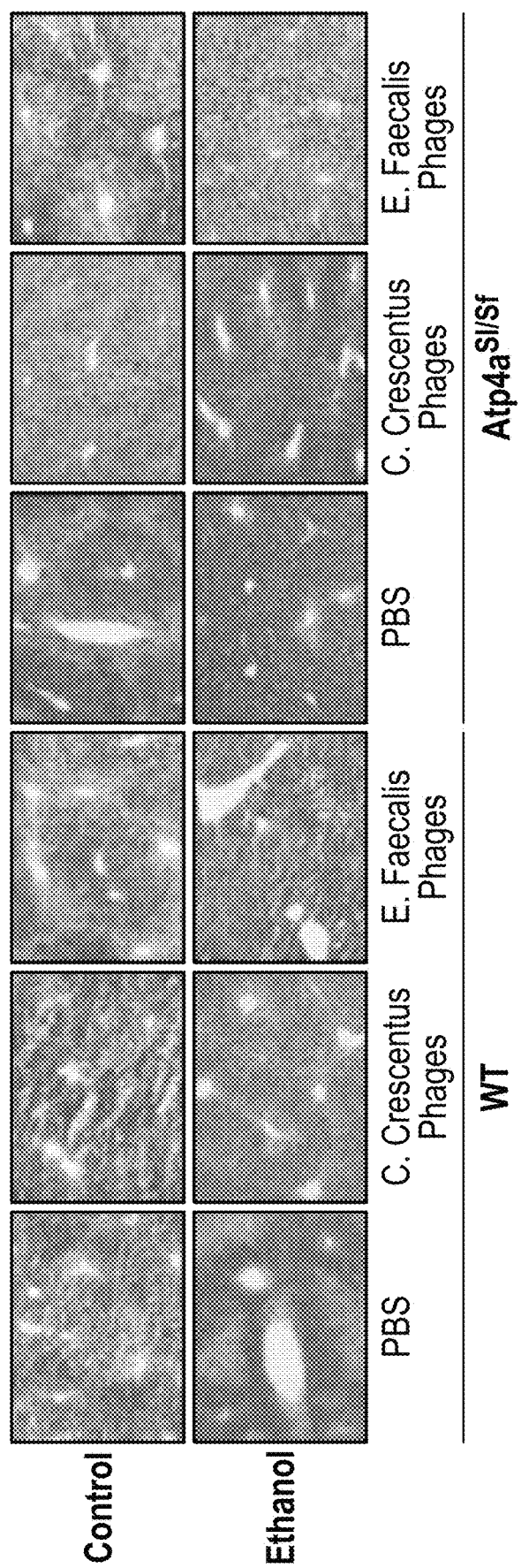
Figure 13D:
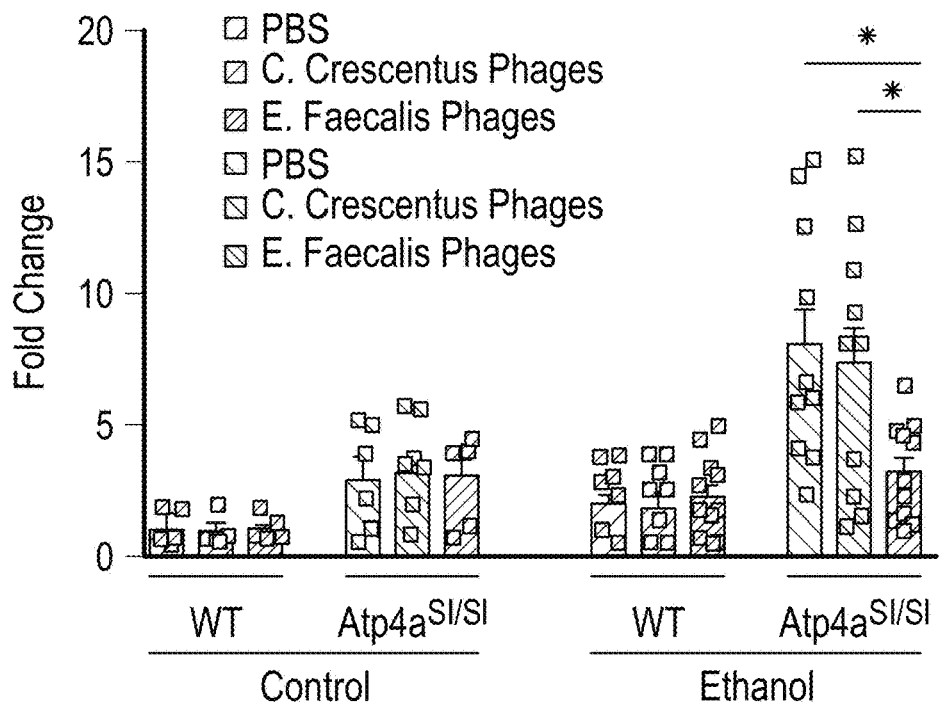
Figure 13E:
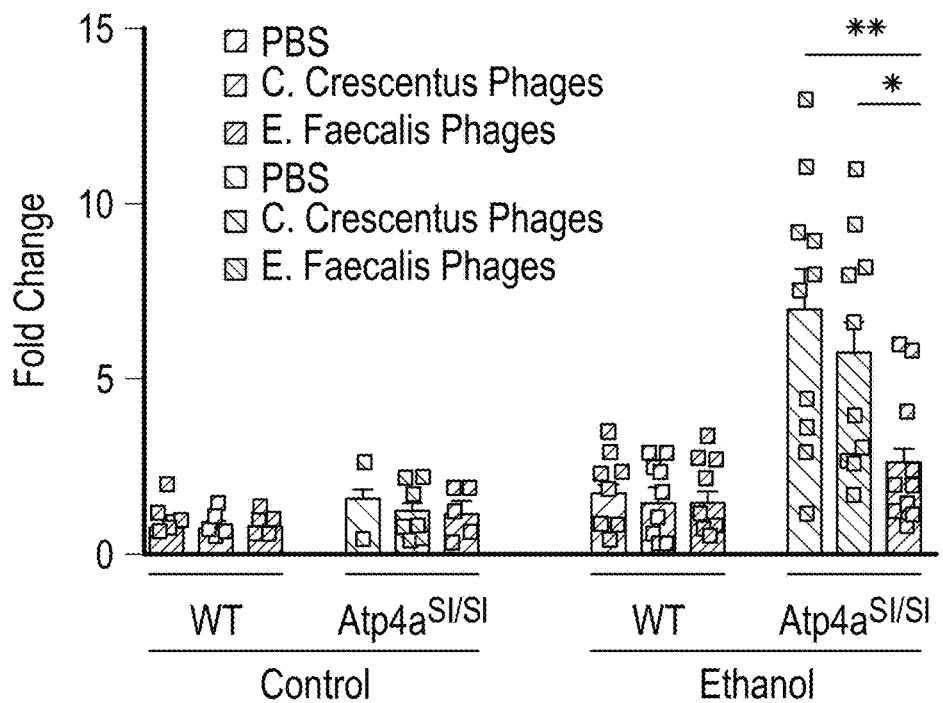
Figure 13F:
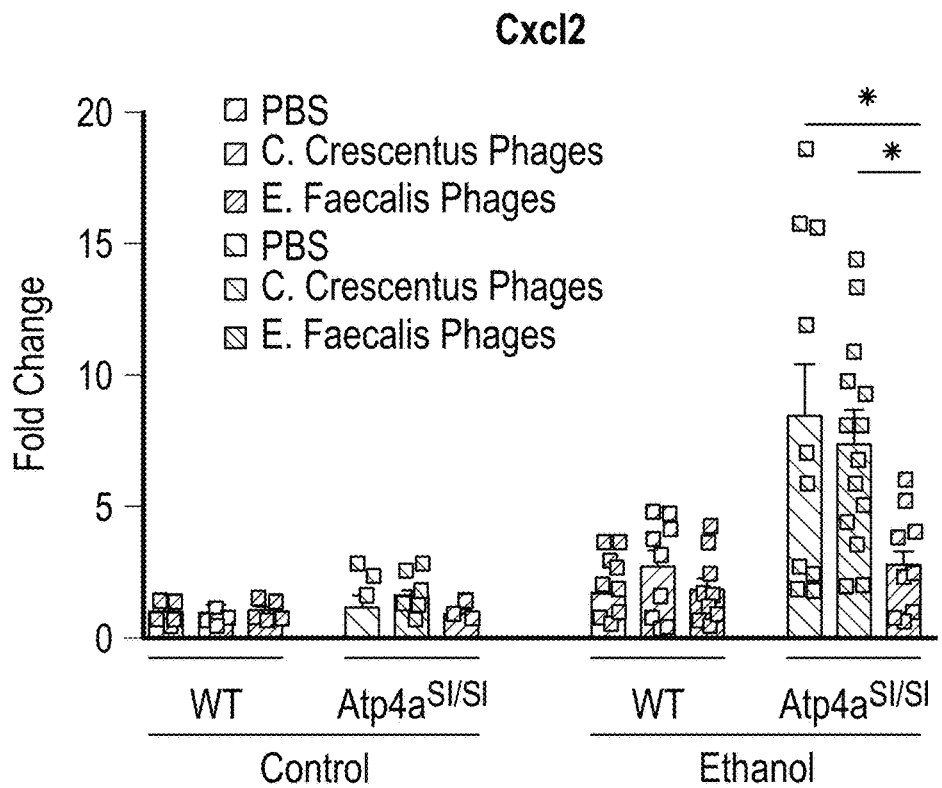
Figure 13G:
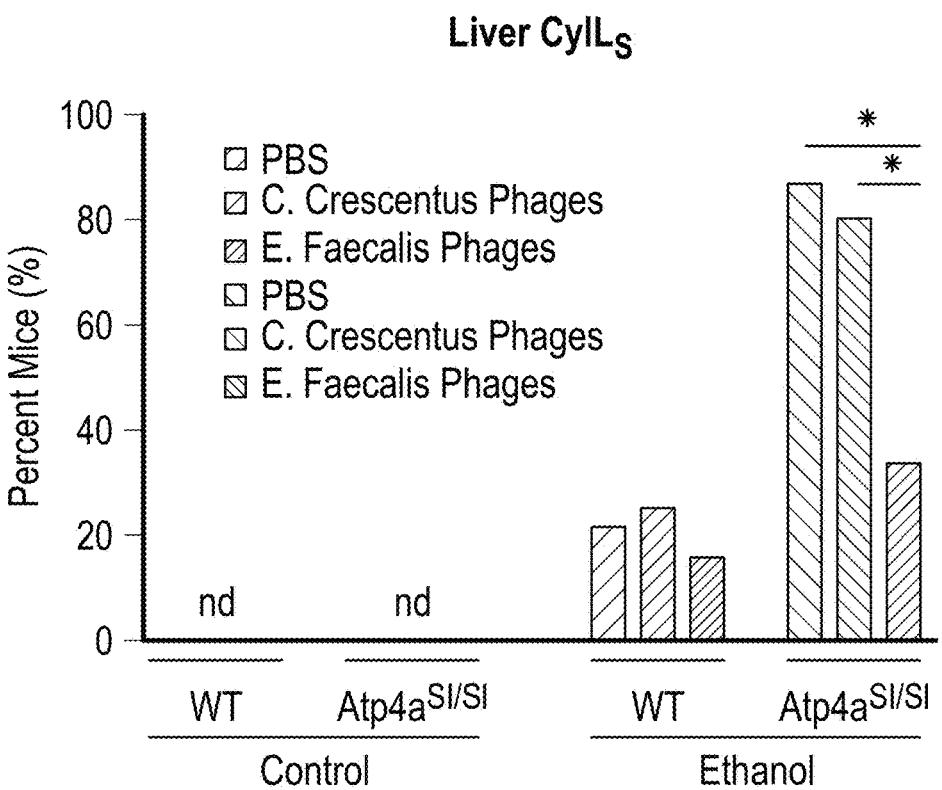
Figure 13H:
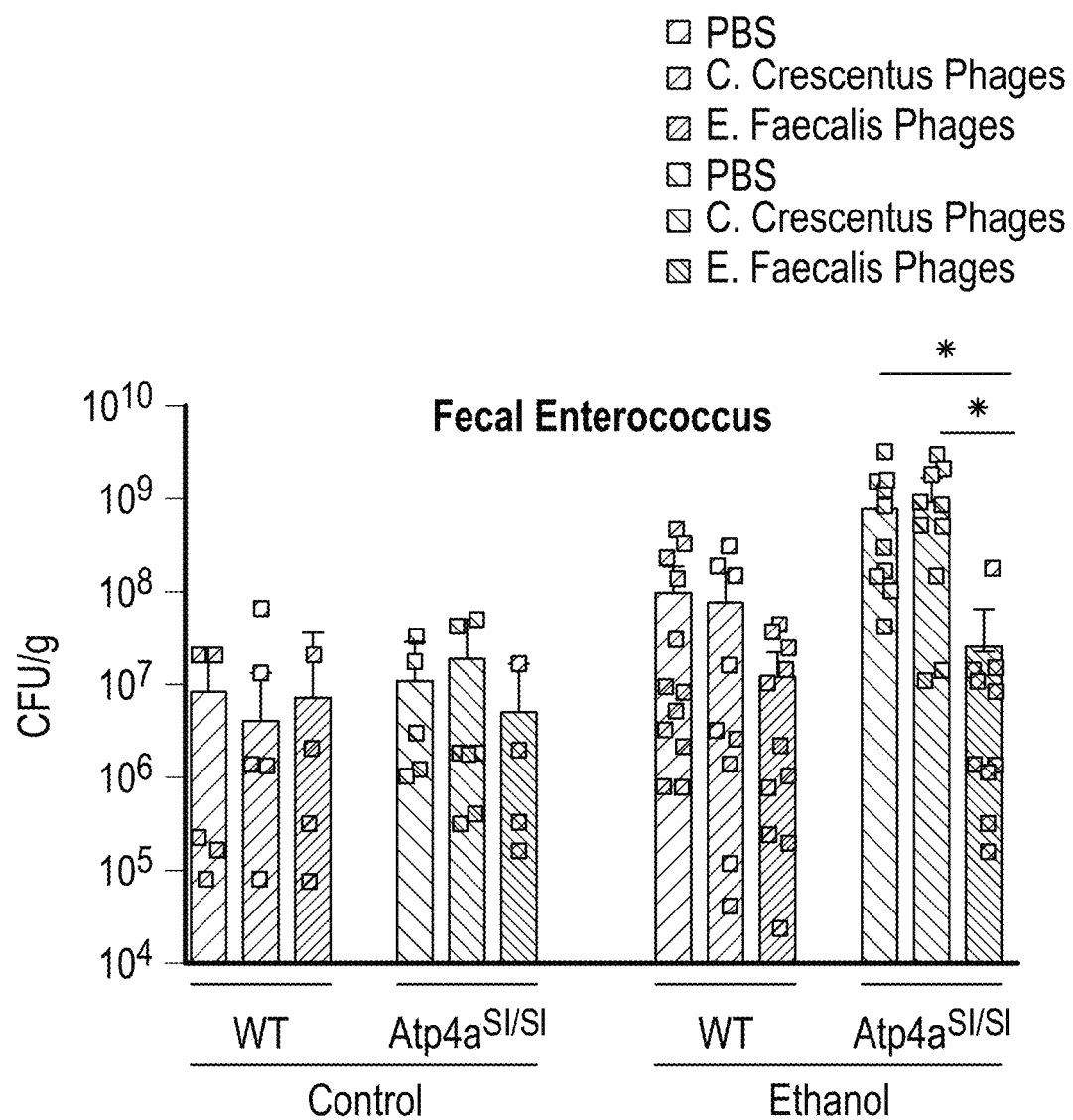
Figure 13J:
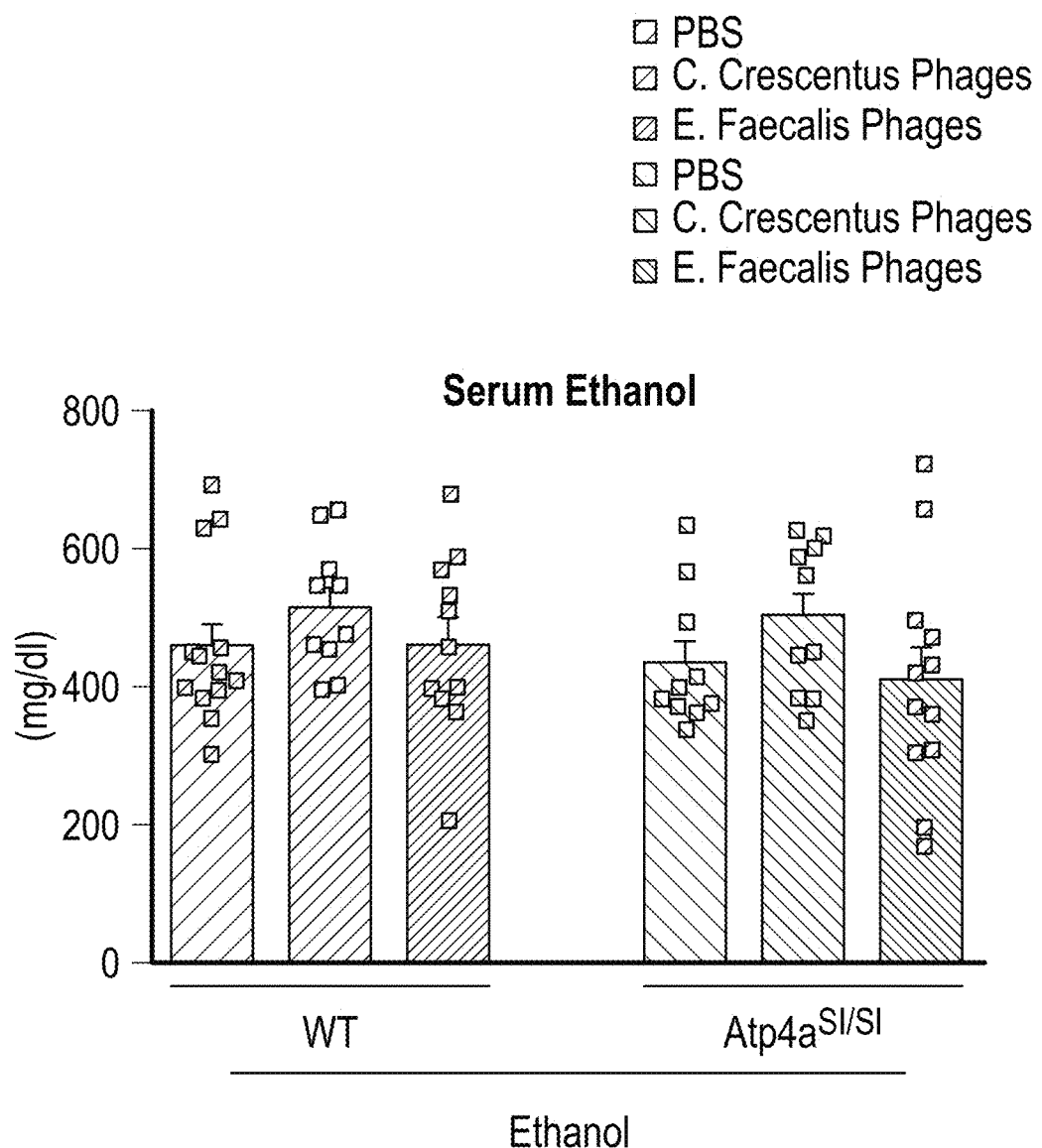
Figure 13K:
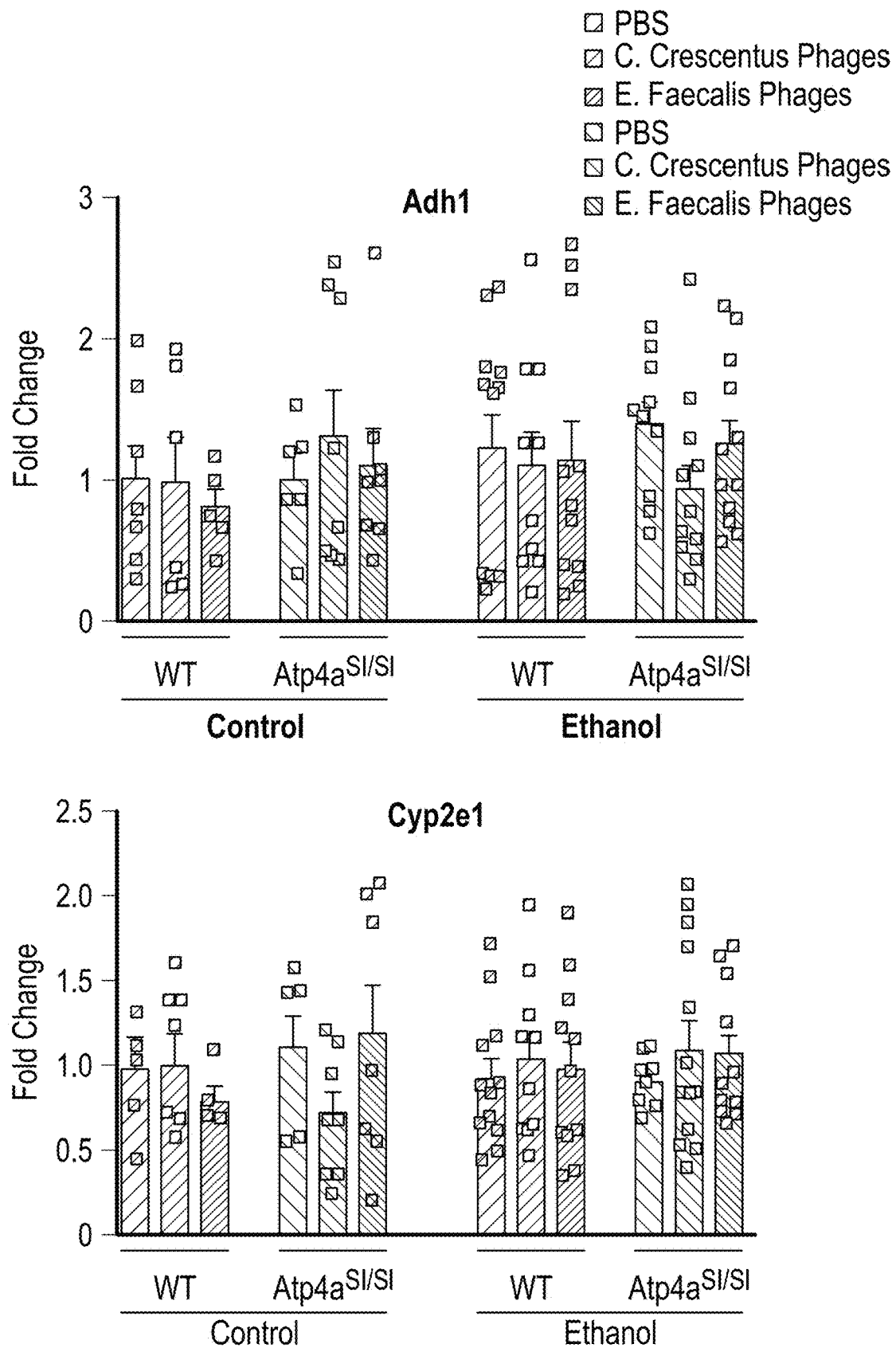

To further demonstrate a causative role of cytolytic *E. faecalis* for the development of ethanol-induced steatohepatitis, the effects of naturally occurring bacteriophages that reduce cytolytic *E. faecalis* in the intestine were investigated. Bacteriophages, viruses that infect bacteria, are highly specific for bacterial strains (Nobrega et al., 2018). Atp4a$^{Sl/Sl}$ mice, which lack gastric acid, have overgrowth of intestinal enterococci, associated with increased susceptibility to alcohol-induced steatohepatitis (Llorente et al., 2017). Gavaging of wild-type mice with an *E. faecalis* strain isolated from Atp4a$^{Sl/Sl}$ mice increased ethanol-induced steatohepatitis (Llorente et al., 2017). It was found that this *E. faecalis* strain expressed cytolysin. Four distinct naturally occurring bacteriophages that lyse the cytolytic *E. faecalis* strain isolated from Atp4a$^{Sl/Sl}$ mice (FIG. 12) were isolated. Lytic bacteriophages were from the family of Podoviridae (FIGS. 12b and 12c). Atp4a$^{Sl/Sl}$ mice and their wild-type littermates were then placed on the chronic-plus-binge ethanol diet and gavaged with the lytic bacteriophage cocktail (FIG. 13). Bacteriophages directed against (*Caulobacter crescentus* (*C. crescentus*), a bacterium that is present in fresh water lakes and streams (Poindexter, 1964), but does not colonize humans or rodents (Shin et al., 2016), were used as controls. Compared to Atp4a$^{Sl/Sl}$ gavaged with control bacteriophage or vehicle, Atp4a$^{Sl/Sl}$ mice gavaged with bacteriophages that target cytolytic *E. faecalis* had less liver injury, steatosis, and inflammation following chronic ethanol feeding (FIG. 13a-13f). Administration of *E. faecalis* bacteriophage significantly reduced levels of cytolysin in the liver (FIG. 13g) and fecal amounts of *Enterococcus* (FIG. 13h). Bacteriophage administration did not affect the overall composition of the fecal microbiome or intestinal absorption or hepatic metabolism of ethanol (FIG. 13i-13k).

Figure 15A:
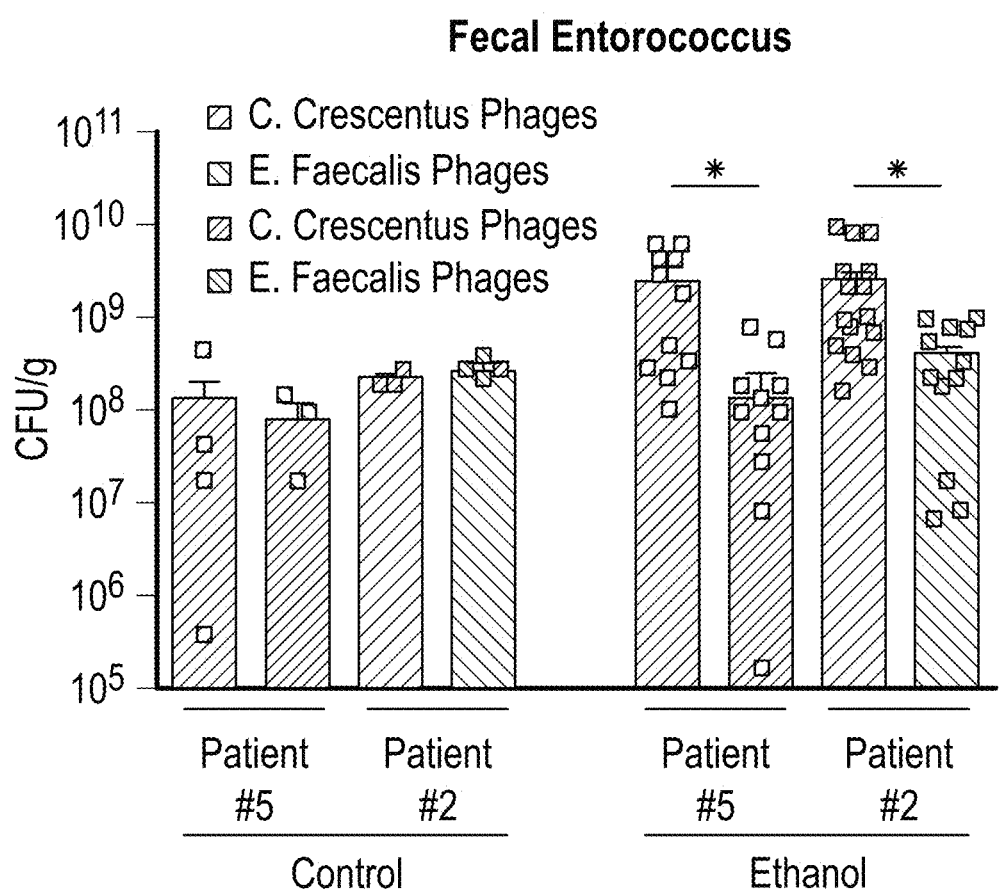
Figure 15C:
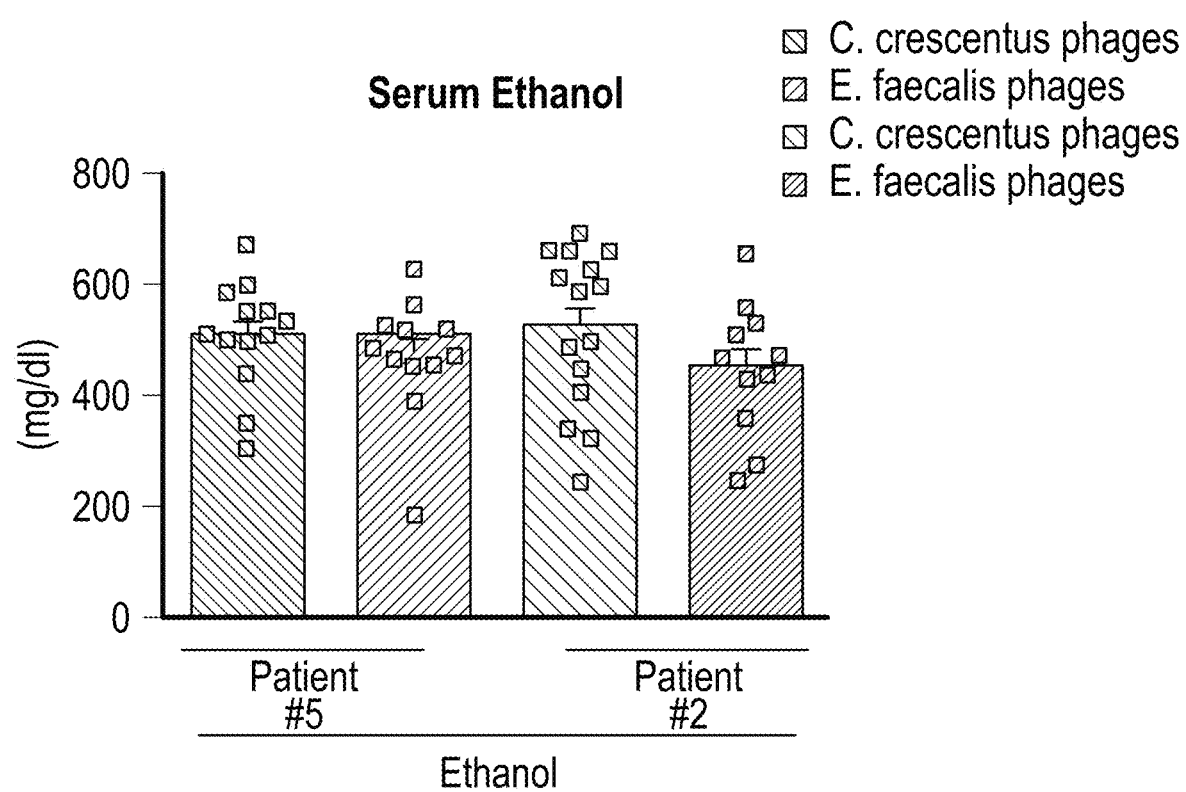
Figure 15D:
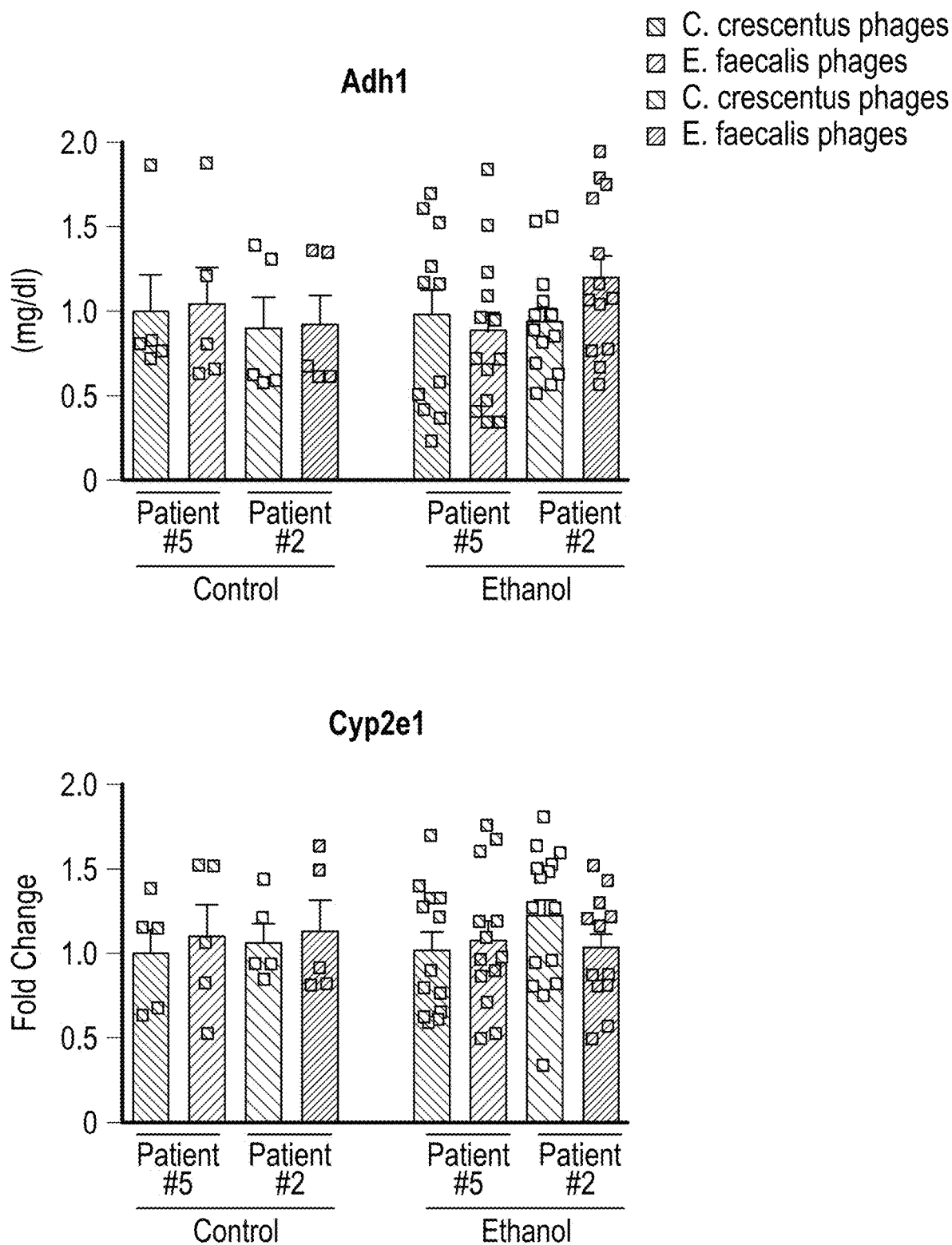
Figure 16C:
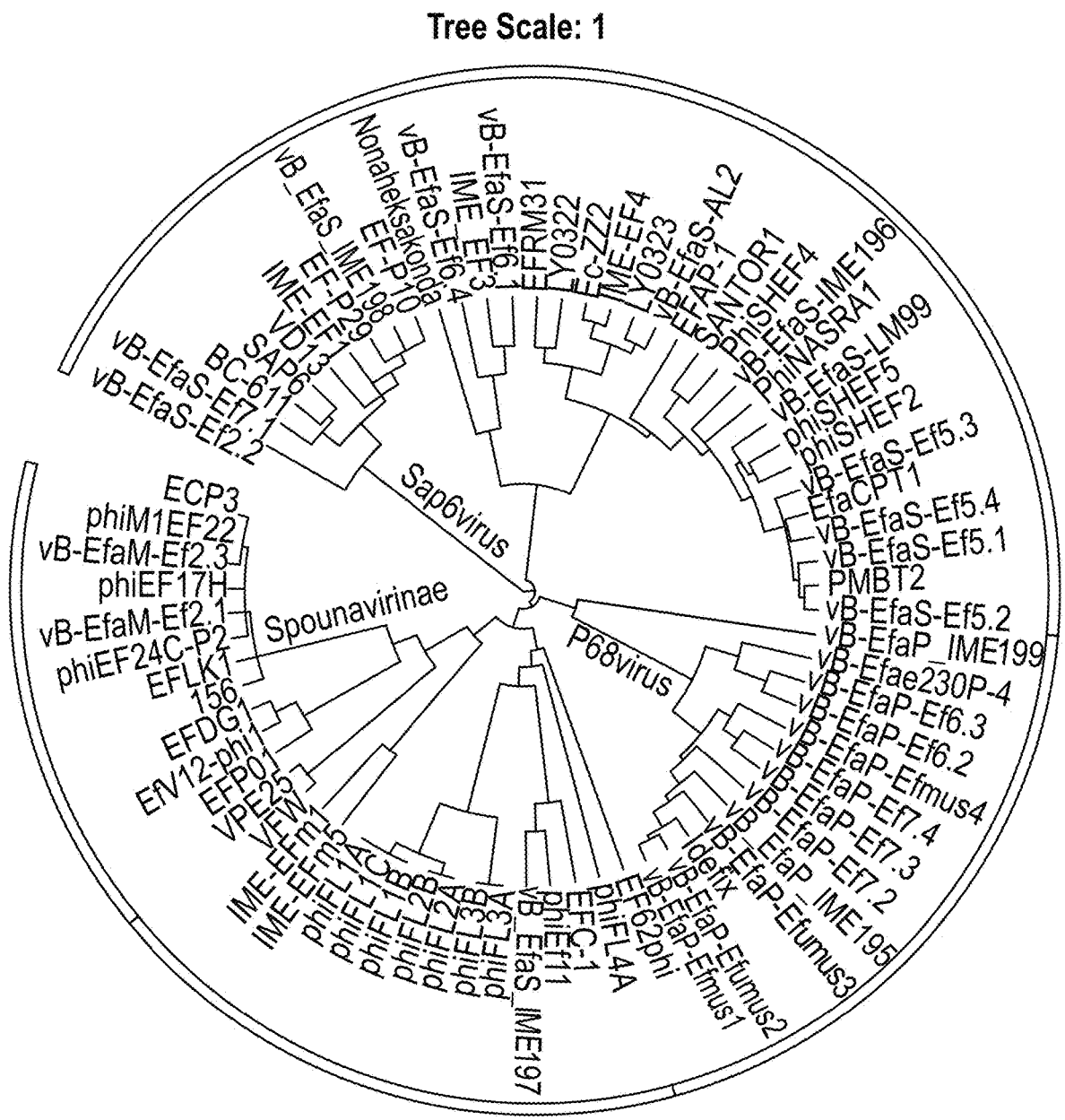

To develop a novel therapeutic approach to precisely edit the intestinal microbiota, bacteriophages against cytolytic *E. faecalis* strain that was isolated from fecal samples of patients with alcoholic hepatitis were isolated and amplified. Lytic bacteriophages against cytolytic *E. faecalis* were from the family of either Siphoviridae or Myoviridae (FIG. 14). These bacteriophages were patient specific, in that they did not lyse cytolytic *E. faecalis* from another patient with alcoholic hepatitis (data not shown). Gnotobiotic mice were colonized with feces from two different cytolysin-positive patients with alcoholic hepatitis and given 3-4 different lytic bacteriophages against cytolytic *E. faecalis*. The bacteriophages against cytolytic *E. faecalis* reduced ethanol-induced liver disease, based on lower levels of ALT and hepatic triglycerides (FIG. 4a-4c), decreased hepatic levels of Il1b, Cxcl1, and Cxcl2 mRNAs, and reduced hepatic levels of cylL$_S$, compared with mice given control bacteriophages (against *C. crescentus*) (FIG. 8d-8g). Bacteriophages against cytolytic *E. faecalis* also reduced fecal amounts of *Enterococcus* (FIG. 15a) without affecting the overall composition of the gut microbiota (FIG. 15b). Intestinal absorption of ethanol and hepatic metabolism were similar in all groups (FIGS. 15c and 15d).

Figure 17A:
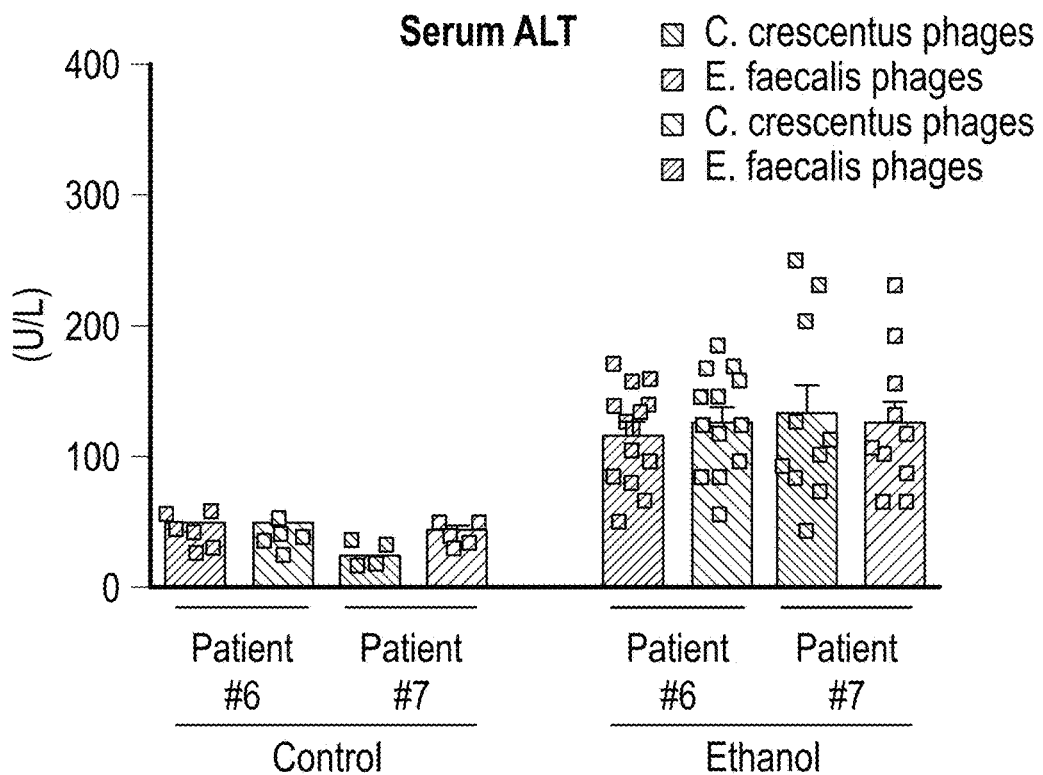
Figure 17B:
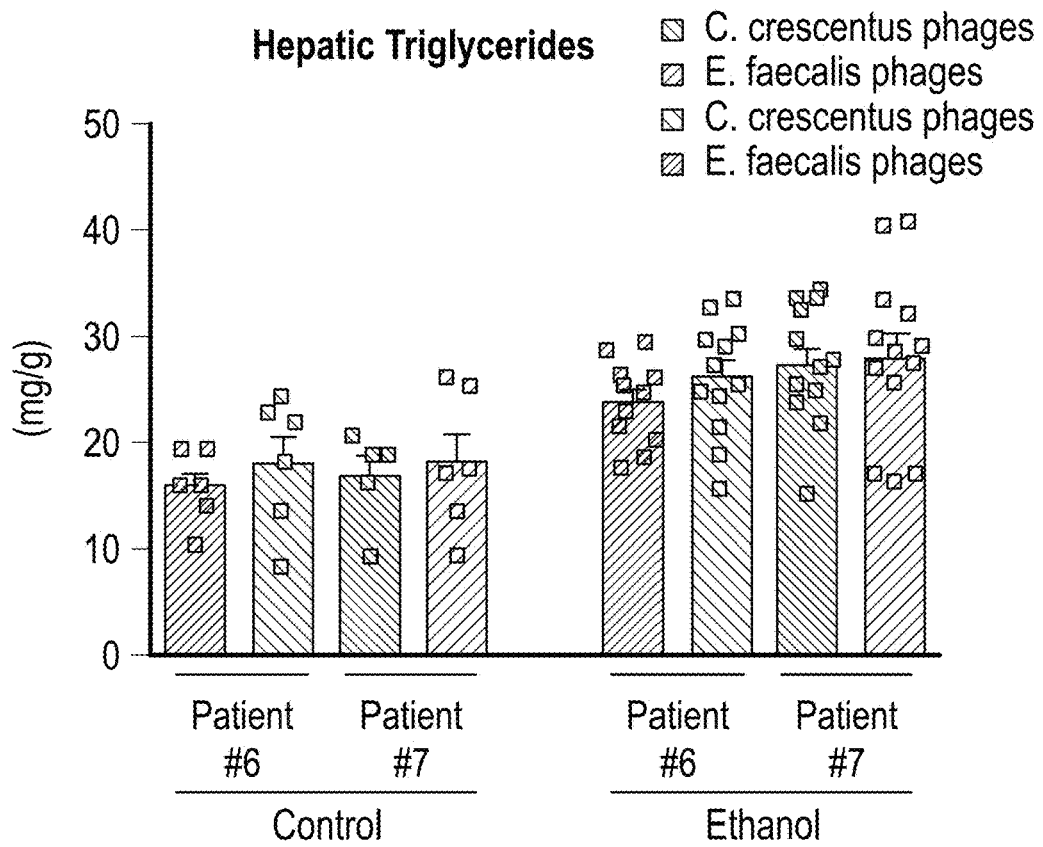
Figure 17C:
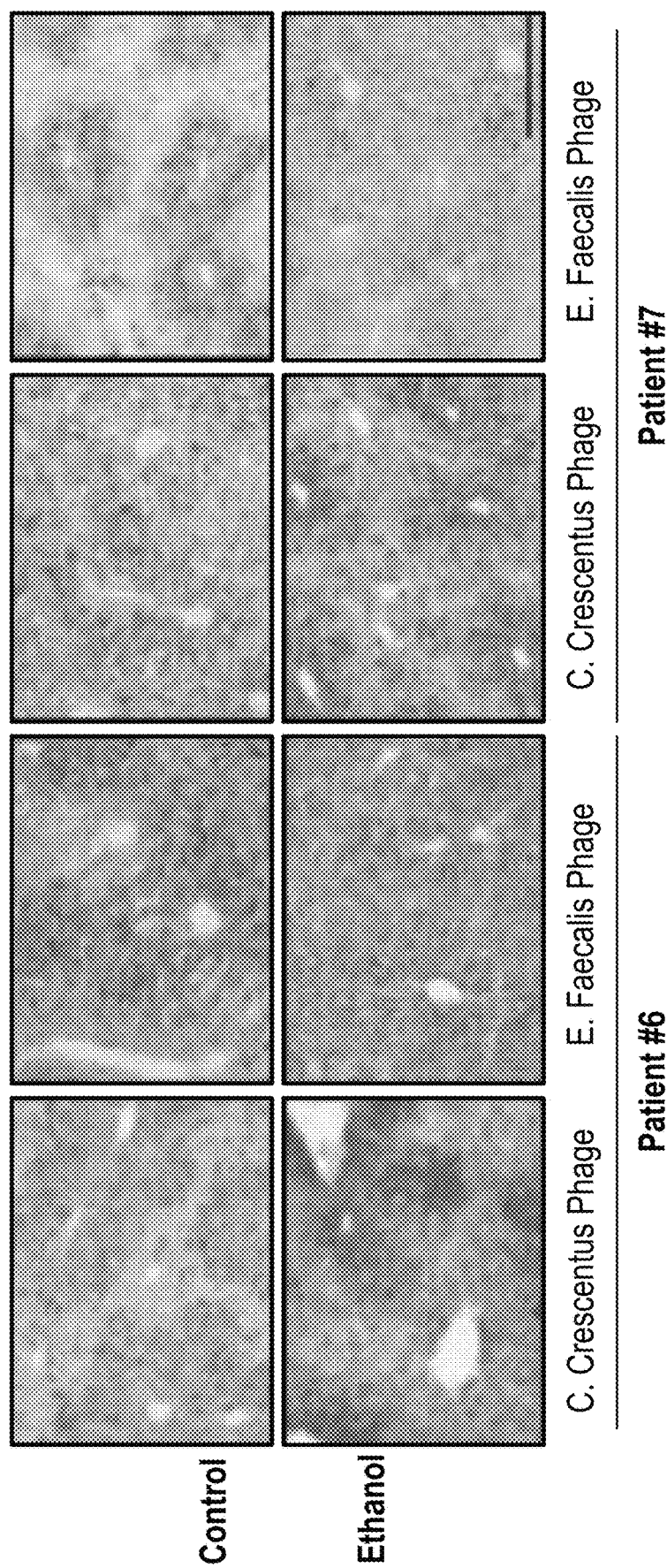
Figure 17D:
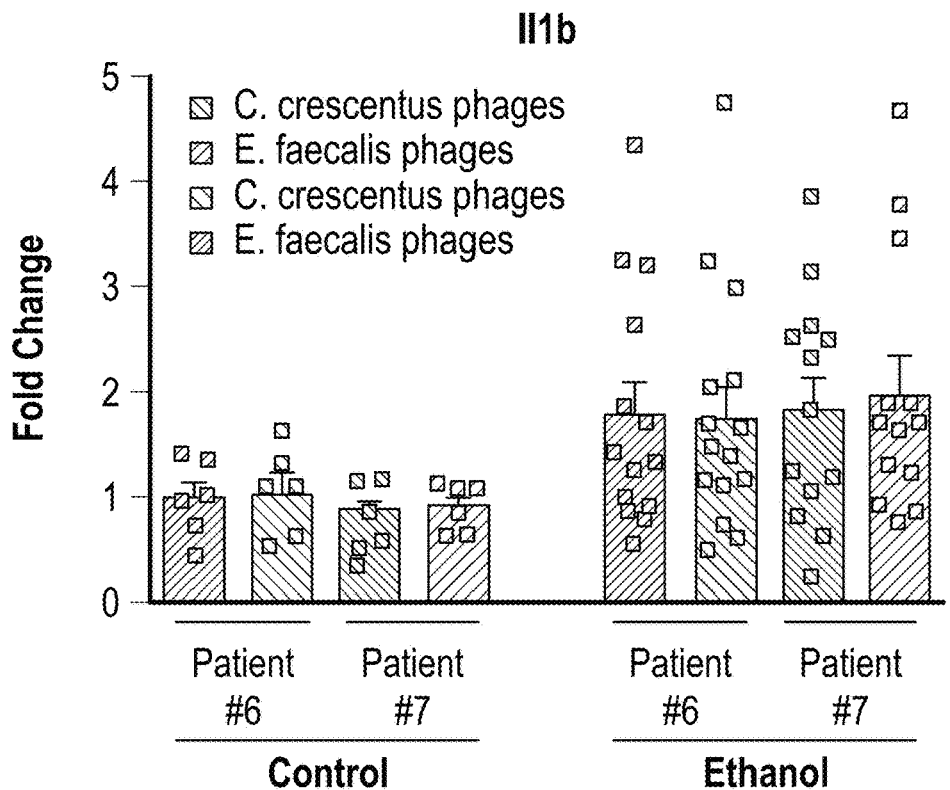
Figure 17E:
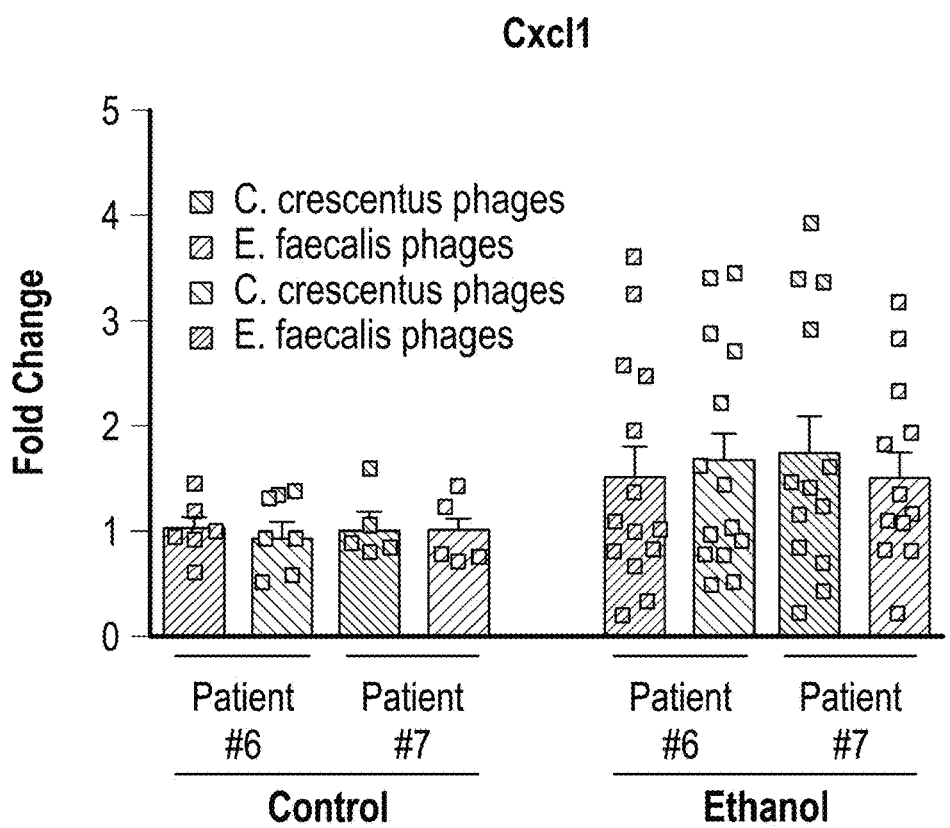
Figure 17F:
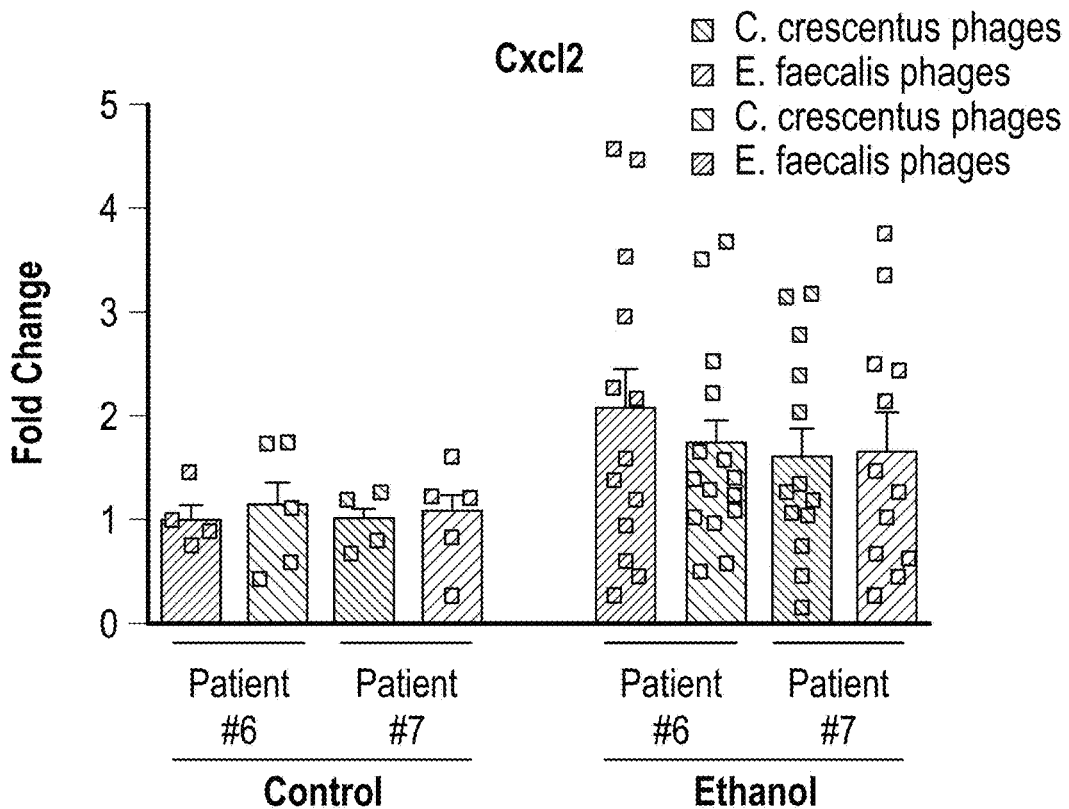
Figure 17G:
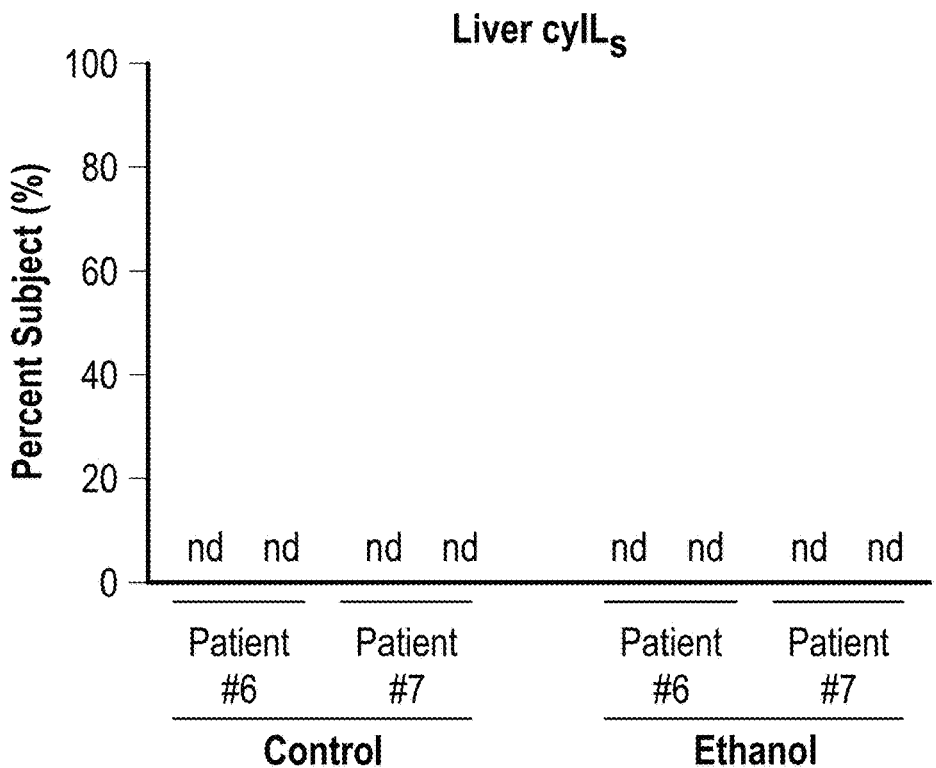
Figure 17H:
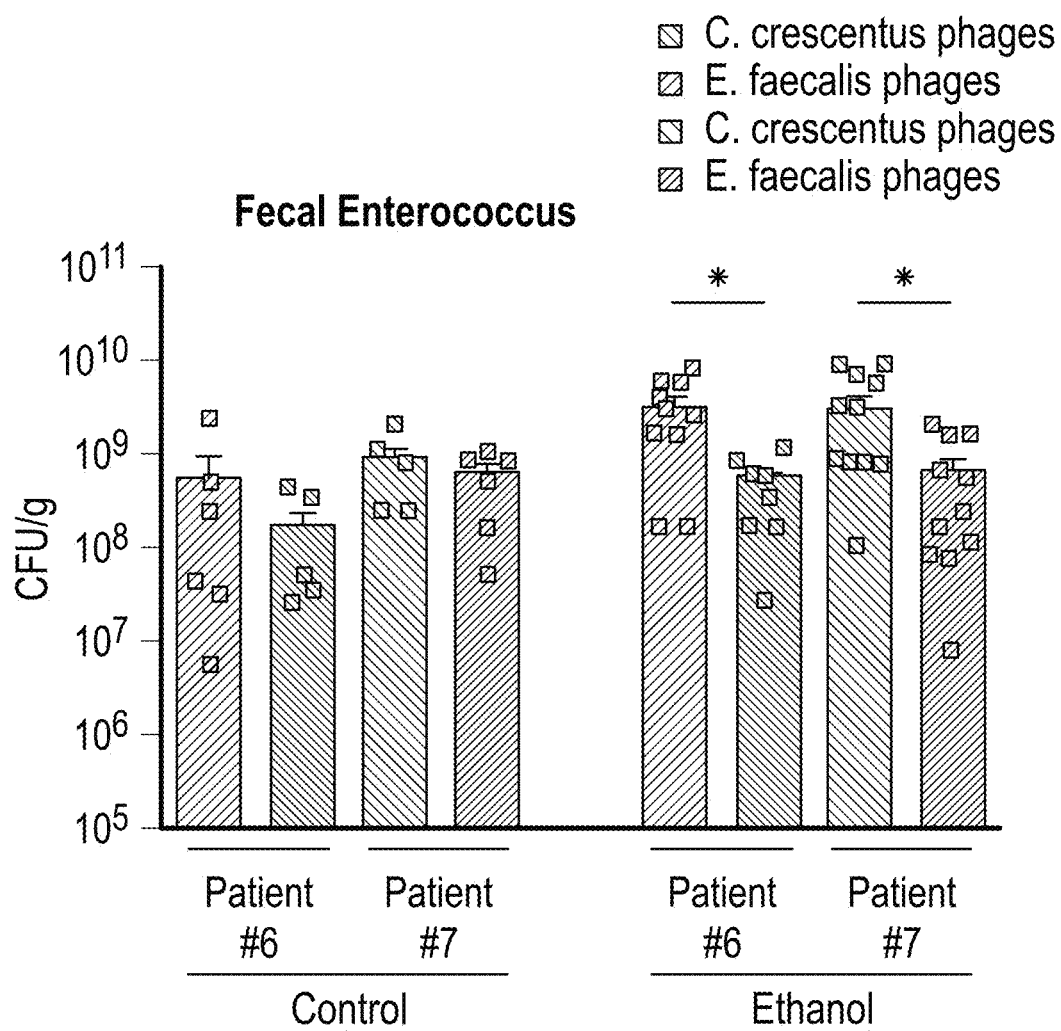
Figure 17J:
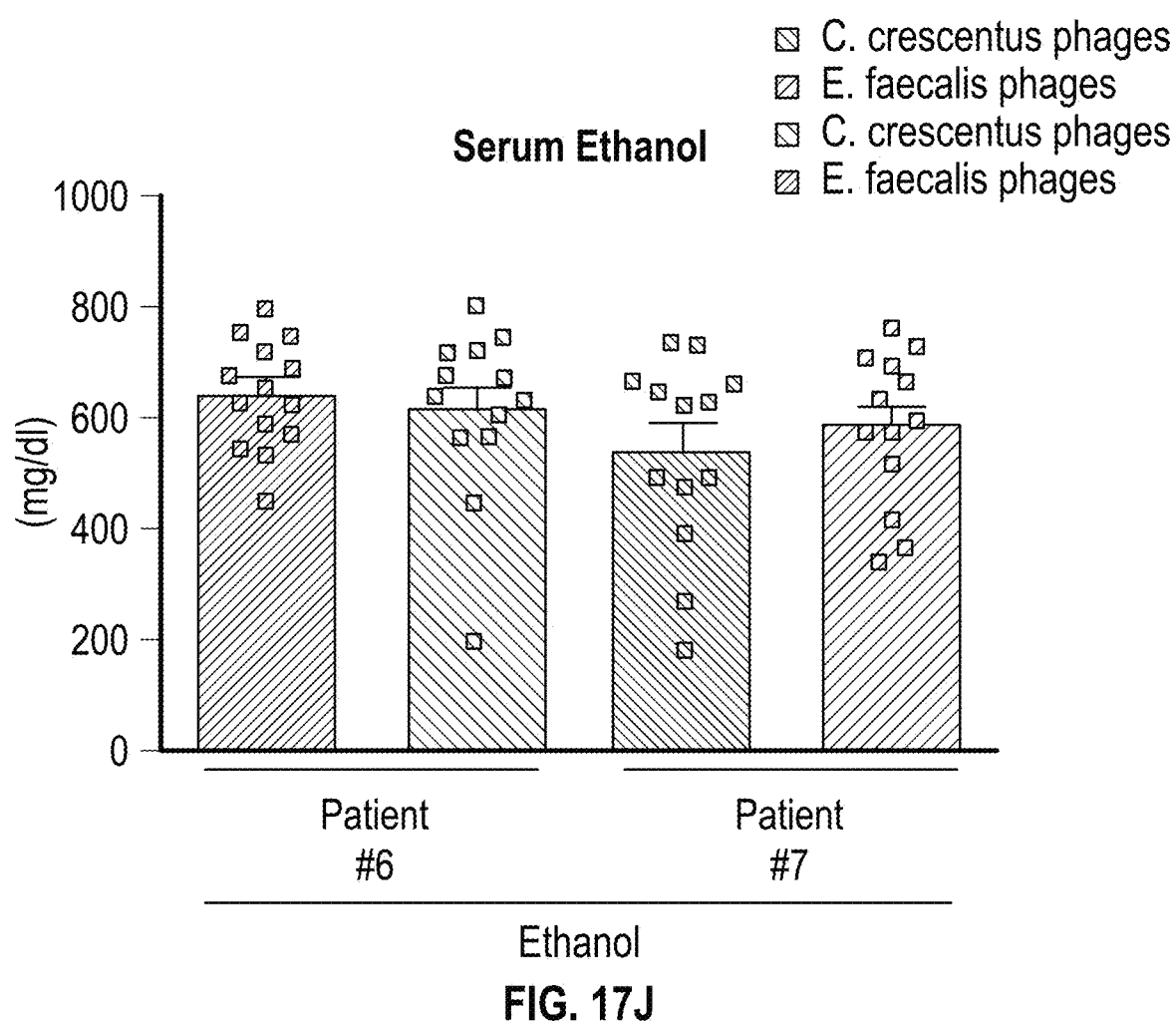
Figure 17K:
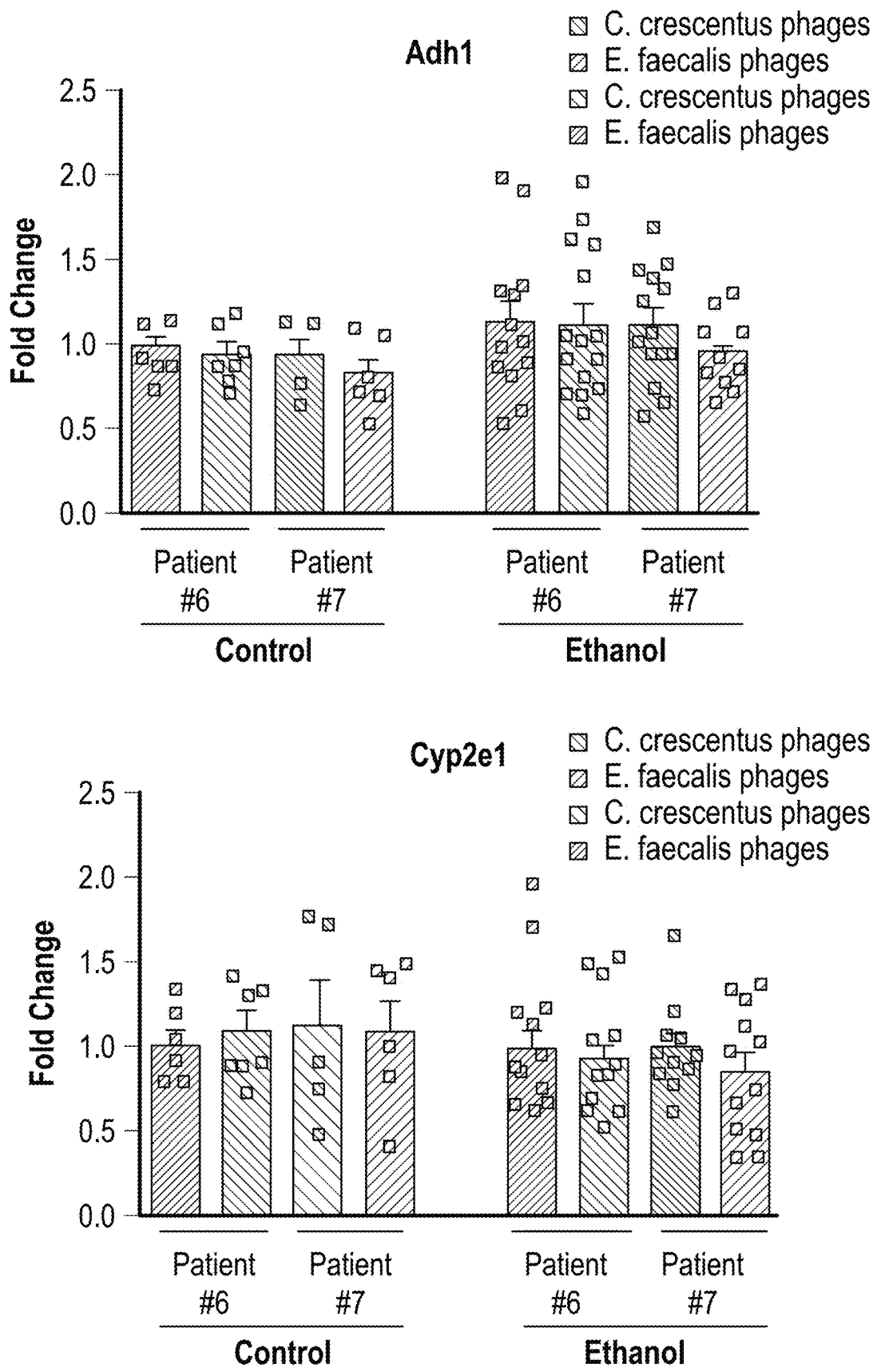

To demonstrate that the effect of bacteriophage treatment occurs via targeting of cytolytic *E. faecalis*, rather than reductions in non-cytolytic *E. faecalis*, gnotobiotic mice were colonized with feces from cytolysin-negative patients with alcoholic hepatitis. Bacteriophages against non-cytolytic *E. faecalis* from patients were isolated and amplified, and they were from the family of either Siphoviridae or Podoviridae (FIG. 18). These bacteriophages did not reduce features of ethanol-induced liver disease compared with control bacteriophages (FIG. 17a-17g), despite the reduction of fecal *Enterococcus* (FIG. 17h). These findings indicate that lytic bacteriophage treatment can reduce features of ethanol-induced liver disease caused by cytolytic *E. faecalis*.

These findings link an increase in a specific bacterial strain with worse outcomes and mortality in patients with alcoholic hepatitis. Cytolysin, a virulence factor produced by cytolytic *E. faecalis*, causes direct hepatocyte death and contributes to liver disease. Cytolysin does not affect the intestinal barrier or promote its own translocation from the intestine to the liver. Translocation of cytolytic *E. faecalis* to the liver is required for development of liver disease during chronic administration of ethanol, which is likely facilitated by ethanol-induced changes in the intestinal barrier (Schnabl and Brenner, 2014).

Bacteriophages that target cytolytic *E. faecalis* might be used to treat patients with alcoholic hepatitis, a life-threatening disease with no effective treatment. Personalized diagnostics allow identification of patients colonized with cytolytic *E. faecalis*, who are predicted to have worse clinical outcomes. Phages can precisely edit the intestinal microbiota and selectively target and eradicate specific strains of bacteria. These types of phage-based therapies have been predominantly studied in trials of patients infected with multidrug-resistant bacteria (Schooley et al., 2014) or gastrointestinal diseases (Marcuk et al., 1971; Sarker et al., 2016; Dalmasso et al., 2014). These trials have proven phage-based therapies to be safe even when bacteriophages are administered intravenously (Schooley et al., 2014). The data herein evidence that eradication of cytolytic E *faecalis* in patients with alcoholic hepatitis might produce better outcomes than current treatments. We provide the first example of the efficacy of intestinal phage-based approaches in models of diseases outside the gastrointestinal tract.

REFERENCES

Argimon et al., *Microb. Genom.*, 2:e000093 (2016).
Ball et al., *J. Abnorm. Psychol*, 106:545 (1997).
Bertola et al., *Nat. Protoc.*, 8:627 (2013).
Brandl et al., *J. Hepatol.*, 69:396 (2018).
Cox et al., *Curr. Protein Pept. Sci.*, 6:77 (2005).
Dalmasso et al., *Trends Microbiol.*, 22:399 (2014).
Dominguez et al., *Am. J. Gastroenterology*, 103:2747 (2008).
Gill et al., *BMC Genomics*, 13:542 (2012).
Haas et al., *Nature.* 415:84 (2002).
Huycke et al., *Antimicrob. Agents Chemother.*, 35:1626 (1991).
Ike et al., *Bacteriol.*, 172:155 (1990).
Iwaisako et al., *Proc. Nat. Acad. Sci. USA*, 109:E1369 (2012).
Krieg et al., *Blood.* 118:6418 (2011).
Lee et al., *JAMA Intern. Med.*, _____: (2019).
Llopis et al., Gut, 65:830 (2016).
Llorente et al., *Nature Commun.*, 8:837 (2017).
Lozano et al., *Lancet* 380:2095 (2012).
Maddrey et al., *Gastroenterology*, 75:193 (1978).
Marcuk et al., *Bull. World Health Organ.*, 45:77 (1971).
Mathurin and Lucey, *J. Heptol.*, 56:S39 (2012).
Nobrega et al., *Nat. Rev. Microbiol.*, 16:760 (2018).
Page et al., *Microb. Genom.*, 2:e000083 (2016).
Poindexter, *Bacteriol. Rev.*, 28:231 (1964).
Raven et al., *Nat. Microbiol.*, 1:15033 (2016).
Rehm et al., *Clin. Exp. Res.*, 38:1068 (2014).

Rehm et al., *J. Hepatol.,* 59:160 (2013).
Ryu et al., *Appl. Environ. Microbiol,* 79:196 (2013).
Sarker et al., *EbioMedicine,* 4:124 (2016).
Schnabl and Brenner, *Gastroenterology,* 146:1513 (2014),
Schooley et al., *Antimicrob. Agents Chemother.,* 61:_____ (2017).
Seemann, *Bioinformatics,* 30:2068 (2014),
Shin et al., *Sci. Rep.,* 6:29681 (2016).
Starnatakis, *Bioformatics,* 30:1312 (2014).
Tang and van der Donk, *Nature Chem. Biol.,* 9:157 (2013).
Tang et al., *J. Ind. Microbiol. Biotechnol.,* 46:537(2018).
The Human Microbiome Consortium, *Nature,* 486:207 (2012).
Thursz et al., *N. Engl. J. Med.,* 373:282 (2015).
Valentine et al., *Biochemistry* 7:2143 (1968).
Van Tyne et al., *Toxins (Basel),* 5:895 (2013).

All publications, patents and patent applications are incorporated herein by reference. While in the foregoing specification, this invention has been described in relation to certain preferred embodiments thereof, and many details have been set forth for purposes of illustration, it will be apparent to those skilled in the art that the invention is susceptible to additional embodiments and that certain of the details herein may be varied considerably without departing from the basic principles of the invention.

What is claimed is:

1. A method comprising:
   obtaining a fecal, liver, or blood sample from a mammal infected with liver cirrhosis or hepatitis,
   detecting or determining a presence or an amount of *Enterococcus faecalis* cytolysin or cytolytic *Enterococcus faecalis* in the sample;
   selecting a mammal with 2 fold, 5 fold, 10 fold, 100 fold, or 1000 fold greater amount of *Enterococcus faecalis* cytolysin or cytolytic *Enterococcus faecalis* than a control mammal; and
   treating the selected mammal by administering to the mammal an effective amount of a composition comprising one or more lytic phage specific for *Enterococcus faecalis*.

2. The method of claim 1, wherein the presence or amount of the large or the small subunit of *Enterococcus faecalis* cytolysin is detected or determined.

3. The method of claim 1, wherein the presence or amount of *Enterococcus faecalis* cytolysin DNA or RNA in the sample is detected or determined.

4. The method of claim 1, wherein the mammal has nonalcoholic steatohepatitis (NASH).

5. The method of claim 1, wherein the mammal has alcoholic hepatitis.

6. The method of claim 1, wherein the animal is a human.

7. The method of claim 1, further comprising determining the presence or amount of alanine aminotransferase, aspartate aminotransferase, alkaline phosphatase, bilirubin, international normalized ratio, creatinine, or a combination thereof.

8. The method of claim 1, wherein the amount of *Enterococcus faecalis* cytolysin or cytolytic *Enterococcus faecalis* is detected over time and whether the amount increases over time is determined.

9. The method of claim 3, wherein an amplification reaction is employed.

10. The method of claim 9, wherein one or more primers are employed comprising GTAAAATAAGTAAAATCAAGAAAACTATTACTC (SEQ ID NO:1), CAAAAGAAGGACCAACAAGTTCTAATT (SEQ ID NO:2), CTGTTGCGGCGACAGCT (SEQ ID NO:3), CCACCAACCCAGCCACAA (SEQ ID NO:4) or a nucleotide sequence with at least 80% nucleotide sequence identity thereto, or any combination thereof.

* * * * *

SEQUENCE LISTING

```
<160> NUMBER OF SEQ ID NOS: 6

<210> SEQ ID NO 1
<211> LENGTH: 33
<212> TYPE: DNA
<213> ORGANISM: Artificial Sequence
<220> FEATURE:
<223> OTHER INFORMATION: A synthetic oligonucleotide

<400> SEQUENCE: 1
gtaaaataag taaaatcaag aaaactatta ctc                              33

<210> SEQ ID NO 2
<211> LENGTH: 27
<212> TYPE: DNA
<213> ORGANISM: Artificial Sequence
<220> FEATURE:
<223> OTHER INFORMATION: A synthetic oligonucleotide

<400> SEQUENCE: 2
caaaagaagg accaacaagt tctaatt                                     27

<210> SEQ ID NO 3
<211> LENGTH: 17
<212> TYPE: DNA
<213> ORGANISM: Artificial Sequence
<220> FEATURE:
<223> OTHER INFORMATION: A synthetic oligonucleotide

<400> SEQUENCE: 3
ctgttgcggc gacagct                                                17

<210> SEQ ID NO 4
<211> LENGTH: 18
<212> TYPE: DNA
<213> ORGANISM: Artificial Sequence
<220> FEATURE:
<223> OTHER INFORMATION: A synthetic oligonucleotide

<400> SEQUENCE: 4
ccaccaaccc agccacaa                                               18

<210> SEQ ID NO 5
<211> LENGTH: 38
<212> TYPE: PRT
<213> ORGANISM: Homo sapiens
<220> FEATURE:
<221> NAME/KEY: SITE
<222> LOCATION: 1
<223> OTHER INFORMATION: Xaa = Abu
<221> NAME/KEY: SITE
<222> LOCATION: 2,10,15,30
<223> OTHER INFORMATION: Xaa - Dhb
```

```
<400> SEQUENCE: 5

Xaa Xaa Pro Val Ala Ala Val Ala Ala Xaa Ala Ala Ala Xaa Ala
1               5                   10                  15

Ala Ala Gly Trp Val Gly Gly Gly Ile Phe Thr Gly Val Xaa Val Val
            20                  25                  30

Val Ala Leu Lys His Ala
            35

<210> SEQ ID NO 6
<211> LENGTH: 21
<212> TYPE: PRT
<213> ORGANISM: Homo sapiens
<220> FEATURE:
<221> NAME/KEY: SITE
<222> LOCATION: 1
<223> OTHER INFORMATION: Xaa = Abu
<221> NAME/KEY: SITE
<222> LOCATION: 2,7
<223> OTHER INFORMATION: Xaa = Dhb

<400> SEQUENCE: 6

Xaa Xaa Pro Ala Ala Phe Xaa Ile Gly Leu Gly Val Gly Ala Leu Phe
1               5                   10                  15

Ala Ala Lys Phe Ala
            20
```